US005550816A

United States Patent [19]
Hardwick et al.

[11] Patent Number: 5,550,816
[45] Date of Patent: Aug. 27, 1996

[54] METHOD AND APPARATUS FOR VIRTUAL SWITCHING

[75] Inventors: Ken Hardwick, Sherwood, Oreg.; Geoffrey C. Stone, Minneapolis, Minn.

[73] Assignee: Storage Technology Corporation, Lousville, Colo.

[21] Appl. No.: 366,227

[22] Filed: Dec. 29, 1994

[51] Int. Cl.$^6$ .............................. H04L 12/56; G06F 13/00
[52] U.S. Cl. ...................... 370/60; 370/85.13; 370/94.1; 395/650; 395/800; 395/200.02
[58] Field of Search .................. 370/58.1, 58.2, 370/58.3, 60, 60.1, 61, 79, 85.13, 85.14, 94.1, 94.2, 94.3; 395/200, 325, 375, 650, 800, 500

[56] References Cited

U.S. PATENT DOCUMENTS

| | | | |
|---|---|---|---|
| 4,218,756 | 8/1980 | Fraser | 370/94.1 |
| 5,119,369 | 6/1992 | Tanabe et al. | 370/60 |
| 5,249,292 | 9/1993 | Chiappa | 395/650 |
| 5,278,834 | 1/1994 | Mazzola | 370/94.1 |
| 5,280,476 | 1/1994 | Kojima et al. | 370/60.1 |
| 5,317,568 | 5/1994 | Bixby et al. | 370/85.13 |
| 5,321,692 | 6/1994 | Wallmeier | 370/60 |
| 5,430,727 | 7/1995 | Callon | 370/85.13 |

*Primary Examiner*—Alpus H. Hsu
*Attorney, Agent, or Firm*—Timothy R. Schulte

[57] ABSTRACT

A physical switching device for use in a communication network to switch Open Systems Interconnection (OSI) network layer packets and method of use therefor is provided. The physical switching device includes at least a first and a second virtual switch. Each virtual switch includes a decision mechanism for determining an associated directive based on a destination identifier within a particular packet received at a data port. A processor is coupled to each virtual switch to insert the particular packet into an outgoing data stream on another data port to deliver the packet. Both data ports are associated with a plurality of data interfaces in the physical switching device. A management apparatus is coupled to each virtual switch to maintain information on an association between the plurality of data interfaces and the virtual switches. The management apparatus limits each processor to only inserting the particular packet on another data port associated with the same virtual switch which received the particular packet.

57 Claims, 35 Drawing Sheets

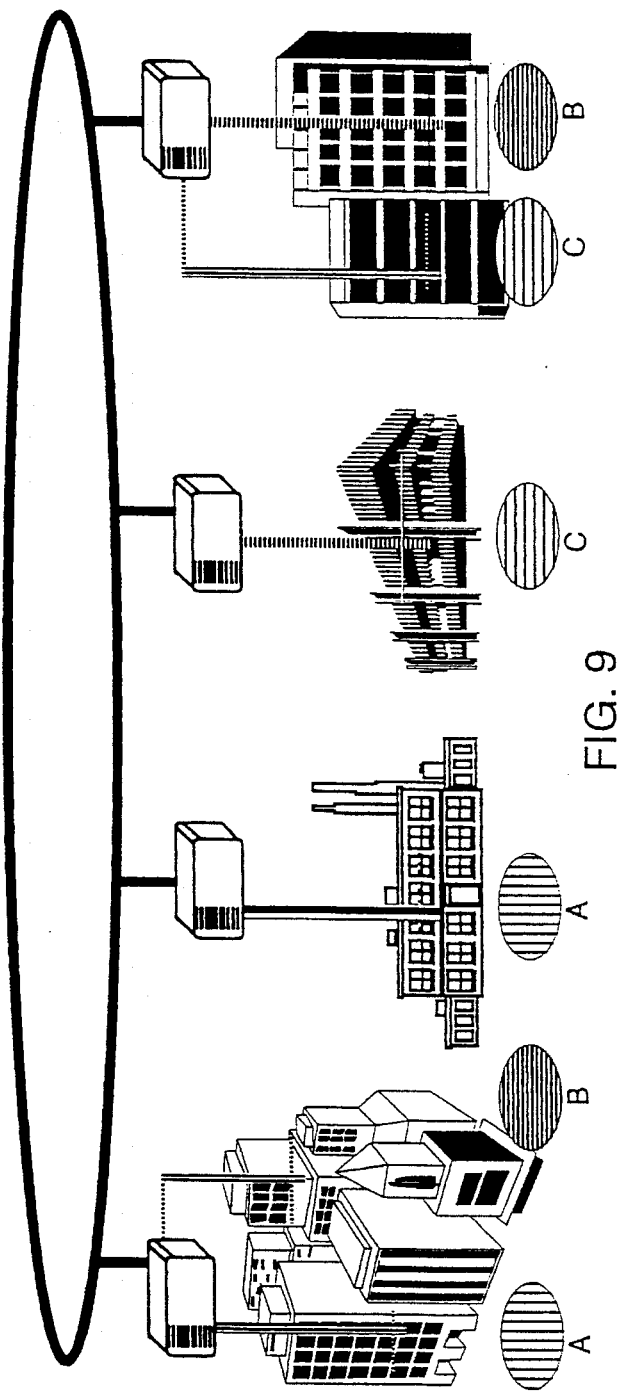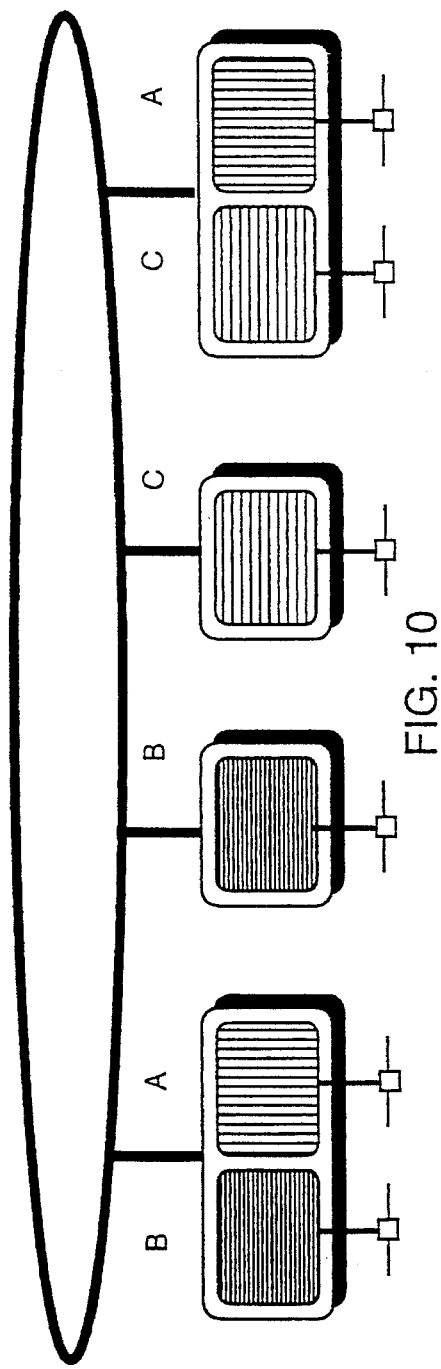
FIG. 9
FIG. 10

METHOD AND APPARATUS FOR VIRTUAL SWITCHING

RELATED INVENTIONS

The present invention is related to:

Co-pending U.S. patent application Ser. No. 08/366,221, filed on Dec. 29, 1994, which is entitled "Method And Apparatus For Accelerated Packet Forwarding" by Mark Bakke et al., Co-pending U.S. patent application Ser. No. 08/366,225, filed on Dec. 29, 1994, which is entitled "Method And Apparatus For Accelerated Packet Processing" by Geof Stone, Co-pending U.S. patent application Ser. No. 08/366,222, filed on Dec. 29, 1994, which is entitled "Method And Apparatus For Radix Decision Packet Processing" by Geof Stone, and which were all filed concurrently herewith and assigned to the assignee of the present invention.

FIELD OF THE INVENTION

The present invention relates generally to data communication networks. More particularly, the present invention relates to the operation of virtual switches within physical switching systems that direct the flow of protocol data units in the data communication networks.

BACKGROUND OF THE INVENTION

In a data communication network, a forwarding device (e.g., a data packet switch) directs protocol data units (e.g., data packets) from one network node to another. These data packets may include voice, video, or data information as well as any combination thereof.

To better understand how forwarding devices work within a data communication network, an analogy may be helpful. In many respects, data communication networks are similar to postal delivery systems, with pieces of mail, such as letters or packages, being comparable to the data packets which are transferred within a data communication network. In a postal delivery system, the pieces of mail may be input into the postal delivery system in a variety of ways. Once within the postal delivery system, all of the pieces of mail are collected and transported to nearby processing facilities where the pieces of mail are sorted for further processing. Although each piece of mail will have a unique delivery address, most of the pieces of mail are automatically sorted by a shorter zip code or some other type of routing code. Letters without zip codes must be sorted and processed by hand. Some postal delivery systems also have special forms of encoded delivery addresses, such as Post Office box numbers at a Post Office, which are not recognizable by other postal delivery systems such as Federal Express or United Parcel Service. Regardless of which particular postal delivery system the piece of mail is deposited into, once the mail has been sorted by destination it is routed through additional intermediary processing facilities until it arrives at the local indicated by the destination on the piece of mail. At this point, the zip code or routing code is no longer sufficient to deliver the piece of mail to the intended destination and the local delivery office must further decode the destination address in order to deliver the piece of mail to the intended recipient. In addition to processing pieces of mail for routing the mail to the correct destination, the pieces of mail may go on through several other processing steps. For example, if the piece of mail is going out of the country, it must go through a customs operation in each country. If the national postal delivery system is being used to deliver the piece of mail then it must also be transferred from one national postal delivery system to another. In a private postal delivery system however, this transfer step would not be necessary. The pieces of mail may also be monitored or filtered for such things as mail fraud violation or shipment of hazardous materials.

Data packets are manipulated in a data communication network in a manner similar to that by which pieces of mail are delivered in a postal delivery system. Data packets, for example, are generated by many different types of means and are placed onto a communication network. Typically, the data packets are concentrated into a forwarding device, such as a local bridge or router, and are then directed by size and destination over one or more media types (e.g., fiber optic) which are connected to further forwarding devices that could be other larger or smaller bridges or routers. These destination devices then deliver the data packet to its terminal end point (i.e., the end user). Along the way the data communication network may perform filtering and monitoring functions with respect to the data packets.

Just like postal delivery systems have experienced ever increasing volumes of mail which must be delivered, the volume of protocol data units being transferred across computer networks continues to increase as experience is being gained with this new form of communication delivery system and as more and more applications, with more and more expansive communications requirements are being developed. In addition, quickly changing technology has made the underlying data transmission resources for computer communication networks relatively inexpensive. Fiber optics, for example, offer data transfer rates in the gigabyte per second range.

One of the existing types of forwarding devices which offer the greatest potential to meet the increasing demand on throughput rates are packet switches. Several classes of packet switches exist. Each class differs substantially from the other class of devices, but all may be commonly referred to as packet switches or forwarding devices.

A first class of packet switches is that commonly used in digital telephone exchanges. By analogy, these switches can perform the functions only of a dedicated mail truck which relays mail between post offices and drops mail pouches on a post office loading dock. These switches are intended only to transfer packets among the devices in a single station, such as a telephone exchange, and are not capable of performing any sorting operations. The format of the packet in these systems is chosen to make the hardware in the switch as simple as possible; and this usually means that the packets include fields designed for direct use by the hardware. The capabilities of this class of switches (for example, in such areas as congestion control) are very limited in order to keep the hardware simple.

A second class of packet switches is used in smaller or restricted computer networks, such as X.25 networks. By analogy, these switches are equivalent to a group of #10 envelope sorters in the Post Office. These sorters handle and process this size envelope efficiently within the post office by performing limited sorting and routing functions, but can not by themselves deliver mail to its destination. In some sense, these switches are very different from the first class of packet switches described above, because several of this second class of packet switches can work together like several #10 envelope sorters can work at one time in the Post Office. However, there is one substantial similarity in that this second class of switches can only handle one format of packets (i.e., the protocols). The formats handled by the second class of packet switches is much more complex than those in the first class. This greater complexity is necessary because the protocols are designed to work in less restricted environments, and because the packet switches must provide a greater range of services. While the formats interpreted by the first class of switches are chosen for easy implementation in hardware, the data packets handled by this second class of switches are generally intended to be interpreted by software (which can easily and economically handle the greater complexity) and provides the inherit benefit of incremental flexibility in the design of the packet switch.

In a third class of packet switches, the packet protocols are intended to be used in very large data networks having many very dissimilar links (such as a mix of very high speed local area networks (LANs) and low speed long distance point to point lines). Examples of such protocols are the United States designed Transmission Control Protocol/Internet Protocol (TCP/IP), and the International Standards Organization's Connectionless Network Protocol (CLNP) protocols.

In addition, this third class of switches (commonly referred to as bridge/routers) often must handle multiple protocols simultaneously. This third class of switches is very similar to the mail processing devices used in the modern postal system. Just as there are many countries, there are many data packet protocols used in computer networks. While a single postal system was once thought to be sufficient to handle mail going anywhere in the world, today several competing systems like United Parcel Service, Federal Express, and the U.S. Postal Service exist to handle the special needs of mail going to every country, state, city, town, and street in the world. Similarly, in computer communication systems, the packet switches are more involved in the carrying of data, and must understand some of the details of each protocol to be able to correctly handle data packets which are being conveyed in that protocol. The routers in this third class of packet switches often have to make fairly complex changes to the data packets as they pass through the packet switch.

It is this latter class of packet switches to which the following detailed description primarily relates. It will be appreciated however, that the detailed description of this invention can readily be applied to the first and second class of switches as well.

In current conventional packet switch design, a programmed general purpose processor examines each data packet as it arrives over the network interface and then processes that packet. Packet processing requires assignment of the data packet to an outbound network interface for transmission over the next communications link in the data path.

Currently, most bridge/router implementations rely heavily on off-the-shelf microprocessors to perform the packet forwarding functions. The best implementations are able to sustain processing rates approaching 100,000 packets per second (PPS). When dealing with media such as Ethernet or current telecommunications lines, this processing rate is more than adequate. When faster media such as the Fiber Distributed Data Interface (FDDI) are used, existing processing rates may still be sufficient as long as there is only one such high packet rate interface present. When multiple high packet rate interfaces are used, 100,000 PPS become inadequate. Current software-based implementations for bridges/routers are simply not capable of media-rate packet forwarding on emerging media such as asynchronous transfer mode (ATM) or Optical Connection-12 Synchronous Optical Network (OC-12 SONET) which can accommodate communication rates up to 6 times the current 100 megabits per second limits to rates of 600 megabits per second. It should be noted that the ever increasing power of off-the-shelf microprocessors might solve the throughput problem, but this is probably a vain hope. For example, a single OC-24 ATM interface can sustain nearly 3 million internetworking protocol (IP) packets per second. This is over 30 times the rates achieved by the current best software techniques. If processing power doubles every year, the wait for sufficient processing power to make a software approach viable would be at least 4–5 years. In addition, the media capabilities will likely continue to increase over such a span of years. Additionally, any such processor will likely require large amounts of the fastest (most expensive) memory available to operate at full speed, resulting in an unacceptably high system cost.

Fortunately most individual packet switch customers will never require sustained packet transfer rates at these levels. However, the traditional approach of individual customers purchasing routers, bridges, modems, and leased phone lines is changing. A trend towards developing Metropolitan Area Networks (MANs) is beginning in the networking industry as an alternative to the traditional approach of individual customer local area networks (LANs) connected through customer owned leased telecommunication lines.

The more successful entrants in this area are capitalizing on three trends:

Fiber optic cable can be laid to most business and industrial premises by organizations possessing rights of way; this cable can be used to carry 100 Megabits/second or more of customer traffic, a bandwidth that appears almost limitless to customers.

The "demarkation point" is changing from a pair of copper wires to an Ethernet socket; the MAN vendor takes responsibility for the delivery of Ethernet packets between sites specified by the customer. The customer does not have to be concerned with the intricacies of bridges, routers, and modems, which permits market penetration into a far less sophisticated customer base.

Most potential customers are not interested in a public network connection. They simply want to interconnect a number of buildings or divisions which constitute the customer's enterprise in a metropolitan area.

These MAN vendors are dealing with "customers" in the truest sense of the word, where customer and MAN vendor are independent enterprises. The trends towards corporate decentralization are even producing analogous situations within large enterprises.

Second, enterprises are becoming far more distributed than before, and the very definition of an "enterprise" is changing. Where in the 1980's all individuals involved in a program could be expected to reside in one or two well defined locations, a more modern "enterprise" may consist of individuals from several divisions, several corporations, consultants, roving sales and marketing people, and workers who want to telecommute at their convenience. At the same time, this modern enterprise needs to protect their information from disclosure or sabotage from without the group while preserving a liberal access policy from within.

A wide area "backbone" is a tremendous investment on the part of any large enterprise. Yet at the same time, host computers and small scale networks are becoming easier to administer while the expertise to administer them becomes more widespread. At the same time, organizations with a bias towards decentralization are seeing departments and divisions owning "their" hosts and "their" networks that they want to plug into a wide area backbone in order to carry their traffic. This traffic typically consists of communications to other divisions; however, increasingly it will also consist of traffic within a division with widely scattered sites.

All of this follows a known trend of increasing decentralization in the workplace. Many years ago, Management Information System (MIS) computers and all the networks in the enterprise. Access policy (such as was needed then) could largely be done through system administration of the host computers.

The advent of personal computers and affordable workstations meant that the networking administrators no longer owned all of the host computers anymore, yet these same MIS organizations are still charged with their traditional role of ensuring the integrity of the enterprise's data. This has led to the rise of routing and filtering functions within routers, making access control, a network, rather than a host problem.

Now the networking industry is moving up one more level. Today, clients not only own their own hosts, they own their own networks and want to connect these networks on a network to network basis. Yet at the same time, the need to preserve the integrity of data moving among client networks still exists. This trend is producing not just a "network", but a "network of networks", where the purpose of a backbone is to serve the needs and foibles of its constituent networks, not all of which may belong to the same enterprise.

The concept of a "network of networks" is not new. In fact, this was one of the guiding philosophies which led to the original creation of the Internet. Unfortunately, the logic to support this has only been applied to Internet Protocol and more recently to the Open Systems Interconnection (OSI) model. IP has been designed to perform this trick once (at the Internet level) and is little help in organizing traffic within a single IP network. Furthermore, IP cannot cope with the notion that a single network may be scattered at different points throughout the Internet.

Thus, a need exists for a way to provide equivalent protocols and management tools to those that exist today within a single network that will work in a "network of networks" paradigm.

One part of a solution to this problem is the use of Closed User Groups. A Closed User Group is a potentially widely distributed community of users and their associated networked computer equipment who permit free and open communications within the community, but severely restrict communication to points outside the community. The use of these Closed User Groups by MAN vendors is a means of addressing the trend that network topological or geographic proximity is becoming independent of access proximity. The general concept of a Closed User Group network environment is where data packets from different enterprises never interact with each other; however all of the data packets are carried across at least part of the network on the same shared media such an OC-12 data communications link. In a MAN environment that supports closed user groups, LAN's containing host computers are identified as belonging to a specific Closed User Group, and data packets for this LAN are transported to the desired location, then validated on receipt.

To better understand this concept let's refer once again to the postal service analogy. Several postal services need to send packages to the East coast of the United States on a regular basis. At first Federal Express, United Parcel Service, and the United States Postal Services all send these packages by separate airplanes, but a bright entrepreneur offers to build a special cargo plane that will carry all three sets of packages to the East coast in a single trip. All of the services like the idea, because it saves them operating expenses, but they want assurances that the none of the packages will get mixed with packages from other postal services. The entrepreneur agrees to divide the plane into three separate cargo areas so that no mixture of packages is possible. As a result, everyone is happy and the entrepreneur now has a thriving business. The MAN vendors are very similar to this entrepreneur and the postal services can be likened to individual companies or enterprises within the MAN's coverage area. Each MAN vendor provides these separate cargo areas by assigning each enterprise to a different Closed User Group. Thus, even though data from several enterprises are traveling on the same MAN shared medium data path, the data is separated by the Closed User Group assignments.

Although the user of Closed User Groups by MAN vendors offers a partial solution to the problems of "network of networks", there are no existing solutions for managing Closed User Groups that provide protocols and management tools equivalent to those now in use within a single network. A need still exists for an improved protocol data unit (i.e., frame, cell, or packet) forwarding system which solves the above-identified problems and promotes the use of the Closed User Group paradigm, while providing a wide variety of access control tools that permit network managers to assign users to a group or groups, and then define the policy of how those groups can interact within themselves and with each other.

SUMMARY OF THE INVENTION

The present invention provides a packet processing system which contains virtual switches within physical switching systems that direct the flow of protocol data units in a data communication network. The present invention addresses the problem of providing Closed User Groups on shared medium data paths by providing protocols, algorithms, and bridge/router architectural designs that are capable of processing packets at multi-gigabyte rates while maintaining appropriate access policies and/or network security measures. By using all of these principles, the present invention reduces the cost of providing these packet switching services by enabling a single physical data switch to be divided into two or more virtual switches which individually process packets from different Closed User Groups. With reference to the postal delivery analogy, the present invention provides the details on how terminals at each airport can be designed, built, and operated to maintain separate package cargo areas for each postal service (i.e., separate virtual switches for each Closed User Group) to insure that packages from different postal services are not mixed up either before or after they are loaded onto the single airplane.

In accordance with a first aspect of the invention, a physical switching device for use in a communication network to switch OSI network layer protocol data traits within the communication network is provided. The physical switching device includes at least a first and a second virtual switch. Each virtual switch includes a decision mechanism for determining an associated directive based on a destination identifier within a particular protocol data unit received at a data port. A processor is operatively coupled to each virtual switch to insert the particular protocol data unit into an outgoing data stream on another data port according to the associated directive to enable delivery of the protocol data unit to the destination identifier. These data ports are associated with a set of data interfaces selected from a plurality of data interfaces in a physical communication network switch. The set of data interfaces is assigned exclusively to a unique virtual switching device. These data ports can take many forms, including but not limited to, a data interface on the physical switch, a time slot out of several time slots in a time-divided frame received at a data interface on the physical switch, and a code divided cell out of several code divided cells received at one or more data interface on the physical switch.

The physical switching device preferably is designed to accommodate data interfaces of differing types such that the set of data interfaces assigned to a virtual switch may include a first data interface which manipulates a protocol data unit having a different protocol type from a second data interface such that protocol data units of different protocol types can be switched within a single virtual switch. The different protocol data unit protocol types may differ by having differing OSI physical layer media types, differing OSI link layer signaling protocols, and/or differing OSI network layer protocols.

A management apparatus is operatively coupled to each virtual switch to maintain information on an association between the plurality of data interfaces and the virtual switches. The management apparatus includes a controller dependent on the association information for limiting the processor of each virtual switch to only inserting the particular protocol data unit into an outgoing data stream on another data port associated with the same virtual switch which received the particular protocol data unit.

Further, it is desirable for the management apparatus to have a reassigning mechanism for changing a set assignment of a particular data interface such that the particular data port assignment can be moved between the virtual switching devices as needed (i.e., the data port can be moved).

Furthermore, it is necessary for the management apparatus to maintain a database of known destination identifiers and to require verification that the destination identifier in the particular protocol data unit is in the database prior to inserting the particular protocol data unit into an outgoing data stream on another data port such that delivery of the protocol data unit to an unknown destination identifier is prevented.

Each virtual switch processor preferably performs restructuring and/or monitoring operations on the particular protocol data unit. The restructuring operations include deleting, inserting, and/or replacing bits in the particular protocol data trait in accordance with the associated directive prior to inserting the particular protocol data unit into the outgoing data stream. The monitoring operations include dropping, sending, sending a copy of, and/or auditing the contents of the particular protocol data unit in accordance with the associated directive prior to inserting the particular protocol data unit into the outgoing data stream.

In accordance with a second aspect of the invention, a physical switching device for use in a communication network to switch protocol data units within the communication network on a shared communication medium is provided. The physical switching device includes at least a first and a second virtual switch which is similar to that which was described in the first aspect of the present invention; however, the management apparatus is different. This different management apparatus is a virtual link management apparatus which is operatively coupled to the virtual switches. The virtual link management apparatus maintains information on at least one virtual link between at least the first and the second virtual switches. The virtual link has a first end and a second end of a data path on the shared communication medium. Each end consists of a data port from the plurality of data interfaces in the physical communication network switch.

The first and the second virtual link end of the at least one virtual link preferably are in a different set of data ports assigned exclusively to the first and the second virtual switch, respectively, such that the virtual link provides a data path between the first and the second virtual switches on the shared communication medium. The first and the second virtual switches preferably are located in a single geographic location (i.e., within the same network hardware device rack) and the shared communication medium preferably is a memory shared between the first and the second virtual switches.

Alternatively, the first and the second virtual switches may be geographically remote from one another. In addition, the first and the second virtual link ends may be in a single set of data interfaces assigned exclusively to the first and the second virtual switches such that the virtual link provides a data path between the first and the second virtual switches on the shared communication medium across a geographic distance. In this alternative arrangement, the shared communication medium preferably consists of a high data transfer rate link between the first and the second virtual switches which spans the geographic distance.

In addition, a filter may be operatively coupled to the data path which filters protocol data units communicated in either virtual link data path according to an access policy that is separately specified in each virtual switch.

In accordance with a third aspect of the invention, a communication system which delivers OSI network layer protocol data units within a first and a second virtual closed user group on a shared communication medium is provided. The communication system includes a first virtual closed user group processor for examining and modifying data bits within a protocol data unit received from a member of the first virtual closed user group on the shared communication medium. Each member of the first virtual closed user group has a unique destination identifier. The first virtual closed user group processor includes a delivery mechanism for delivering the modified protocol data unit to another member of the first virtual closed user group.

The communication system also includes a second virtual closed user group processor which is similar to the first virtual closed user group processor. The second virtual closed user group processor examines and modifies data bits within a protocol data unit received from a member of the second virtual closed user group on the shared communication medium. Also, each member of the second virtual closed user group has a unique destination identifier. In addition, the second virtual closed user group processor includes a delivery mechanism for delivering the modified protocol data unit to another member of the second virtual closed user group.

A framer is operatively coupled to the first and the second virtual closed user group processors to maintain a database of all destination identifiers currently reachable for delivery of protocol data units within the communication system. This framer preferably requires verification that each destination identifier in a protocol data unit on the shared communication medium can be currently reached for delivery through a lookup in the database, prior to completing delivery of the protocol data unit to the associated destination identifier. The framer preferably further limits access to the database such that each virtual closed user group only has access to specific destination identifiers owned by that particular virtual closed user group so that a protocol data unit having a destination identifier which is not owned by the particular virtual closed user group will not be delivered.

Each virtual closed user group processor modifies and/or monitors protocol data units. The processor modifies data bits within a received protocol data unit by deleting, inserting, and replacing bits in the received protocol data unit prior to delivering the modified protocol data unit to another member of the same virtual closed user group. The processor monitors the received protocol data unit by dropping, sending, sending a copy of, and auditing the contents of the received protocol data unit prior to delivering the modified protocol data unit to another member of the same virtual closed user group.

In addition, each virtual closed user group processor preferably delivers the modified protocol data unit to another member of the same virtual closed user group without modifying the predetermined OSI physical layer, link layer, and network layer access protocols used to communicate protocol data units over the shared communication medium. This provides seamless integration of this closed user group functionality to LAN managers even though the LANs may be operating within a MAN as separate closed user groups. This lack of modification of the access protocols also has the advantage of enabling each virtual closed user group processor to allow any particular device capable of communicating on the shared communication medium (e.g., port with a destination identifier) to be a member of either virtual closed user group by having the framer means limit database access to destination identifiers associated with the particular device to a particular desired virtual closed user group.

The framer preferably also includes a mechanism for assigning incoming protocol data unit traffic to each virtual closed user group based on an access policy that is separately specified in each virtual closed user group.

In the preferred embodiment communication system operations of the first and the second virtual closed user group processor are performed by a first and a second virtual switch, respectively. Each virtual switch includes a decision mechanism for determining an associated directive based on a destination identifier within a particular protocol data unit received at a data port. In addition, each virtual switch includes a processor which performs the functions of the virtual closed user group delivery mechanism by inserting the particular protocol data unit into an outgoing data stream on another data port according to the associated directive to enable delivery of the protocol data unit to the destination identifier within the protocol data unit.

In an alternative embodiment to this third aspect of the present invention, the operations of the first virtual closed user group processor are divided between a first and a second virtual switch. This spreads the processing load between two virtual switches and takes into account typical communication system configurations which have many geographically separate physical switches devoted to the same closed user group.

In either embodiment, the first and the second virtual switches may be located within a single physical switching device. Both data ports for each virtual switch are then from a set of data interfaces in the physical switching device assigned exclusively to the same virtual switch.

Also in either embodiment, the first and the second virtual switches may be located within different physical switching devices. Both data ports for each virtual switch are then from a set of data interfaces in the respective physical switching devices which are assigned exclusively to the same virtual switch. As noted above, the different physical switching devices may geographically remote from one another.

Each data port may be either a data interface on a physical switching device, a time slot out of several time slots in a time-divided frame received at a data interface on a physical switching device, or a code divided cells out of several code divided cells received at at least one data interface on a physical switching device.

The physical switching device preferably is designed to accommodate data interfaces capable of manipulating different protocol types such that each set of data interfaces assigned to a virtual switch may include two or more data interfaces having mechanisms for manipulating protocol data units having different protocol types and the virtual switch is configured to switch protocol data unit coming from these data interfaces with different mechanisms. The differences in the protocol data unit data protocol types may include differing OSI physical layer media types, differing OSI link layer signaling protocols, and/or differing OSI network layer protocols.

Each virtual switch processor modifies and/or monitors protocol data units. The processor modifies data bits within a received protocol data unit by deleting, inserting, and replacing bits in the received protocol data unit prior to delivering the modified protocol data unit to another member of the same virtual closed user group. The processor monitors the received protocol data unit by dropping, sending, sending a copy of, and auditing the contents of the received protocol data unit prior to delivering the modified protocol data unit to another member of the same virtual closed user group.

In addition, the communication system may include a virtual link between the first and the second virtual switches. This virtual link consists of a first end and a second end of a data path on the shared communication medium, where each end is a data port in a different virtual closed user group. To enforce access policies a filter may be operatively coupled to the data path to filter protocol data units communicated in the data path.

This third aspect of the invention also can be implemented in a device-implemented method to deliver protocol data units within a first and a second virtual closed user group on a shared communication medium in a communication system. This delivery method includes examining and modifying data bits within a protocol data unit received from a member of the first virtual closed user group on the shared communication medium wherein each member of the first virtual closed user group has a unique destination identifier. In addition, data bits within a protocol data unit received from a member of the second virtual closed user group on the shared communication medium are examined and modified. Each member of the second virtual closed user group also has a unique destination identifier. Further, a database of all destination identifiers currently reachable for delivery of protocol data units within the communication system is maintained. Access to this database is limited such that each virtual closed user group only has access to specific destination identifiers owned by that particular virtual closed user group. Also, verification that each destination identifier in a protocol data unit on the shared communication medium is currently reachable for delivery through a lookup in the database is required prior to completing delivery of the protocol data unit to the associated destination identifier. Subsequently, the first virtual closed user group modified protocol data unit is delivered to another member of the first virtual closed user group after verifying that the first virtual closed user group member destination identifier is currently reachable. In addition, the second virtual closed user group modified protocol data unit is delivered to another member of the second virtual closed user group after verifying that the second virtual closed user group member destination identifier is currently reachable. This results in protocol data units having destination identifiers which are not owned by the particular virtual closed user group not being delivered anywhere.

Each examining and modifying process preferably includes modifying data bits within a received protocol data unit by deleting, inserting, and replacing bits in the received protocol data unit prior to delivering the modified protocol data unit to another member of the same virtual closed user group. Alternatively, each examining and modifying process may include monitoring the received protocol data unit by dropping, sending, sending a copy of, and auditing the contents of the received protocol data unit prior to delivering the modified protocol data unit to another member of the same virtual closed user group.

These device-implemented steps preferably are performed such that all predetermined physical layer, link layer, and network layer access protocols used to communicate protocol data units over the shared communication medium are preserved. In other words, no changes to protocol like IP, ATM, OC-12 or the like are necessary to implement the present invention, because these steps are seamlessly integrated with this access protocols. This seamless integration enables the addition benefit that any particular device capable of communicating on the shared communication medium can be a member of either virtual closed user group by performing an additional step of adding a destination identifier associated with the particular device to the database.

These device-implemented steps preferably also include a step of assigning incoming protocol data unit traffic to each virtual closed user group based on an access policy that is separately specified in each virtual closed user group.

In addition, the device-implemented steps may include a step of providing a virtual link between the first and the second virtual closed user group. The virtual link includes a first end and a second end of a data path on the shared communication medium. Also, each virtual link end includes a data port in a different virtual closed user group. A shared memory can be used as the shared communication medium to provide the virtual link. Alternatively, a high data transfer rate link which spans a geographic distance between the first and the second virtual closed user group can be utilized to provide the virtual link. A filtering process can be performed on the virtual link such that protocol data units communicated in the virtual link data path are filtered according to an access policy.

These and various other features as well as advantages which characterize the present invention will be apparent upon reading of the following detailed description and review of the associated drawings.

BRIEF DESCRIPTION OF THE DRAWINGS

FIGS. 9 and 10 are block diagrams showing an example of a purely segregated metropolitan network from a geographic and connectivity point of view, respectively, in accordance with the present invention.

DETAILED DESCRIPTION OF THE PREFERRED EMBODIMENT

Figure 1:
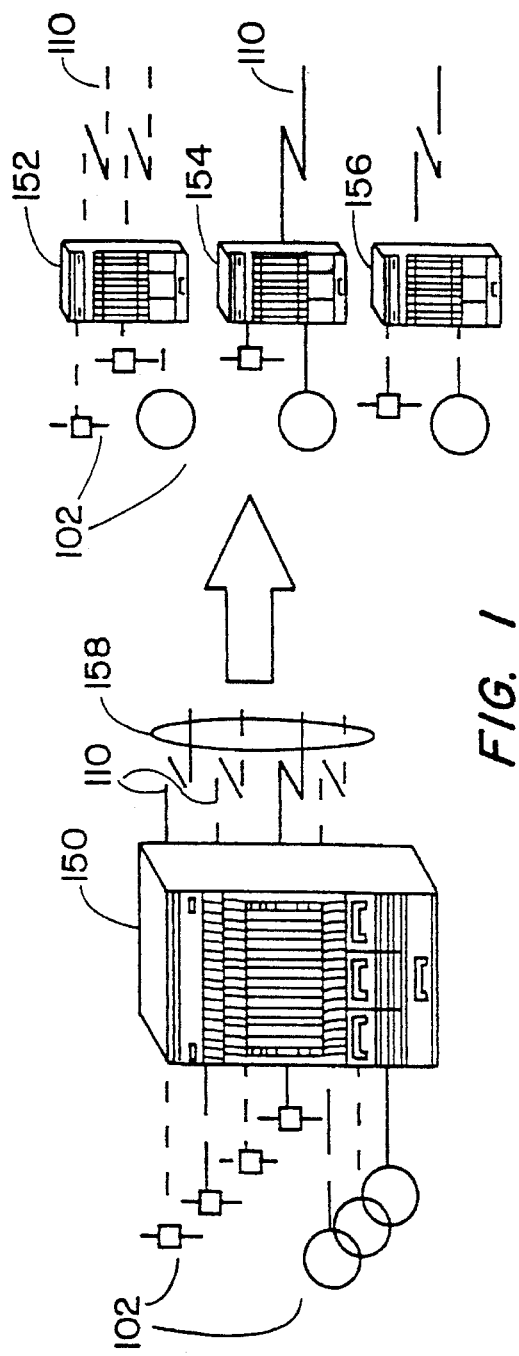
FIG. 1 is a block diagram of a preferred embodiment packet processing system in accordance with the present invention.

As will be appreciated by those skilled in the art, communication networks and their operations can be described according to the Open Systems Interconnection (OSI) model which includes seven layers including an application, presentation, session, transport, network, link, and physical layer. The OSI model was developed by the International Organization for Standardization (ISO) and is described in "The Basics Book of OSI and Network Management" by Motorola Codex from Addison-Wesley Publishing Company, Inc., 1993 (First Printing September 1992).

Each layer of the OSI model performs a specific data communications task, a service to and for the layer that precedes it (e.g., the network layer provides a service for the transport layer). The process can be likened to placing a letter in a series of envelopes before it's sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. For example, an automatic back teller transaction can be tracked through the multilayer OSI system. One multiple layer system (Open System A) provides an application layer that is an interface to a person attempting a transaction, while the other multiple layer system (Open System B) provides an application layer that interfaces with applications software in a bank's host computer. The corresponding layers in Open Systems A and B are called peer layers and communicate through peer protocols. These peer protocols provide communication support for a user's application, performing transaction related tasks such as debiting an account, dispensing currency, or crediting an account.

Actual data flow between the two open systems (Open System A and Open System B), however, is from top to bottom in one open system (Open bottom to top in the other open system (Open System B, the destination). Each time that user application data passes downward from one layer to the next layer in the same system more processing information is added. When that information is removed and processed by the peer layer in the other system, it causes various tasks (error correction, flow control, etc.) to be performed. The user is unaware of any of this, of course, but in fact that's what's happening while the words, "Please wait, your transaction is being processed" appears on the screen.

The ISO has specifically defined all seven layers, which are summarized below in the order in which the data actually flow as they leave the source:

Layer 7, the application layer, provides for a user application (such as getting money from an automatic bank teller machine) to interface with the OSI application layer. That OSI application layer has a corresponding peer layer in the other open system, the bank's host computer.

Layer 6, the presentation layer, makes sure the user information (a request for $50 in cash to be debited from your checking account) is in a format (i.e., syntax or sequence of ones and zeros) the destination open system can understand.

Layer 5, the session layer, provides synchronization control of data between the open systems (i.e., makes sure the bit configurations that pass through layer 5 at the source are the same as those that pass through layer 5 at the destination).

Layer 4, the transport layer, ensures that an end-to-end connection has been established between the two open systems and is often reliable (i.e., layer 4 at the destination "confirms the request for a connection," so to speak, that it has received from layer 4 at the source).

Layer 3, the network layer, provides routing and relaying of data through the network (among other things, at layer 3 on the outbound side an "address" gets slapped on the "envelope" which is then read by layer 3 at the destination).

Layer 2, the data link layer, includes flow control of data as messages pass down through this layer in one open system and up through the peer layer in the other open system.

Layer 1, the physical interface layer, includes the ways in which data communications equipment is connected mechanically and electrically, and the means by which the data move across those physical connections from layer 1 at the source to layer 1 at the destination.

The first and primary item in the Virtual Routing (VR) toolbox is the notion of a Virtual Router (i.e., virtual switch). Traditionally, multiprotocol bridge/routers have a single version of IP, bridging, IPX, etc. in operation, which coordinates the flow of traffic between all ports activated for the protocol. Single events on one incoming port can simply or profoundly affect the flow of traffic on other ports.

To implement virtual routers, object oriented software techniques are used to create separate instances of multiprotocol bridge/router code residing on the same router platform. Each operates independently of one another and is not directly aware of the existence of other virtual routers.

The simplest example of Virtual Routing consists of the case where the population of physical interfaces 102, 110 on the router 150 is partitioned among the Virtual Routers 152, 154, 156 running in the chassis as shown in FIG. 1. This is a software partitioning, which means that:

All management continues to be done through a single, possibly redundant control processor.

The partitioning of connectivity into Virtual Routers 152, 154, 156 is done on a per interface basis, rather than a per card basis. As we'll see later, the partitioning can be further refined to individual media destinations on selected media.

What this means is that, in a first step, an owner of the multiprotocol bridge/router 150 has now been given three routers 152, 154, 156 for the price of one. If they are servicing the needs of several organizations, the cost of a highly available and manageable enterprise router can be spread over several independent clients.

The cost savings in routers can be significant. However, over time the cost of wide area network services can dwarf the up front router equipment costs. The second step in Virtual Routing is to permit the media 158 to be shared in such a way as to give each Closed User Group the impression that they have a medium to themselves.

A solution can be provided for this problem through the use of remote groups. Remote groups are a means of sharing multipoint wide area networks among several Closed User Groups. This is done rather simply:

Multi-point WAN's such as Frame Relay, X.25 and ATM work with the concept that a media address is prepended to the message payload. This media header is used by the network to determine how the message shall be delivered. Switched networks such as ATM often have a prerequisite signaling process which determines the header to be used to reach a certain destination.

A multipoint WAN interface will remain informed of all the destinations which are currently reachable through the WAN. The WAN internals will refer to them through the media address in the header. The interface is free to send or receive messages from any of these active remote destinations.

The WAN software may be split into two portions: A Framer to maintain the state of the WAN connections, and a set of Remote Groups which are responsible for examining and processing the contents of the message. The Remote Group software more or less believes that it is the exclusive owner of the WAN interface; however the Framer only gives the Remote Group information on the specific media addresses owned by that group.

One of the virtues of Remote Groups is that it does not modify the protocols used to communicate over the shared medium in any way. Specifically, any device capable of talking to the medium can be a member of a Remote Group.

Figure 7:
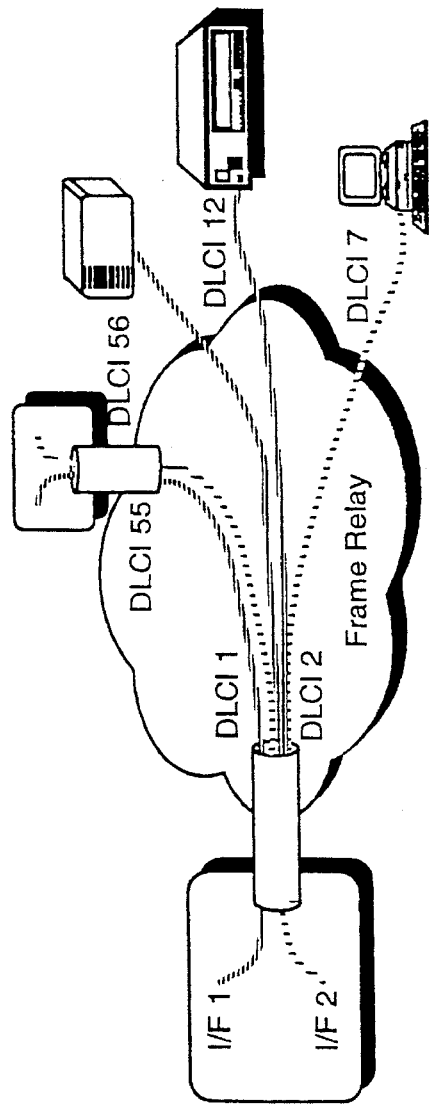
FIG. 7 is a block diagram showing a configuration of Remote Groups in accordance with the present invention.

The result of such a configuration of Remote Groups is shown in FIG. 7. A single multipoint WAN has been carved into several multipoint WAN's, each of which may be used to service the needs of a different community. The example Frame Relay network has been split into two independently operating networks. It will be appreciated by those skilled in the art that multiple telecommunication interfaces and local loops to the Frame Relay service could also have provided this connectivity, but at considerably greater expense (i.e., more hardware).

Most significantly, a single multipoint WAN has been taken and divided such that a subset of it is available to each of several Virtual Routers. The administrative isolation of Virtual Routers have now been extended from within a chassis to independently operating systems of routers sharing both common chassis and a media backbone.

So far the discussion has focused on techniques where groups can be entirely sealed from each other. However, there are reasons why these barriers should be partially torn down in the interests of better communications. Examples include:

Permitting access for certain protocol families. For example, Appletalk and IPX are not noted for scaling well over large domains, while IP does a good job of this. Virtual Routing permits the limited area protocols to run fully separately, while the two IP regions are interconnected.

Permitting certain applications to run. For example, many sites are comfortable receiving IP electronic mail traffic from any point, do not wish general access. If traffic moves between domains at a small number of constrained points it is easy to exercise policy at only those points rather than throughout the network.

More than anything else, when moving from one user group to another, a change in access policy can occur. Every group wants to define their own policy for accepting traffic each other group. Thus, a mechanism is needed not only to pass traffic between user groups, but also a means whereby the owners of each user group can define the filtering desired for packets leaving and entering the group.

Figure 8:
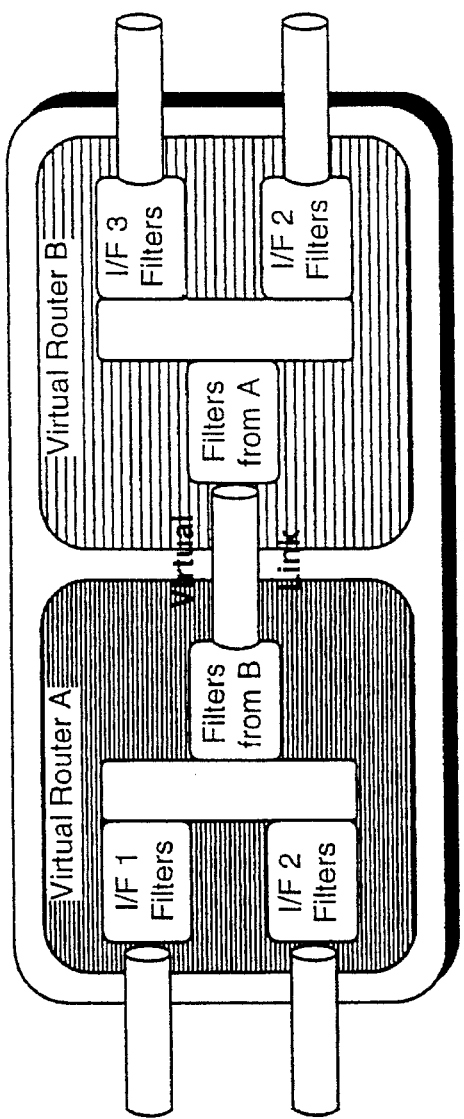
FIG. 8 is a block diagram showing a virtual link in accordance with the present invention.

As shown in FIG. 8, through the use of a networking medium Virtual Routers, which may be real, separate routers, can be connected. Within a chassis containing several Virtual Routers, a point to point link between two of these Virtual Routers can be defined which is a complete software artifact—each Virtual Router defines an interface (i.e., sometimes called a Protocol Port) that is one end of this Virtual Link "pipe". Messages inserted in one end of the pipe logically arrive at an incoming port of the other Virtual Router.

In addition to permitting the raw movement of traffic, Virtual Links permit protocol filters for traffic moving to and from the link. In fact, the filters on these links are often the most important in the design of a network, because a change from one network of routers and Virtual Routers to another coincides with a change in administrative policy as traffic moves from one domain to another.

Virtual Links are seen as point to point links by all networking protocols which reside in the unit. Thus, the Virtual Link can be used to carry IP, IPX, Appletalk and other internetworking traffic. Routing updates from protocols such as DECnet Routing will flow over the Virtual Link to update the routing tables on the other virtual router. This is the only way that the protocols in the separate Virtual Routers can communicate with each other, despite the fact that they run in the set of physical processors.

Forwarding data through a Virtual Link performs all the activity associated with an extra "hop" between two networks. Time to Live counts are decremented and all filters are applied as if it were a real link. However, since a Virtual Link is a software artifact the overhead is small; the forwarding algorithms are applied to the packet in succession when it arrives from an external medium, and it is not moved anywhere until an ultimate destination outside the box is found. Routes that involve packets progressing through multiple Virtual Links within the chassis are both possible and reasonable in complex configurations.

So far a service provider has been permitted to segregate traffic between customers but it is also necessary to manage this segregation. Since "Network Management" means too many different things to different people, a few terms should be defined for this discussion.

Surveillance consists of the act of monitoring the status of network entities. Modifications of network parameters must take place through other channels.

Provisioning consists of the act of modifying the configuration or operation of network equipment, either temporarily or permanently.

Data Privacy in this context means that the client has high assurance that other parties (other than the service provider) cannot intercept the user's data packets. Network Privacy means that the details of the customer's network operations are not available to other customers.

Security in this management context means that no act on the part of another customer, however malicious, will affect operations of the closed user group.

Also, two different techniques are available to survey and provision network equipment:

Simple network management protocol (SNMP), the Internet standard which has an assured place as the de facto technique for the management of all network equipment. SNMP is noted as being pretty effective for surveillance and light duty provisioning. Its limitations are that it cannot survey items specific to a vendor (such as chassis status) or perform massive provisioning (such as initial setup of the unit) without resort to vendor extensions.

CAS (Component Administration System). The internal network surveillance and provisioning system specific to Network Systems Corporation equipment.

Both have their complementary attributes; SNMP is an excellent platform for monitoring the health and status of a remote, network attached device. With the advent of SNMP Version 2, it has become suitable for "tweaking" devices through setting external parameters. A direct dialogue with CAS is better suited for wholesale changes in the configuration of the unit; CAS also permits access to the internal control features of a particular piece of network equipment which are not defined in the standard SNMP vocabulary.

To best take advantage of these complementary features, the following should be done:

Access through CAS has an omniscient view of the box. All components are available for inspection or alteration by properly authorized CAS users. Once a CAS user has read-only or modification rights on the chassis, all parameters of all virtual routers are available.

SNMP users work with a copy of SNMP which is part of their Virtual Router. Proper authorization permits one of two alternative views of the chassis. In "omniscient" mode, they perceive all interfaces in the unit and can modify their parameters. In "local" mode all interfaces are given an interface number for SNMP purposes, but the ones not owned by the virtual router will appear stubbornly offline regardless of their actual status. This permits the actual owner of the router access to the entire interface population, while Virtual Router clients have access to only their own internal interfaces.

SNMP based "core" configuration information not associated with interfaces, such as filtering, IP routing parameters, DECnet node addresses, etc. are only accessible from a host which can reach that Virtual Router. Since SNMP management requires IP, access to this core information requires a Virtual Link or other mechanism giving access to that Virtual Router.

Under no circumstances can an SNMP user modify the router variables for a virtual router other than their own. If such a facility is provided, it can either be done through CAS or by providing access to the SNMP stack of a "distant" Virtual Router through a Virtual Link.

To better understand these principles, the following examples are given.

A purely segregated metropolitan network, shown in FIGS. 9 and 10 will be the simplest example of the set, because the situation is simplest. A utility oriented company, Lightco, happens to own a large fiber optic cable plant that can be used to access local businesses. They choose to offer LAN interconnection services to these businesses as an additional revenue opportunity for themselves.

Because it is an existing proven technology and well suited for the cable plant, FDDI is chosen as the backbone medium. In the example, three enterprises are to be connected to a common FDDI metropolitan area network, with Points of Presence required at three different sites.

The routers at a site serving one client run a single Virtual Router (or one Real Router, if you like). The ones serving two clients run one Virtual Router for each client.

The advantages of Virtual Routing come into more into play when routing (e.g., incorporating public network access) becomes part of the picture. In the hypothetical example, connectivity to the Internet is offered through a drop at the Point of Presence (POP) of an Internet service provider. A Corp. wants unrestricted Internet access (or, more accurately, they will take responsibility for access within their own network). C Corp. wants mail access to a single machine on their network, and B Corp. is not interested in Internet access at all. How can these divergent needs be handled?

Figure 11:
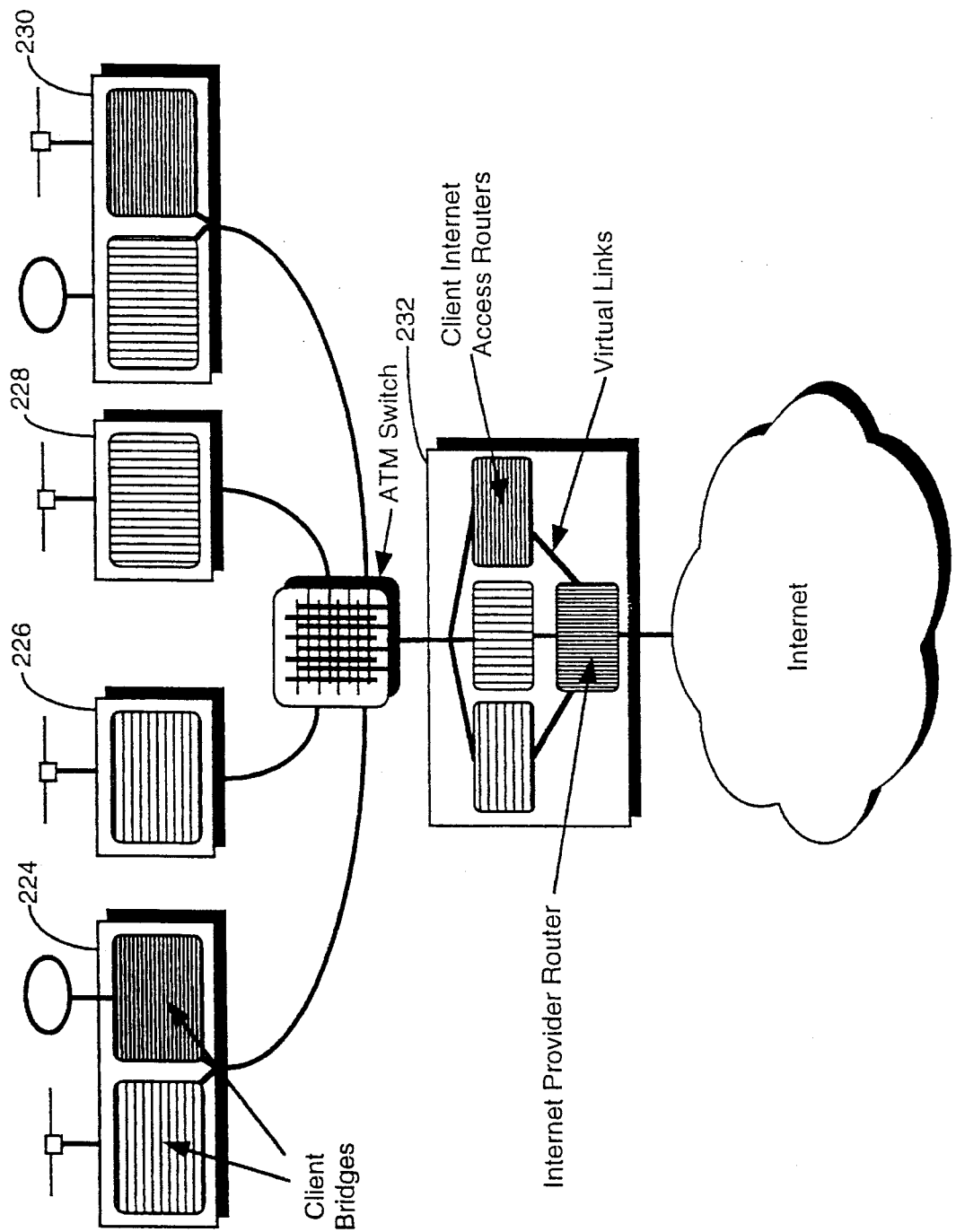
FIGS. 11 and 12 are block diagrams showing an example of a purely segregated metropolitan network having Internet from a physical connectivity, and customer's management view, respectively, in accordance with the present invention view, respectively, in accordance with the present invention.
Figure 12:
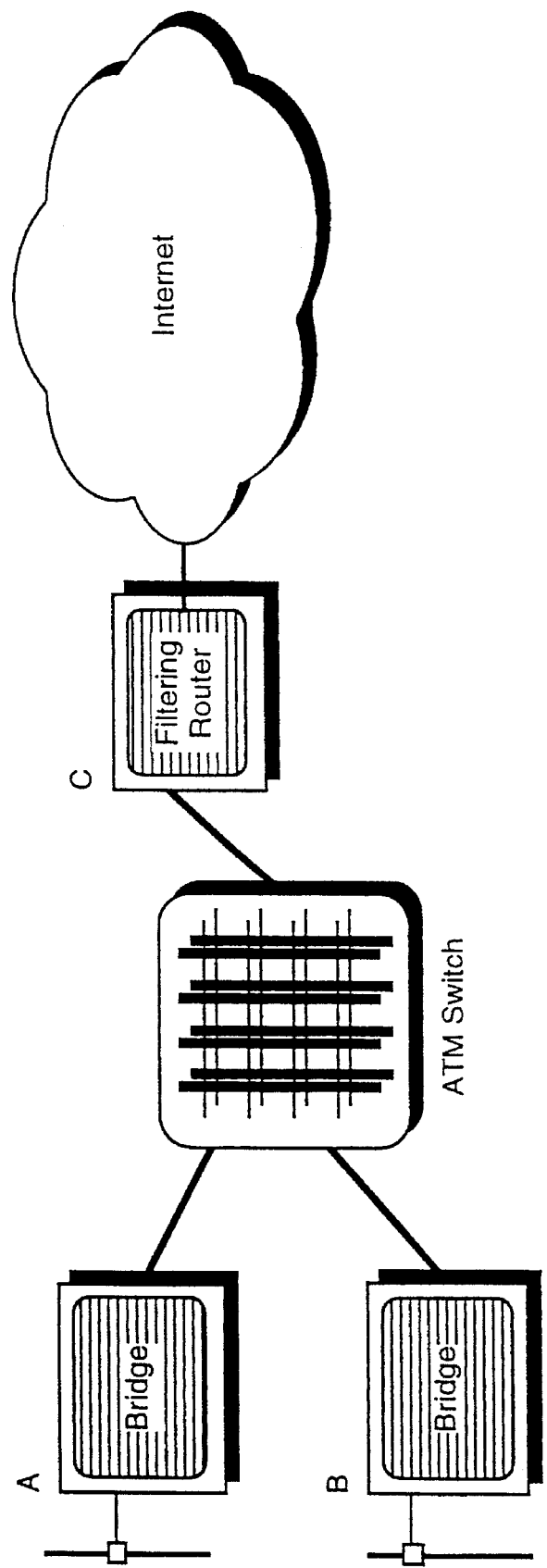

One solution is shown in FIGS. 11 and 12. Let us look at the noteworthy items in this new configuration:

The FDDI backbone has been replaced with an ATM backbone. The customer is oblivious to the change (other than by examining the unit internals through network management). For simplicity, Permanent Virtual Circuits (PVC's) are employed in this metropolitan ATM network. One PVC must be established between every pair of virtual routers that wish to communicate. For example, chassis 224 will require four PVC's. One to the chassis' 224 B Corp. virtual router to the chassis 226, one from chassis 224 A Corp. virtual router to the chassis 230, and one each from the each chassis 224 virtual router to each customer's Virtual Router on the chassis 232.

Each Virtual Router in the chassis 232 is probably administered by the Internet service provider, where they offer the customer the right to inspect the current statistics of that router via SNMP. That Virtual Router takes traffic off the ATM network and performs IP routing on it. That Virtual Router has a single other port with an IP address indicating it belongs on the distribution LAN at the Internet Service provider's POP.

Each Virtual Router serves as a mechanism to filter packets according to the customer's expectations.

For A Corp., filters are installed which permit unlimited access to one specific IP address, and default filters deny Telnet, rlogin, FTP, etc. access from the Internet to all other hosts.

For the more paranoid C Corp., all IP packets directed from the Internet to all hosts but one are denied. On that single host, packets for Simple Mail Transfer Protocol (SMTP) Domain Name Service, and Internet Control Message Protocol (ICMP) are permitted to pass.

Figure 13:
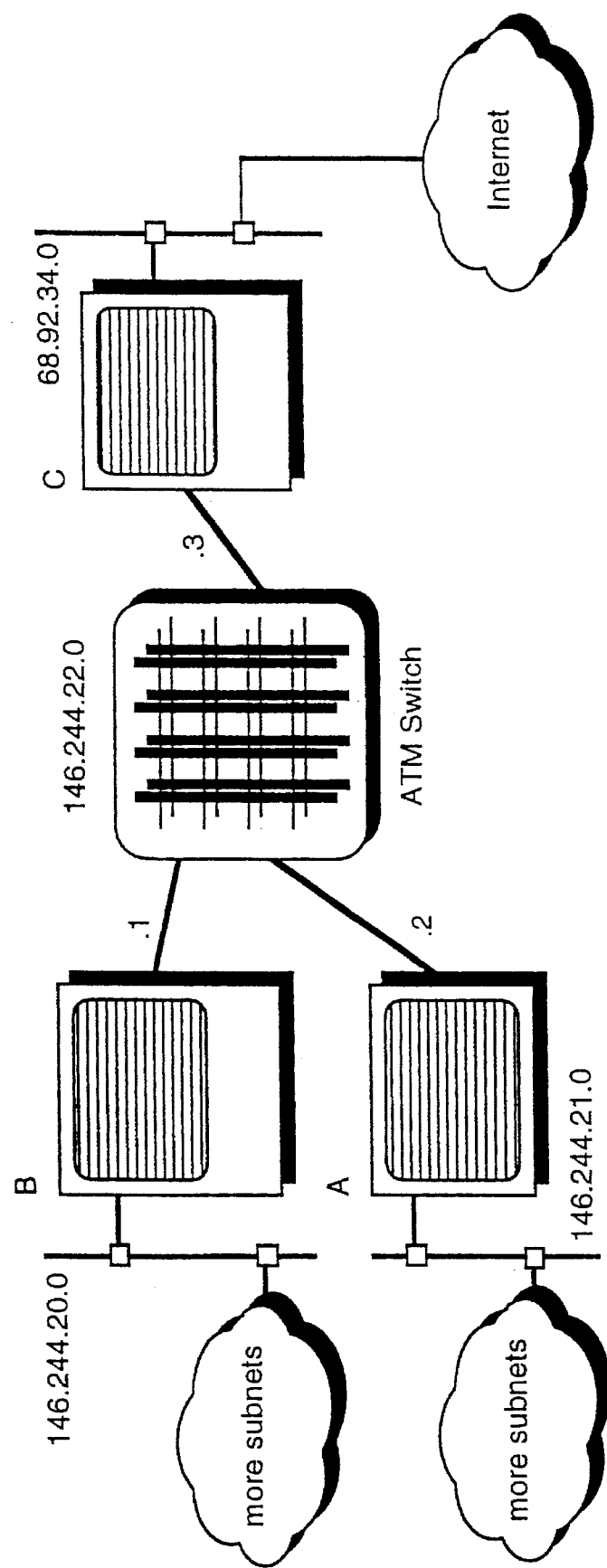
FIG. 13 is block diagram showing an extension of the example shown in FIGS. 11 and 12 of a purely segregated metropolitan network having Internet which also wants to provide Internetworking Service in accordance with the present invention.

Again taking the physical examples above, the technologically progressive A Corp. chooses to switch to a routed backbone as shown in FIG. 13, rather than the bridged backbone in the previous examples. For simplicity, it is assumed that they want to route IP while continuing to bridge "other" traffic. Very little needs to change from the previous example. Steps have already been taken as needed to segregate A Corp.'s traffic from all others, so all that is needed is to concentrate on A Corp.'s concerns within their virtual routers. Thus, if we look at A Corp.'s virtual network in isolation, perhaps giving the situation shown in FIG. 13. The ATM PVC's and bridging parameters stay the same— only IP is activated for the ports on and off the ATM MAN. Open Shortest Path First (OSPF) or Routing Information Protocol (RIP) is run in each of the virtual routers so that automatic route discovery may take place.

This means that the entire idea is that things become simple at this level once virtual routing is in place. It should be noted what has been done in IP terms:

The MAN carrier has isolated the proper portion of their connectivity plant and given it to the customer. The customer is free to assign a subnet that they own to this segment, permitting a routed IP network to be used to interconnect the many subnets which presumably lie at each site. This feat can be duplicated for any desired number of routing customers.

The three routers are SNMP visible to the customer. Given proper authority, they may alter parameters which are settable via SNMP. Since they are isolated to their Virtual Routers the privacy and integrity of other customer's data is unaffected.

Routers supporting traffic for several customers must be routers with Virtual Networking. Routers to service a single customer can be of any make offering suitable connectivity.

The ATM backbone is visible to the customer as an ATM network. If the MAN carrier has a more complex backbone than that, FDDI can be disguised such that the internals of the MAN plant from the customer and have it appear as a "cloud". Native ATM transfers may take place from the same router to service the needs of different customers.

Finally, it should be noted that this more sophisticated customer is using routers of their own as a gateway between their numerous LAN's and the metropolitan access node. A metropolitan service provider which feels up to handling the administrative work might consider offering multiple LAN connections to the user at each site, where traffic is routed between the LAN's at little incremental expense to the client. Since all these LAN's belong to the same Virtual Router, the generally unlimited access policies that exist within a site can be followed while continuing to prohibit access to other clients, even if they share the same physical router. Pricing of such a service has to be aimed so that it is cost effective for the client to not purchase and administer their own router.

So far several cases have been covered where there is an easily well defined vendor and customer relationship between the administrators and users of virtual routing. However, similar situations arise in single organizations where the constituents have differing needs and priorities. This is also known as enterprise networking with divisional autonomy and is shown in FIGS. 14, 15, 16, and 17 from a physical, network topology, virtual routing, and consolidated router point of view, respectively. For example:

Corporations or government agencies with a highly decentralized structure, where each division really wanted its "own" network.

Regional networking cooperatives which maintain a Wide Area Network to be shared by its constituent members.

Let us look at a Corporate problem to see how Virtual Routing techniques may address these issues. For the last example, the case of the recently merged Alpha and Beta divisions of MegaCorp having come to cohabit the same campus. The networking group and the expensive wide area network are run by MegaCorp corporate, but the fiercely independent divisions wish to be isolated from each other. They offer reasons a management consultant might find both good and bad for wanting to do so:

Both have retained their own computer support people who install hosts, servers, and wiring hubs in their respective departments. These people and their managers have gracelessly conceded to a common WAN and campus backbone, but staunchly resist attempts to control how "their" hosts will talk within the division.

For historical reasons, both have different IP network numbers assigned to them.

The Alpha group once paid for a fiber optic connection between two buildings which they will use in preference to the (slower) company routed backbone. They want to use the backbone as backup for their private link, however.

Both run small pockets of Netware (IPX) applications scattered throughout their empires. Hosts have been known to inadvertently access the other division's servers, which was patched up through an elaborate, fragile series of bridge filters.

Both are large Appletalk users, but have no reason to permit Appletalk interconnection.

E-mail is commonly sent between both divisions and Corporate, and there are IP based servers in each which are used to archive information the other division might want or need.

Both want Internet access through Corporate. They will determine access policy to the Internet within their division.

Figure 14:
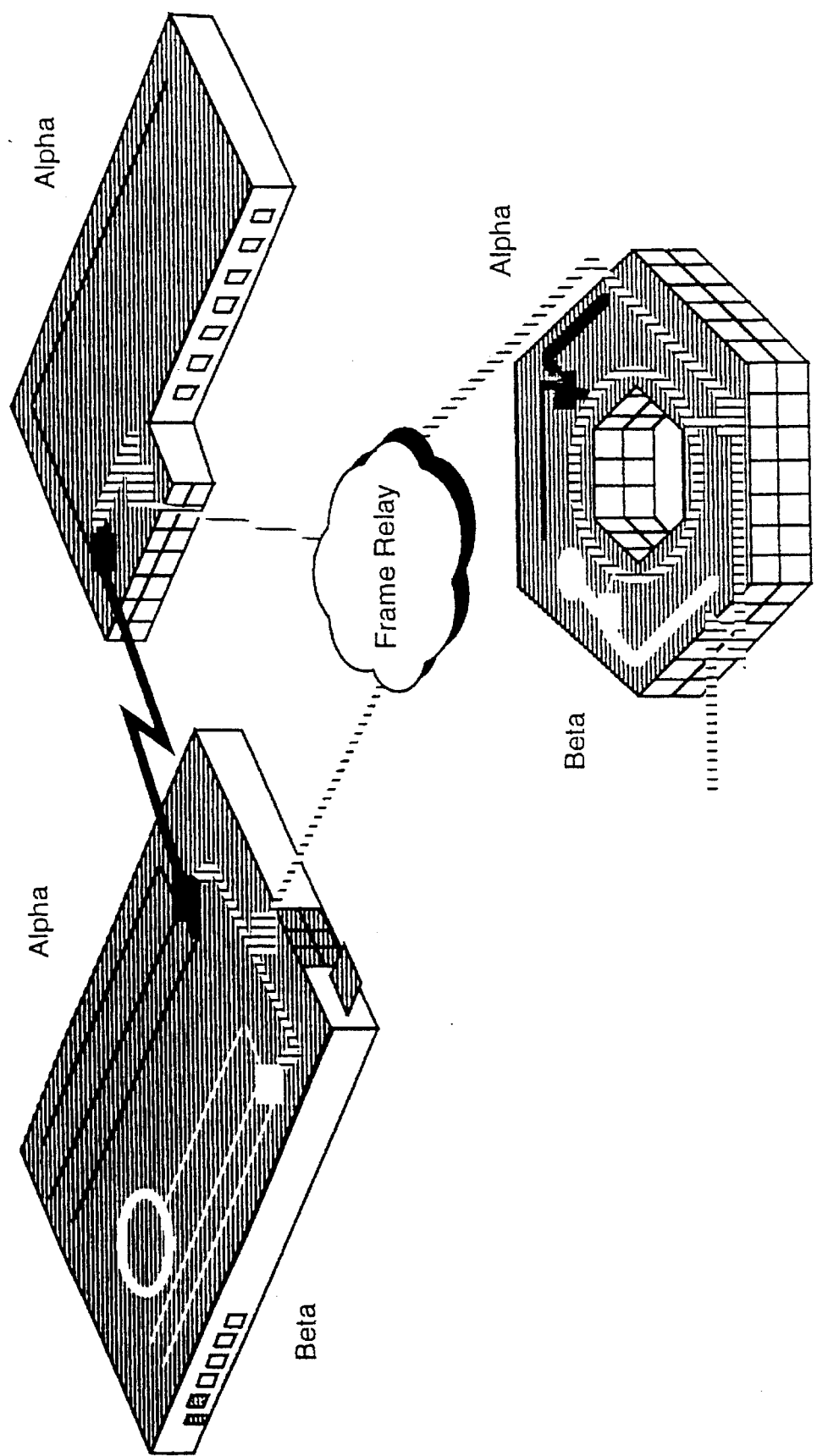
FIGS. 14, 15, 16, and 17 are block diagrams showing multiple virtual networks within an enterprise from a physical, network topology, virtual routing, and consolidated router point of view, respectively, in accordance with the present invention.

To give the problem a tangible feel and a sense of reality, an illustration of the physical systems is shown in FIG. 14.

There are number of ways to solve these problems. The simplest is the "brute force" approach, where in fact separate network plants are provided for each of our client customers and explicit, physical connections are built between them. One example is shown in FIG. 14. Some of the virtues of this configuration include:

- The Appletalk and IPX problem is solved neatly. IP is routed and a Mac layer bridging is used for everything else. Turning on Appletalk or IPX routing in each separate network will present no difficulties if either group independently decides they would prefer to route these protocols.
- The fiber link remains the property of Alpha, while the Frame Relay network will continue to work in a pinch.
- The vexing IP subnetting rule that you must stay within a subnet to reach any point on it is eliminated. There are entirely separate Frame Relay nets, each with a subnet owned by the separate division.
- IP filtering between the two networks is easy to administer. All data moving between the two network arrive at the Corporate router, who halts non-IP traffic and administers policy on the combination of Internet and other division traffic that will enter each divisional domain.

So why not do it this way? To do it the "brute force" way with conventional bridge routers, 5 Frame Relay local loops are needed instead of 3 and 6 Backbone and corporate routers are needed instead of 3.

With a lot of tinkering on "classic" bridge/routers, the ingenious corporate network planner might be able to accommodate these people with a single backbone and some filtering. However any changes will have the habit of bringing the entire house of cards down, causing long service times on the core routers and frequent complaints following maintenance. Clearly a more controllable scheme is desired. A solution involving the construction of a set of filters on a "Brand X" bridge/router which meets the user requirements should be readily understood by those skilled in the art so it will not be provided here.

Figure 15:
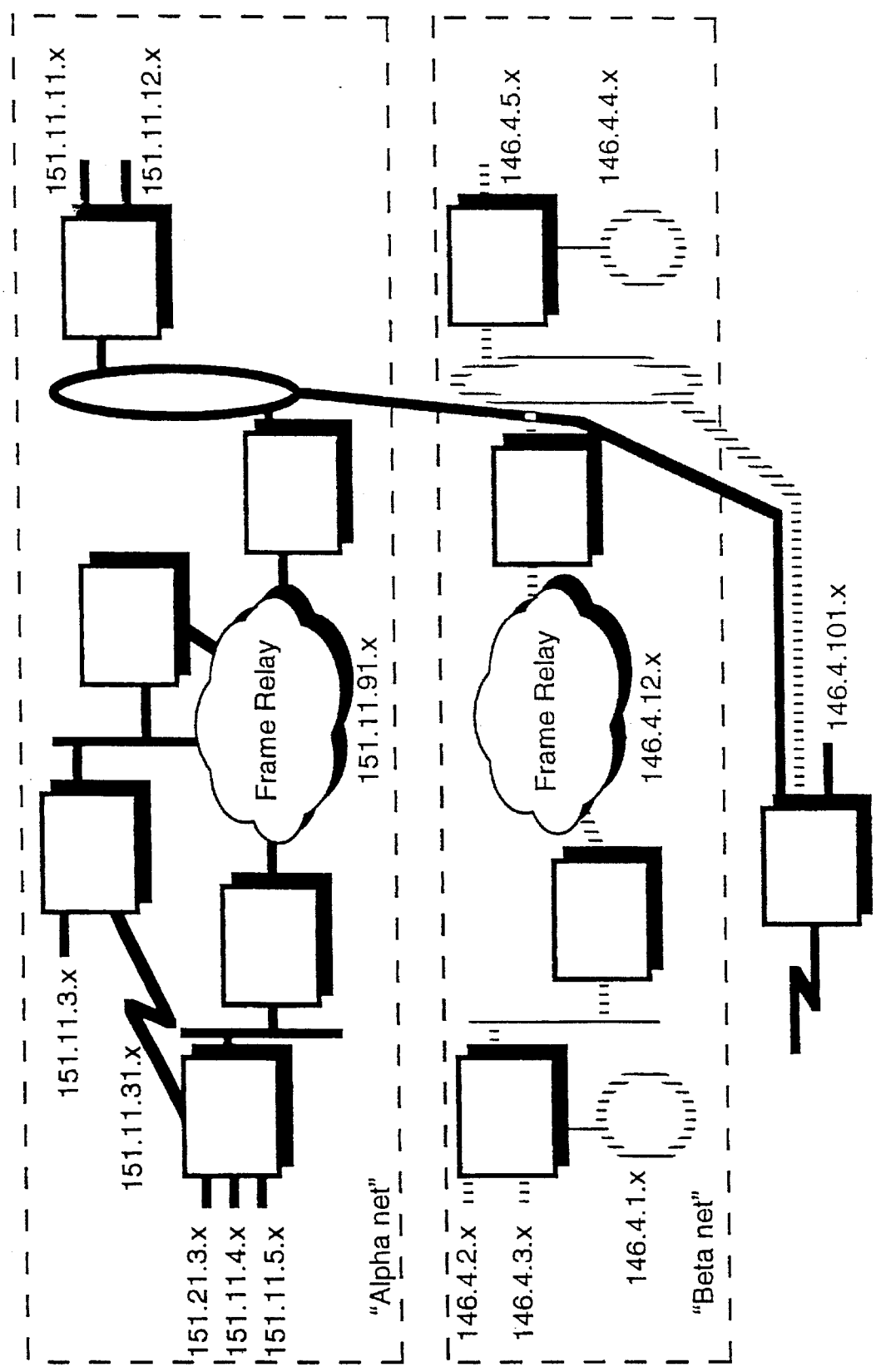
Figure 16:
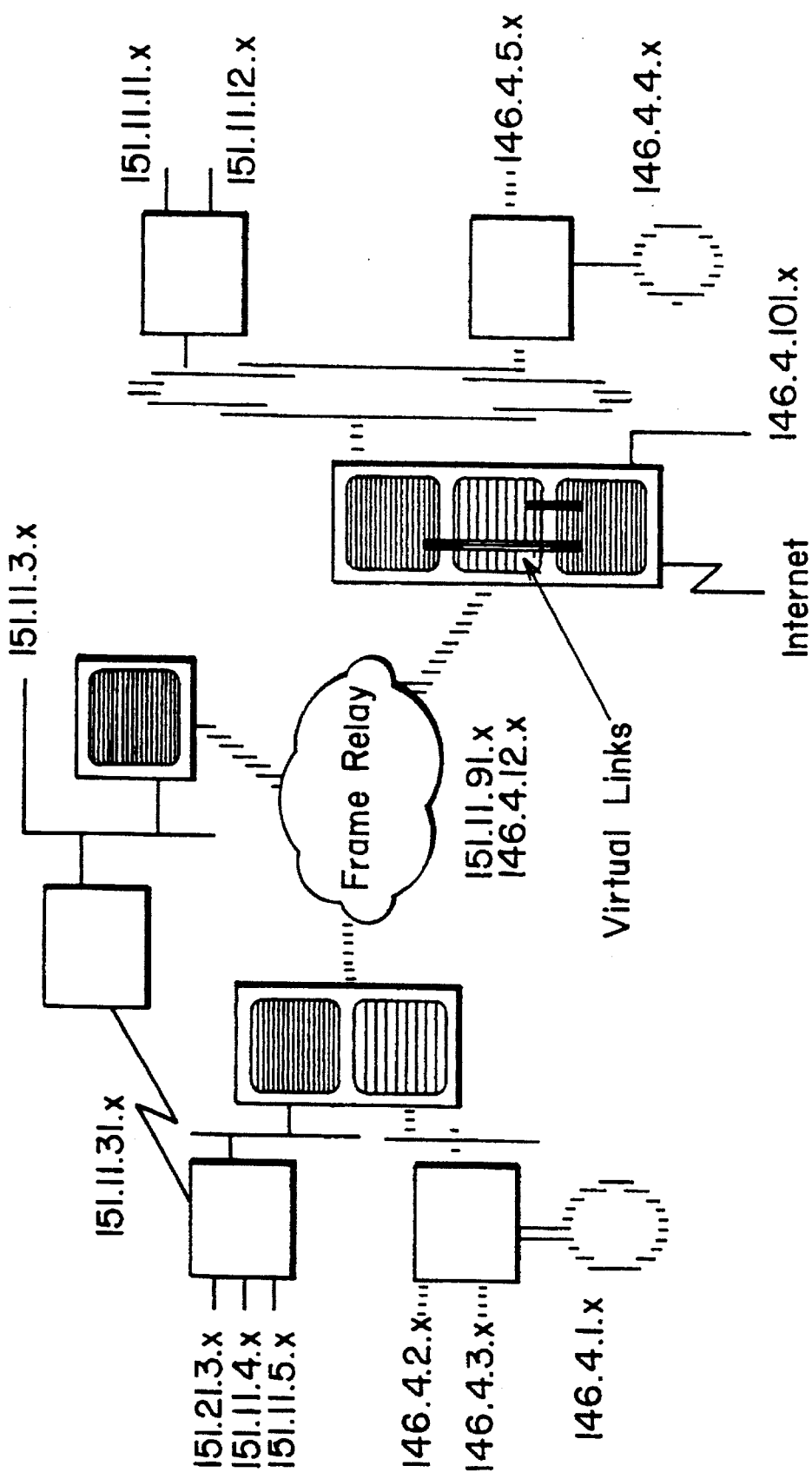
Figure 17:
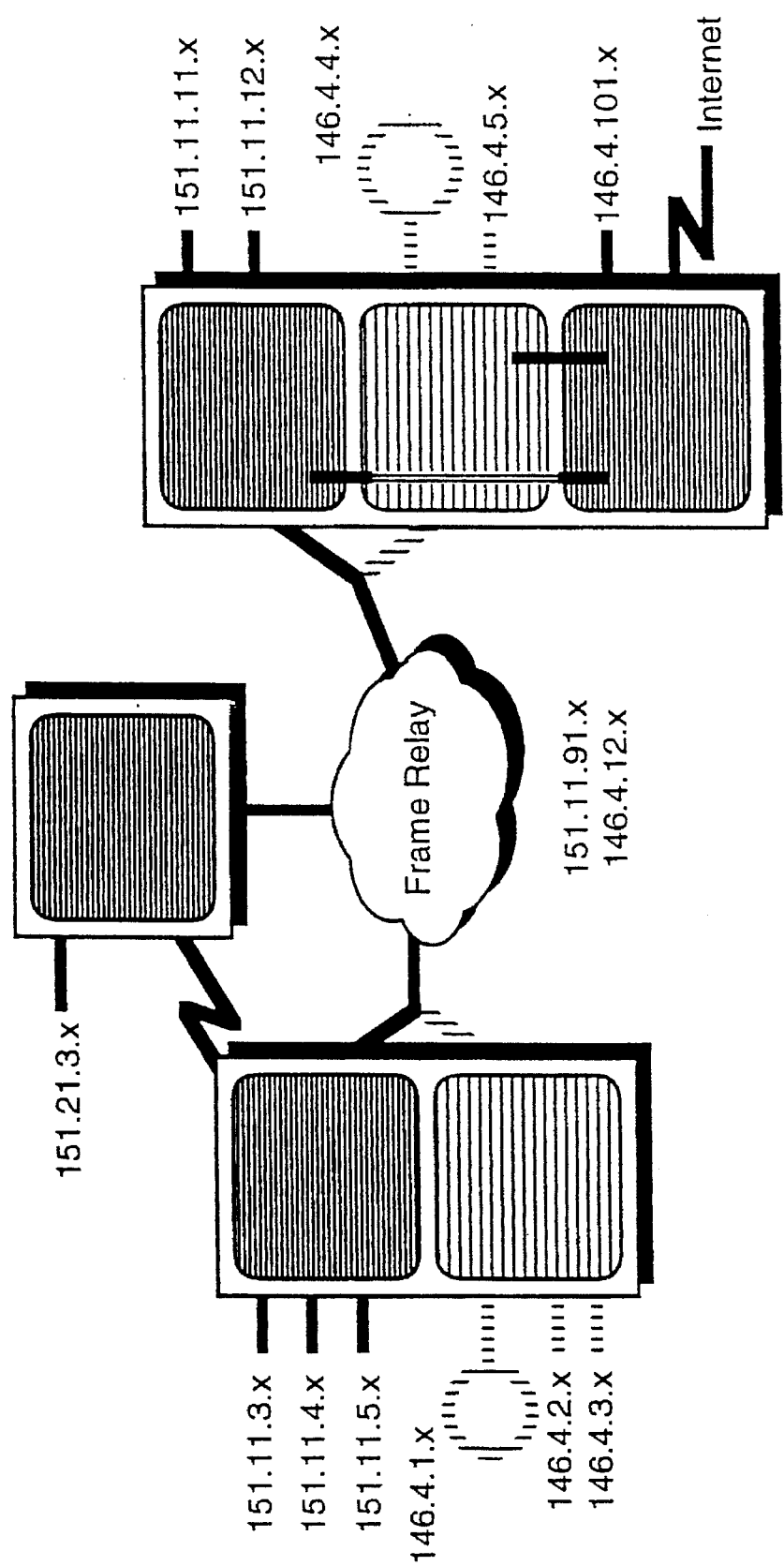

Using Virtual Routers, a solution to this complex problem becomes more elegant. If the "brute force" configuration is referred to again and viewed from a network topology view as shown in FIG. 15 and reconfigure it in a Virtual Routing environment where the backbone routers are physical routers capable of virtual routing. The result is shown in FIG. 16. This particular "brute force" configuration was deliberately chosen among several brute force options to more easily illustrate the present invention; however, one of ordinary skill in the art will appreciate that these principles can be applied to any "brute force" solution provided they are properly reconfigured into a virtual routing scheme.

Several interesting things are apparent about this configuration, including:

- The brute force configuration had 6 backbone routers; now only one at each physical site is used.
- There is one Frame Relay connection and local loop per physical site.
- The FDDI ring at Corporate has been changed so that traffic for both Alpha and Beta can flow over it.
- Connectivity between the different divisions takes place through Virtual Links within the backbone router at Corporate. Filters on the Virtual Links are used to enforce access policy.
- The Corporate network lies within a Virtual Router of its own, for administrative convenience.

Even the network shown in FIG. 16 contains more equipment than is strictly necessary. Note that multiple routers are still present at each site; one for the "backbone" and one which is owned by the maintenance personnel of each division. If these disparate network management groups become sufficiently trusting (or consolidated) that they can be persuaded simply to leave other Virtual Routers alone when configuring their network, then the configuration can be reduced to the consolidated block diagram shown in FIG. 17. To reach this configuration, the redundant routers have been eliminated and the Corporate FDDI ring has been replaced with a set of fiber optic repeaters.

Now different groups share the same router and exercise their different concerns. Is such mutual trust warranted? Again, this brings up the difference between security and integrity—integrity against unintended alterations since each group is dealing with an independent set of IP protocol stacks, management software, and interfaces, and they have no excuse to tinker with those belonging to others. Their interests only conflict when modifying the physical health of the common Frame Relay network they share. However, security is not provided in that one group is not immune from the malicious intent of the other.

Hopefully, these example have shown that there is a new networking problem beginning to emerge-the problem of networking networks, rather than networking hosts as in the past. Just as peer to peer host networks required a different model of what networks were about at the time if its introduction, the interconnection of networks also requires new tools and approaches to be properly implemented.

With the tools discussed above and further discussed below in detail, the present invention provides solutions for this new problem. Additional tools will be required in the future to accommodate exciting new technologies such as wireless, public networks for mobile computing; however, with the proper foundations provided by the present invention it should be readily understood how to deal with such new technologies as they are developed and implemented in the data networking environment.

Referring to once again to FIG. 1, a preferred embodiment of the present invention which provides a packet processing system 150 which contains virtual switches 152, 154, and 156 within physical switching systems 150 that direct the flow of protocol data units into inbound interfaces 102 and out of outbound interfaces 110 in a data communication network is shown. This is similar to the partitioning of a large shared network hard disk into several disk partitions and restricting access by different users to different partition. For example, a 750 Megabyte hard drive can be partitioned into three 250 Megabyte partitions. Further, each partition can be password protected so that only users which know the correct password have access to that hard disk partition. All members of a Closed User Group would know the correct password for the partition assigned to that Closed User Group and no one outside of that group would know the correct password.

In a similar manner, the present invention uses Closed User Groups to provide access to a shared medium data path 158. This access is accomplished by providing protocols, algorithms, and bridge/router architectural designs that are capable of processing packets at multi-gigabyte rates while maintaining appropriate access policies and/or network security measures. By using all of these principles, the present invention reduces the cost of providing these packet switching services by enabling a single physical data switch 150 to be divided into two or more virtual switches 152, 154, and 156 which individually process packets from different Closed User Groups. With reference to the hard disk partitioning analogy, the following present invention detailed description provides a set of operating techniques, device architectures, and constraints necessary for partitioning a communication network switch, like a hard disk, so that different Closed User Groups can have access to different partitions (i.e., virtual switching devices) while ensuring that access to the different partitions is limited to members of the Closed User Groups.

Figure 2:
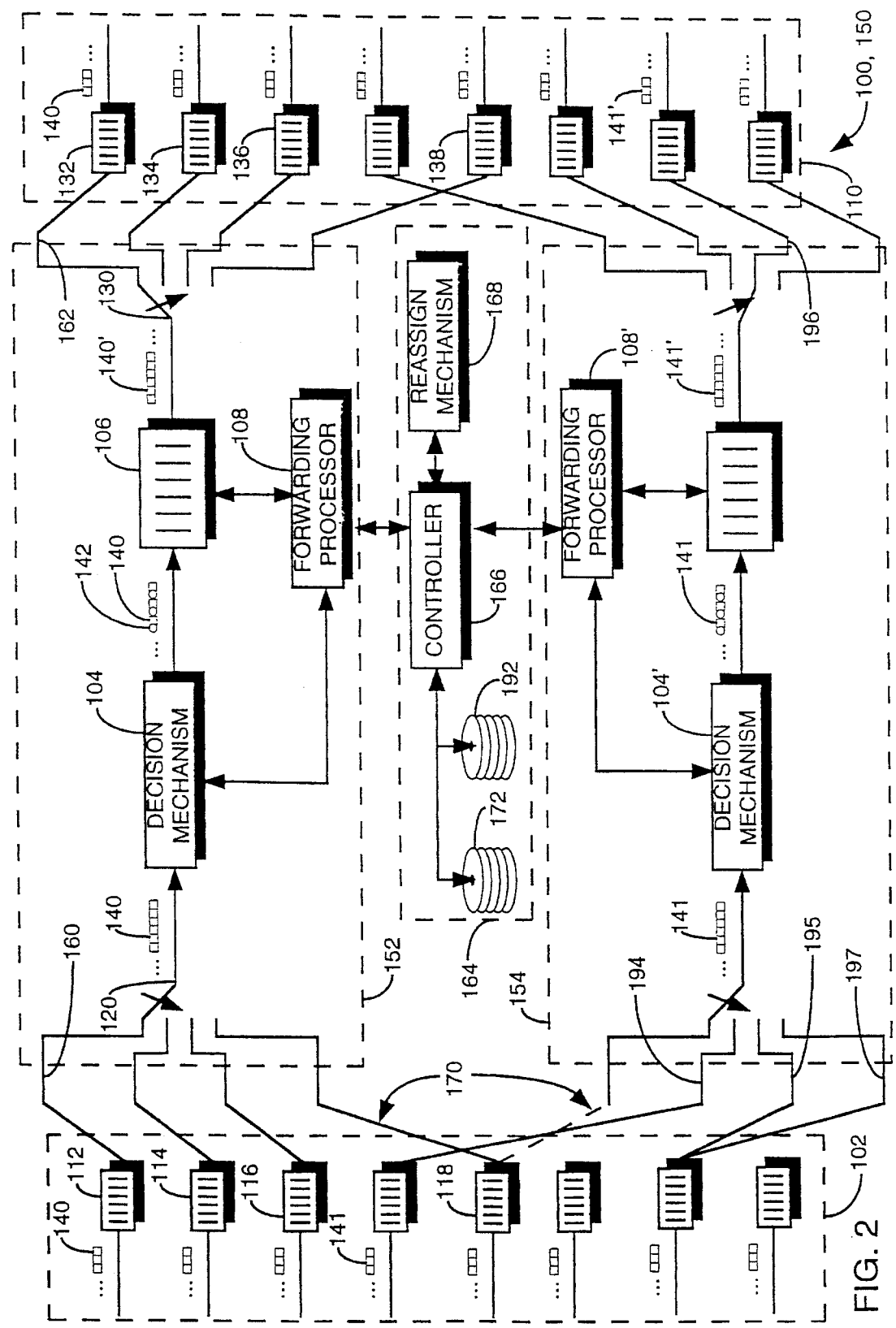
FIG. 2 is a block diagram of a preferred embodiment physical switching device having virtual switches in accordance with the present invention.

In a preferred embodiment of the present invention shown in FIG. 2, a physical switching device 150 for use in a communication network to switch OSI network layer protocol data units within the communication network is provided. The physical switching device 150 includes at least a first 152 and a second 154 virtual switch. Each virtual switch 152, 154 includes a decision mechanism 104 for determining an associated directive based on a destination identifier within a particular protocol data unit 140 received at a data port 160. A processor 108 is operatively coupled to each virtual switch 152, 154 to insert the particular protocol data unit 140 into an outgoing data stream on another data port 162 according to the associated directive to enable delivery of the protocol data unit 140 to the destination identifier. These data ports 160, 162 are associated with a set of data interfaces 112, 114, 116, 118, 132, 134, 136, and 138 selected from a plurality of data interfaces in a physical communication network switch 150. The set of data interfaces 112, 114, 116, 118, 132, 134, 136, and 138 is assigned exclusively to a unique virtual switching device 152. These data ports 160, 162 can take many forms, including but not limited to, a data interface 112 on the physical switch 150, a time slot out of several time slots in a time-divided frame received at a data interface 112 (e.g., an FDDI time multiplexed optical fiber) on the physical switch 150, and a code divided cell out of several code divided cells received at one or more data interface 112 (e.g., in ATM cells may be sent over several different paths and reassembled in a sequence based on a cell identifier within the cell header information) on the physical switch 150. In addition, two or more data ports 195 and 197 can be associated with one or more data interfaces and retrieve protocol data units from the data interface data stream for each data port 195 and 197 based on unique attributes (e.g., destination identifiers) associated with a particular data port.

The physical switching device 150 preferably is designed to accommodate data interfaces of differing types such that the set of data interfaces assigned to a virtual switch 152 may include a first data interface 114 which manipulates a protocol data unit having a different protocol type from a second data interface 116 such that protocol data units of different protocol types can be switched within a single virtual switch 152. The different protocol data unit protocol types may differ by having differing OSI physical layer media types, differing OSI link layer signaling protocols, and/or differing OSI network layer protocols.

A management apparatus 164 is operatively coupled to each virtual switch 152, 154 to maintain information on an association between the plurality of data interfaces and the virtual switches. The management apparatus 164 includes a controller 166 dependent on the association information for limiting the processor 108 of each virtual switch 152, 154 to only inserting the particular protocol data unit 140 into an outgoing data stream on another data port 162 associated with the same virtual switch 152 which received the particular protocol data unit 140.

Further, it is desirable for the management apparatus 164 to have a reassigning mechanism 168 for changing a set assignment of particular data interface 118 such that the particular data interface assignment 170 can be moved between the virtual switching devices 152 and 154 as needed (i.e., the data port 160 can be moved).

Furthermore, it is necessary for the management apparatus 164 to maintain a database 172 of known destination identifiers and to require verification that the destination identifier in the particular protocol data unit 140 is in the database 172 prior to inserting the particular protocol data unit 140 into an outgoing data stream on another data port 162 such that delivery of the protocol data unit 140 to an unknown destination identifier is prevented.

Each virtual switch processor 108 preferably performs restructuring and/or monitoring operations on the particular protocol data unit 140. The restructuring operations include deleting, inserting, and/or replacing bits in the particular protocol data unit 140 in accordance with the associated directive prior to inserting the particular protocol data unit 140 into the outgoing data stream. The monitoring operations include dropping, sending, sending a copy of, and/or auditing the contents of the particular protocol data unit 140 in accordance with the associated directive prior to inserting the particular protocol data unit 140 into the outgoing data stream.

Figure 3:
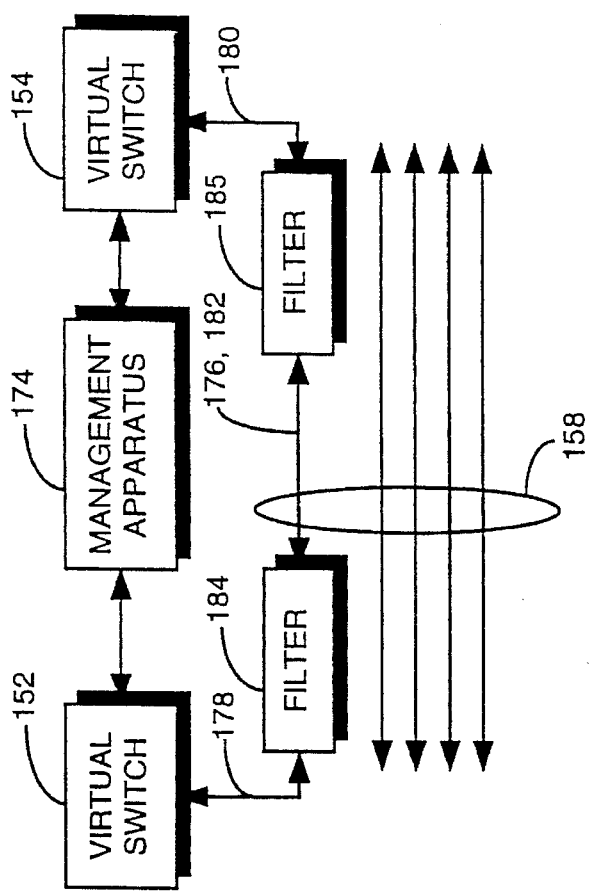
FIG. 3 is a block diagram of an alternative preferred embodiment physical switching device which has a virtual link in accordance with the present invention.

In accordance with an alternative embodiment of the present invention shown in FIG. 3, a physical switching device 150 for use in a communication network to switch protocol data units within the communication network on a shared communication medium is provided. The physical switching device 150 includes at least a first 152 and a second virtual switch 152 which is similar to that which was described in the preferred embodiment of the present invention; however, the management apparatus is different. This different management apparatus is a virtual link management apparatus 174 which is operatively coupled to the virtual switches 152, 154. The virtual link management apparatus 174 maintains information on at least one virtual link 176 between at least the first 152 and the second 154 virtual switches. The virtual link 176 has a first end 178 and a second end 180 of a data path 182 on the shared communication medium 158.

The virtual link 176 provides a data path 182 between the first 152 and the second 154 virtual switches on the shared communication medium 158. The first 152 and the second 154 virtual switches preferably are located in a single geographic location (i.e., within the same network hardware device rack) and the shared communication medium 158 preferably is a memory shared between the first 152 and the second 154 virtual switches.

Alternatively, the first 152 and the second 154 virtual switches may be geographically remote from one another. In addition, the first 178 and the second 180 virtual link ends may be in a single set of data ports assigned exclusively to the first 152 and the second 154 virtual switches such that the virtual link 176 provides a data path 182 between the first 152 and the second 154 virtual switches on the shared communication medium 158 across a geographic distance. In this alternative arrangement, the shared communication medium 158 preferably consists of a high data transfer rate link between the first 152 and the second 154 virtual switches which spans the geographic distance.

In addition, filters 184 and 185 (associated with virtual switch 152 and 154, respectively) may be operatively coupled to the data path 182 which filters protocol data units communicated in the virtual link data path 182. Each filter 184 or 185 performs filtering operations according to one access policy out of a plurality of access policies that are separately specified for each virtual switch.

Figure 4:
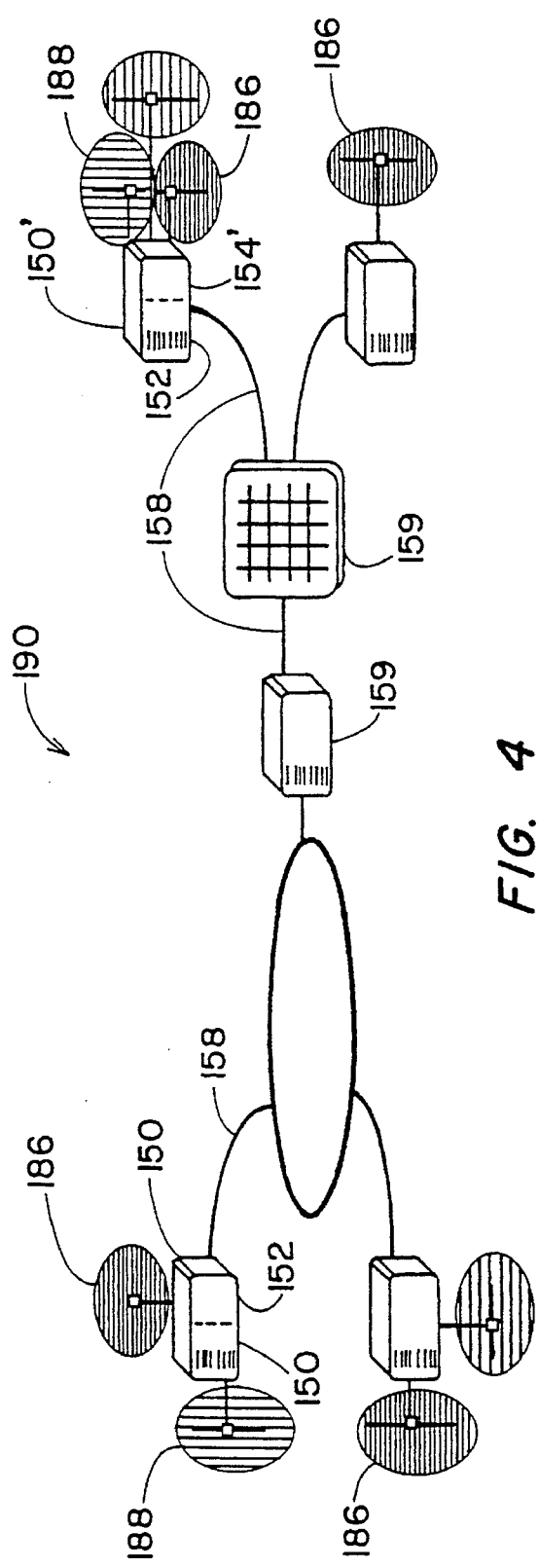
FIG. 4 is a block diagram of another alternative preferred embodiment having virtual closed user groups in accordance with the present invention.

The present invention may also be described in reference to yet another preferred embodiment shown in FIGS. 2 and 4. Referring to FIG. 4, a communication system 190 which delivers OSI network layer protocol data units within a first 186 and a second 188 virtual closed user group on a shared communication medium 158 is provided. It will be noted that the shared communication medium 158 may include a variety of physical communication media (as shown in FIG. 4), in addition to other intermediate network bridges, routers and the like. The communication system 190 includes a first virtual closed user group processor 152 for examining and modifying data bits within a protocol data unit received from a member of the first virtual closed user group 186 on the shared communication medium 158. Each member of the first virtual closed user group 186 has a unique destination identifier. As shown in FIG. 2, the first virtual closed user group processor 152 includes a delivery mechanism 108 for delivering the modified protocol data unit 140' to another member of the first virtual closed user group 186.

As shown in FIG. 4, the communication system 190 also includes a second virtual closed user group processor 154 which is similar to the first virtual closed user group processor 152. The second virtual closed user group processor 154 examines and modifies data bits within a protocol data unit received from a member of the second virtual closed user group 188 on the shared communication medium 158. Also, each member of the second virtual closed user group 188 has a unique destination identifier. In addition, as shown in FIG. 4, the second virtual closed user group processor 154 includes a delivery mechanism 108' for delivering the modified protocol data unit 141' to another member of the second virtual closed user group 188.

A framer 164 is operatively coupled to the first 152 and the second 154 virtual closed user group processors to maintain a database 192 of all destination identifiers currently reachable for delivery of protocol data units within the communication system 190. This framer 164 preferably requires verification that each destination identifier in a protocol data unit on the shared communication medium 158 can be currently reached for delivery through a lookup in the database 192, prior to completing delivery of the protocol data unit to the associated destination identifier. The framer 164 preferably further limits access to the database 192 such that each virtual closed user group 186, 188 only has access to specific destination identifiers owned by that particular virtual closed user group 186 or 188 so that a protocol data unit having a destination identifier which is not owned by the particular virtual closed user group 186 or 188 will not be delivered.

Each virtual closed user group processor 152, 154 modifies and/or monitors protocol data units. The processor 152 modifies data bits within a received protocol data unit by deleting, inserting, and replacing bits in the received protocol data unit prior to delivering the modified protocol data unit to another member of the same virtual closed user group. The processor 152 monitors the received protocol data unit by dropping, sending, sending a copy of, and auditing the contents of the received protocol data unit prior to delivering the modified protocol data unit to another member of the same virtual closed user group.

In addition, each virtual closed user group processor 152, 154 may deliver the modified protocol data unit to another destination within the same virtual closed user group without modifying the predetermined OSI physical layer, link layer, and network layer access protocols used to communicate protocol data units over the shared communication medium. This provides seamless integration of this closed user group functionality to LAN managers even though the LANs may be operating within a MAN as separate closed user groups. This lack of modification of the access protocols also has the advantage of enabling each virtual closed user group processor 152, 154 to allow any particular device capable of communicating on the shared communication medium (e.g., port with a destination identifier) to be a member of either virtual closed user group by having the framer 164 limit database 192 access to destination identifiers associated with a particular destination within a particular desired virtual closed user group.

The framer 164 preferably also includes a mechanism for assigning incoming protocol data unit traffic to each virtual closed user group 186, 188 based on an access policy that is separately specified in each virtual closed user group.

In the preferred embodiment communication system 190 operations of the first 152 and the second 154 virtual closed user group processor are performed by a first 152 and a second 154 virtual switch, respectively. Each virtual switch 152, 154 includes a decision mechanism 104, 104' for determining an associated directive based on a destination identifier within a particular protocol data unit 140, 141 received at a data port 160, 194. In addition, each virtual switch 152, 154 includes a processor 108, 108' which performs the functions of the virtual closed user group delivery mechanism by inserting the particular protocol data unit 140, 140' into an outgoing data stream on another data port 162 or 196 according to the associated directive to enable delivery of the protocol data unit 140 or 141 to the destination identifier within the protocol data unit.

In an alternative embodiment to this preferred embodiment described in reference to FIGS. 2 and 4, the operations of the first virtual closed user group processor 152 are divided between a first and a second virtual switch. This spreads the processing load between two virtual switches and takes into account typical communication system configurations which have many geographically separate physical switches 150, 150' devoted to the same closed user group (e.g., group 186).

In either embodiment, the first 152 and the second 154 virtual switch may be located within a single physical switching device 150. These data ports 160 and 162 as well as 194 and 196 for each virtual switch are then from a set of data interfaces in the physical switching device 150 assigned exclusively to the same virtual switch 152 and 154, respectively.

Also in either embodiment, the first 152 and the second 154 virtual switches may be located within different physical switching devices 150 and 150'. These data ports 160 and 162 as well as 194' and 196' (data ports 194' and 196' for virtual switch 154' are not shown, but are the same as those shown in FIG. 2) for each virtual switch are then from a set of data interfaces in the respective physical switching devices 150 and 150' which are assigned exclusively to the same virtual switch 152 and 154'. As noted above, the different physical switching devices 150 and 150' may be geographically remote from one another.

As previously noted, these data ports 160, 162, 194, and 196 may be either a data interface 112 on a physical switching device 150, a time slot out of several time slots in a time-divided frame received at a data interface 112 on a physical switching device 150, or a code divided cells out of several code divided cells received at at least one data interface 112 on a physical switching device 150. In addition, two or more data ports 195 and 197 can be associated with one or more data interfaces and retrieve protocol data units from the data interface data stream for each data port 195 and 197 based on unique attributes (e.g., destination identifiers) associated with a particular data port.

In addition, as previously noted, the physical switching device 150 preferably is designed to accommodate data interfaces capable of manipulating different protocol types such that each set of data interfaces assigned to a virtual switch 152 may include two or more data interfaces 114, 116 having mechanisms for manipulating protocol data units having different protocol types and the virtual switch 152 is configured to switch protocol data unit coming from these data interfaces 114, 116 with different mechanisms. The differences in the protocol data unit data protocol types may include differing OSI physical layer media types, differing OSI link layer signaling protocols, and/or differing OSI network layer protocols.

Also, as previously noted, Each virtual switch processor 108 modifies and/or monitors protocol data units.

In addition, the communication system 190 may include a virtual link 76 between the first 152 and the second 154 virtual switches. This virtual link 176 consists of a first end 178 and a second end 180 of a data path 182 on the shared communication medium 158, where each end 178, 180 is a data port in a different virtual closed user group 186, 188. To enforce access policies a pair of filters 184 and 185 may be operatively coupled to the data path 182 to filter protocol data units communicated in the data path 182 based on individual access policies that are separately specified for each virtual closed user group.

The present invention virtual switching apparatus and method are integrated into a particular communication network device that forwards packets. The following discussion details this integration; however many of the forwarding operations are more thoroughly discussed in the previously identified related U.S. patent application Ser. No. 08/366, 221 entitled "Method And Apparatus For Accelerated Packet Forwarding".

Figure 5:
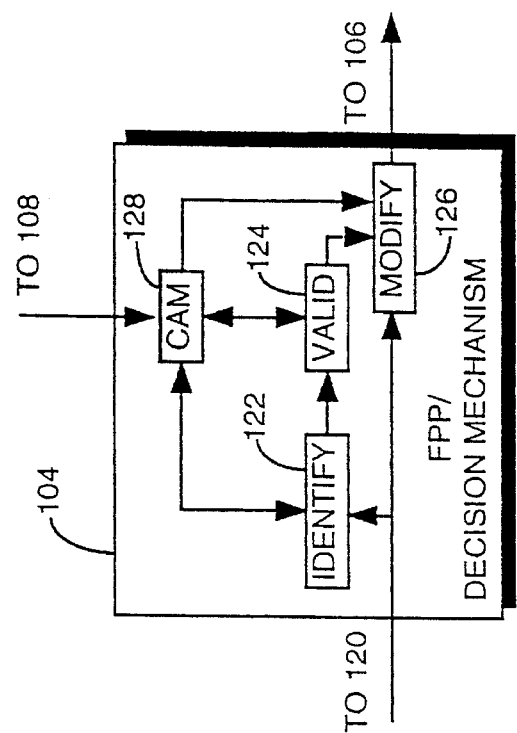
FIG. 5 is a block diagram providing more detail for the decision mechanism/preprocessor shown in FIG. 2 in accordance with the present invention.

Referring to FIGS. 2 and 5, a preferred embodiment of a forwarding system 100 in which a protocol data unit preprocessor 104 (also termed a fast packet processor (FPP)) is used in a protocol data unit forwarding device 108 that operates in a communication network to transfer protocol data units (e.g., 140) within the communication network. The forwarding device 108 manipulates bits of information at the OSI network, link and physical layers and preferably performs as one or more network devices including, but not limited to, a bridge, a router, a switch, a line filter, a protocol converter, an encapsulating device, and a security device. It will be appreciated that various types of communication networks exist which utilize forwarding devices that perform these functions including local protocol data unit source devices (e.g., desktop computers or workstations), local area networks, wide area networks, metropolitan area networks, and wireless networks. Also, it will be appreciated by those skilled in the art that the forwarding device 108 may perform other network-based functions without departing from the scope and spirit of the present invention. In addition, other types of data in the communication network could readily be manipulated by the forwarding device 108.

The forwarding device 108 includes an inbound interface 102 and outbound interface 110 which control the flow of protocol data units 140 and 140' into and out of the forwarding device 108, respectively. These interfaces 102 and 110 are configured differently depending on the type of communication network that the forwarding device 108 is connected to as well as the particular location within such a network that the forwarding device 108 is located.

Turning now more specifically to FIG. 5, an example of how the decision mechanism 104 may be implementing within the forwarding device 108 is shown. The preprocessor 104 (i.e,. one possible form of decision mechanism 104) includes an identifier 122 which determines media header information of a protocol data unit received from over the communication network. The identifier 122 preferably analyzes the inbound stream of data bits from the inbound interface 102 to find media header information of a protocol data unit 140 received from over the communication network. In addition, a validation mechanism 124 is operatively coupled to the identifier 122 to validate the media header information. Also, a modifier device 126 is operatively coupled to the identifier 122 to add next operation information in the form of an associated directive 142 to the media header information based upon the determined media header information such that subsequent processing of the protocol data unit 140 by a protocol data unit forwarding processor 108 is reduced. This next operation information preferably includes bits necessary to enable the use of two or more virtual switches inside a single physical switching device. The modified media header information including the associated directive 142 along with the remaining portion of this particular protocol data unit 140 are then stored in a memory buffer 106 until the forwarding processor 108 is able to process this particular protocol data unit. The forwarding processor 108 is operatively coupled to the preprocessor 104 and the memory buffer 106 to forward the protocol data unit 140' without the modified media header information in the communication network based upon the next operation information contained in the associated directive 142. It should be noted that the next operation information will differentiate between protocol data units for the first 152 and second virtuals switches 154, and may include header modification or truncation of the protocol data unit 140 prior to forwarding. The memory buffer 106 works in conjunction with the forwarding processor 108 and the outbound interface 110 to accomplish this task as preferably as a real-time operation.

The media header information typically includes at a minimum the encapsulation type, protocol type, frame type, media destination, and source route information. This information is used by the modifier device 126 to add next operation information 142 which specifies a particular operation such as route, bridge, or source route bridge to perform on the received protocol data unit. It should be noted that a media destination may be multicast, a unicast match, or a unicast non-match destination.

In order to accelerate the forwarding of a received protocol data unit 140, the identifier 122 preferably is configured to determine the media header information after having received only a portion (i.e., the first several bits or bytes) of the protocol data unit 140. Similarly, the modifier device 126 preferably is configured to add next operation information 142 to the media header information after having received only a portion of the protocol data unit 140. Both of these optimizations are particularly important when manipulating large protocol data traits which are simultaneously received from various incoming interfaces 102.

The preprocessor 104 preferably includes a mechanism for aligning the contents of buffer memory 106. This can be accomplished by the modifier device 126 padding bytes of data to the protocol data unit 140 such that the header information is aligned on optimal boundaries. The reasons for doing this optimal boundary alignment are discussed in the following sections.

The preprocessor 104 identifier 122 preferably includes an address lookup mechanism for obtaining various addresses required by the preprocessor 104 through the use of a content addressable memory 128 (CAM) located in the forwarding processor 108. The addresses can be obtained through several types of algorithms. For example, a network destination address of the protocol data unit 140 can be compared to a predetermined list of known network destination addresses. Also, a media destination address of the protocol data unit 140 can be compared to a predetermined list of known media destination addresses. Further, a media source address of the protocol data unit 140 can be compared to a predetermined list of known media destination addresses. Furthermore, a media source address of the protocol data unit 140 can be compared to a predetermined list of known media source addresses.

The preprocessor 104 identifier 122 also preferably includes a source route bridge destination lookup mechanism for checking for specifically routed protocol data unit 140, finding next local area network identifier in a source route of the protocol data unit 140, and comparing the next local area network identifier to a predetermined list of known local area network identifiers by utilizing the CAM 128.

Figure 6:
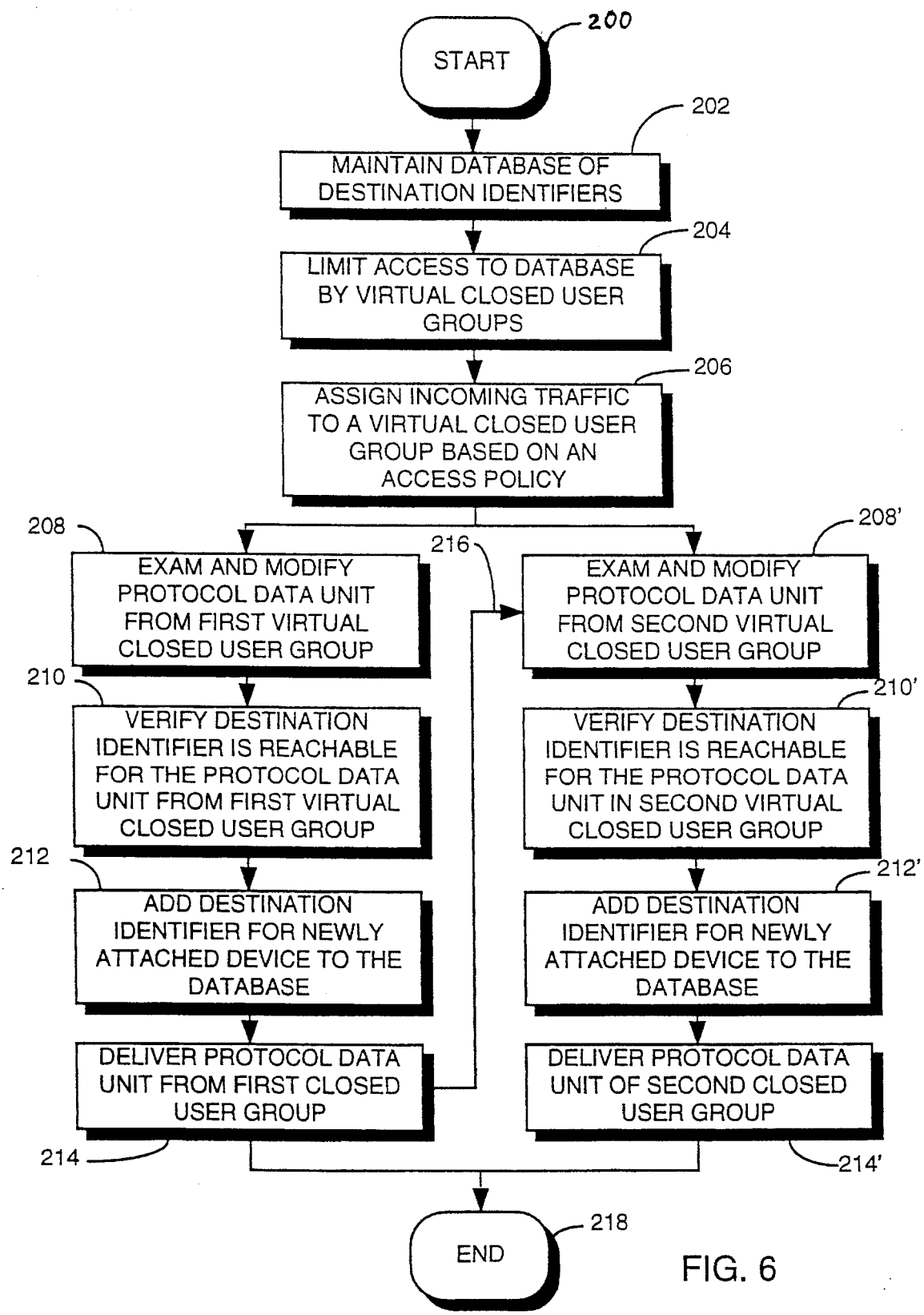
FIG. 6 is a flowchart of the preferred embodiment operations of the use of virtual closed user groups as shown in FIG. 4 in accordance with the present invention.

The present invention also can be described in reference to a device-implemented method steps 200–218 shown in FIG. 6 to deliver protocol data units within a first 186 and a second 188 virtual closed user group on a shared communication medium 158 in a communication system 190 (i.e., shown in FIG. 4). This delivery method includes maintaining 202 a database of all destination identifiers currently reachable for delivery of protocol data units within the communication system. Access to this database is limited 204 such that each virtual closed user group only has access to specific destination identifiers owned by that particular virtual closed user group. Incoming traffic is assigned 206 to each virtual closed user group based on an access policy that is separately specified in each virtual closed user group. The access policy may be as simple as having all members with last names beginning with the letters A-I being placed in one group and all others being placed in another. Further, the access policy may be more complex. For example, member group assignment could be based on an IP address, plus a known security clearance level, and a time of day to which access is limited (i.e., only during standard working hours).

At this point, the operations are split between the first and the second virtual closed user groups such that any further processing is performed separately. Data bits within a protocol data unit received from a data interface on the shared communication medium are examined and modified 208 wherein the protocol data unit has a unique destination identifier associated with the first virtual closed user group to form an associated directive for that protocol data unit. In a similar manner, data bits within a protocol data unit received from a data interface on the shared communication medium are separately examined and modified 208' when the protocol data unit has a unique destination identifier associated with the second virtual closed user group to form an associated directive for that protocol data unit. Each member of the second virtual closed user group also has a unique destination identifier.

Also, verification 210 and 210' that each destination identifier in a protocol data unit on the shared communication medium is currently reachable by the particular virtual closed user group for delivery is required This verification may be accomplished through a lookup in the database prior to completing delivery of the protocol data unit to the associated destination identifier. If a destination identifier is not found in the database, three possible actions can be taken, including: dropping the associated protocol data unit so that no delivery occurs, forwarding the associated protocol data unit to another destination identifier, or adding this non-verified destination identifier to the database. This last possible action also has other benefits in that any particular device capable of communicating on the shared communication medium can be a member of either virtual closed user group by simply adding 212 or 212' a destination identifier associated with the particular device newly attached to the communication network to the database and associating the device with the first or the second virtual closed user group, respectively.

Subsequently, the first virtual closed user group modified protocol data unit is delivered 214 to another member of the first virtual closed user group after verifying that the first virtual closed user group member destination identifier is currently reachable. In addition, the second virtual closed user group modified protocol data unit is delivered 214' to another member of the second virtual closed user group after verifying that the second virtual closed user group member destination identifier is currently reachable.

These device-implemented steps 200–218 preferably are performed such that all predetermined physical layer, link layer, and network layer access protocols used to communicate protocol data units over the shared communication medium are preserved. In other words, no changes to protocol like IP, ATM, OC-12 or the like are necessary to implement the present invention, because these steps are seamlessly integrated with this access protocols.

In addition, the device-implemented steps may include a step of providing 216 a virtual link between the first and the second virtual closed user group. This virtual link can be used to deliver protocol data units from the first virtual closed user group and to the second virtual closed user group. The virtual link includes a first end and a second end of a data path on the shared communication medium. Also, each virtual link end includes a data port in a different virtual closed user group. A shared memory can be used as the shared communication medium to provide the virtual link. Alternatively, a high data transfer rate link which spans a geographic distance between the first and the second virtual closed user group can be utilized to provide the virtual link. A filtering process can be performed on the virtual link such that protocol data units communicated in the virtual link data path are filtered according to an access policy that is separately specified in each virtual closed user group. It will be appreciated by those skilled in the art that another virtual link may be provided to deliver protocol data units from the second virtual closed user group to the first virtual closed user group.

Mode for Carrying Out the Invention

The following sections describe in detail the features required for the virtual router/switch. It should be noted that the packets described herein refer to protocol data units which can take the form of a packet, cell, or frame of data. The Virtual Router feature provides a means of segregating Upper Layer Protocols and their ports into several groups or "virtual" routers. These virtual routers can function almost totally independent of one another preventing traffic mix, or allowing controlled access amongst one another.

The following describes the customer viewable aspects of the Virtual Router. This includes the Virtual Router (VR) component and all of its immediate subcomponents. In particular, the following details regarding the VR are described:

Component Definitions;

Provisionable attributes;

Operational attributes;

Provisioning commands; and

Provisioning procedures.

Some of the primary benefits of the Virtual Router include:

Multiple Virtual Routers per platform

Service Providers: Provides ability to share the resources of one platform across many customers. Obvious benefits include cost reduction and integrated maintenance.

Large Enterprises: Provides ability to segregate local traffic and resources between organizations while sharing the more expensive long haul resources among organizations. Again benefits here include centralized maintenance and reduced cost.

Controlled interaction between Virtual Routers—The VR provides for traffic segregation and controlled integration. Integrated traffic can be precisely controlled regarding its source, destination among many other possibilities.

Single maintenance platform—Provides a constant and integrated management interface for each Virtual Router on the platform. This simplifies the management of the set of VRs.

The Virtual Router (VR) provides the customer with the ability to segregate router traffic and maintenance into what appears to be separate physical routers. This is accomplished by the creation of multiple instances of the VR component directly under CASROOT.

Each instance of the VR component provides support for multiple network protocols, routing protocols and media devices to operate virtually independently of each other.

The VR system includes the VR component and many other subcomponents. These sections provide the complete specifications of the following components:

Virtual Router;

Protocol Port; and

Memory Management.

These sections describe the subcomponents under the VR, including the number and type of subcomponents which can exist directly under the VR and Protocol Port (PP) Components.

The Virtual Router component resides directly under CASROOT. Multiple instances of the VR component may exist. Components which reside under the one VR component are independent of components under another VR. The network protocol and protocol port components reside under the VR component. This allows multiple instances of protocol stacks to exist on one platform. The network protocol component represents an instance of that particular protocol and all of its configured data.

Protocol Ports (PPs) are created under the VR and represent a logical interfaces to a network. There can be multiple protocol ports under each VR, each having any number of protocols enabled. To allow for the processing of particular OSI Network Layer Protocol packets on a PP, a Network Protocol Port subcomponent is created under the PP. A CAS linkage, from the PP to a Media Application component, is used to associated the logical PP to a physical media. Each PP must be linked to a Media Application component. The linkage between PPs and Media Application components is a one to one linkage.

Figure 18:
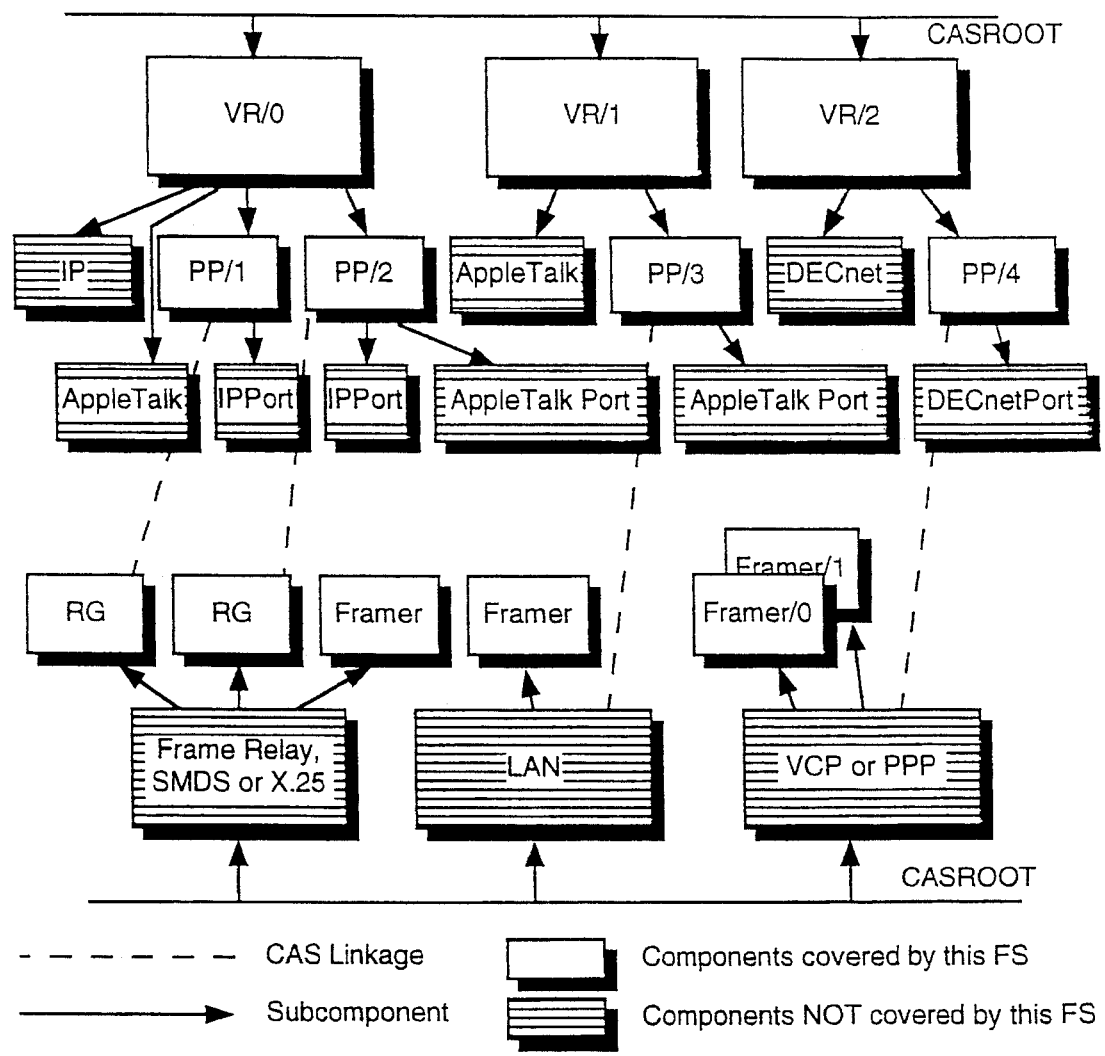
FIG. 18 is a block diagram showing an example of a component hierarchy including three Virtual Routers (VRs) and multiple protocol stacks and protocol ports in accordance with the present invention.
Figure 19:
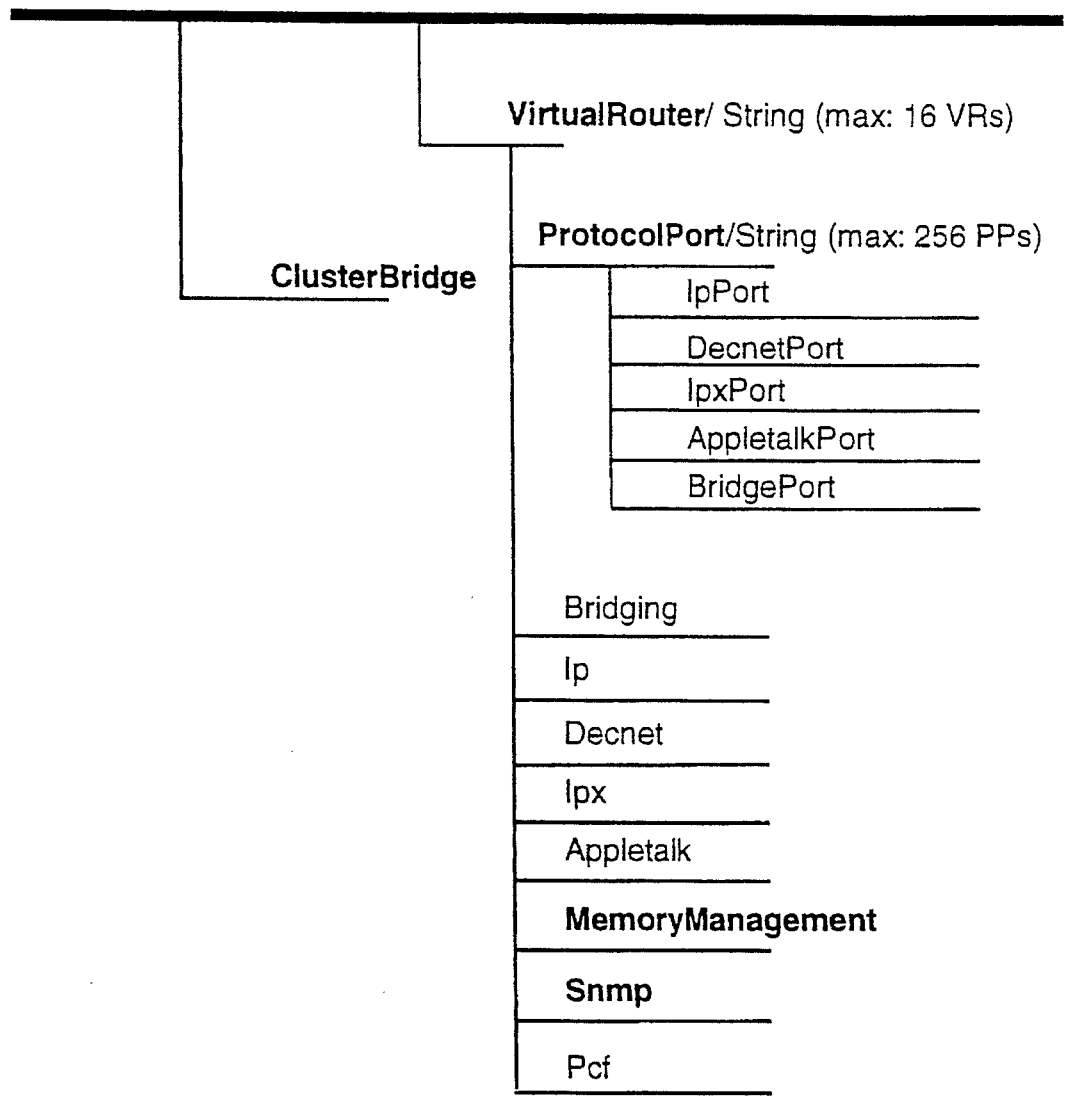
FIG. 19 is a block diagram which shows the entire component hierarchy under the VR in accordance with the present invention.

An example of a component hierarchy including three Virtual Routers and multiple protocol stacks and protocol ports is shown in FIG. 18. The VR has many subcomponent, many of which also have subcomponents. FIG. 19 is a diagram which shows the entire component hierarchy under the VR. The bold or darker tone components are fully defined in these sections.

VR PPs support both LAN and WAN media. For LAN media, the PP is linked, via a CAS linkage, directly with the LAN Application component. This linkage defines the physical port which the PP is associated with.

For WAN media, the linkage from PP to WAN Application varies depending on the Link Level Protocol (LLP) type. This feature supports two very different types of LLP types. One type of LLP is a Point to Point LLP. A Point to Point (PPP) LLP type provides a 1 to 1 connectivity model. That is each end of the link supports only one end destination. The WAN Applications which use this model include: Point to Point Protocol (PPP) and Vitalink Control Protocol (VCP). For these LLP types, the PP is linked directly with the Application component, e.g. PPP or VCP.

The second type of LLP supported by the VR system is the Multi-point LLP. The multi-point LLPs allow for one interface to be multiplexed into multiple data carrying pipes, each capable of supporting multiple end destinations. The WAN Applications which use this model include: Frame Relay Data Terminal Equipment (DTE), X.25 (DTE), and Switched Multimegabit Data Service (SMDS) (DTE). For all of these LLP types, the PP is linked with a RemoteGroup subcomponent which resides directly under the Application Component.

Networking Protocols (e.g., IP, IPX, etc.) are supported via CAS components which reside directly under the VR component and a Network Protocol Port components which resides directly under the PP component. There can be at most, one instance of each Network Protocol component under each VR component and one instance of each Network Protocol Port component under each PP. These subcomponents provide the functionality required to provide packet processing support for each Network Protocol Type. It is required that for each Network Protocol Port which is provisioned under a PP, that the associated Network Protocol component exist under the VR.

IP is supported per VR with an Ip component and an IpPort component. There can be at most one Ip component under each VR and one IpPort component under each PP. Support for multiple IP addresses per IP protocol port is provided by a subcomponent under the IpPort component. This component contains a list of "secondary" IP addresses which are associated with the IpPort. Routing Protocols (e.g., OSPF and Exterior Gateway Protocol (EGP)) are supported via CAS components which reside directly under the IP subcomponent. Thus the creation of a IP component also provides for the creation of these routing protocols.

IPX is supported per VR with an Ipx component and an IpxPort component. There can be at most one Ipx component under each VR, and one IpxPort component under each PP.

Appletalk is supported per VR with an Appletalk component and an AppletalkPort component. There can be at most one Appletalk component under each VR, and one Appletalk Port component under each PP.

Decnet is supported per VR with an Decnet component and an DecnetPort component. There can be at most one Decnet component under each VR, and one DecnetPort component under each PP.

Bridging is supported via the Bridging CAS component which resides directly under the VR component. There can be at most, one instance of a Bridging component under each VR component. The creation of a Bridging component under a VR component, allows for the creation of a BridgePort subcomponent under the PP component.

Cluster bridging provides the ability for a group of LAN ports to be bridged for all media, while treating the group of ports as one port which can be used for Telnet and management purposes. Cluster bridging is supported by the VR using two existing components and one new component. The existing Bridge component is still used under each VR to perform the bridging activities. The BridgePort component is used to enable bridging on a PP. This component is used to enable bridging on a standard bridged port and to enable cluster bridging on a cluster bridged protocol port. A standard bridged port is linked to a LAN application which identifies the physical interface which is being bridged. A cluster bridge PP is linked to a new component called a ClusterBridge. This component represents the cluster bridge logical interface and it is what distinguished a PP as being a cluster bridge PP. The ClusterBridge Application component resides directly under the VR. A PP linked to a ClusterBridge Application component (versus a LAN application component) represents a ClusterBridge port. This port acts as a gateway for all bridged PP traffic to routing, and from routing to all bridged PPs.

Multiple cluster bridge ports may be defined, using multiple instances of the ClusterBridge application. Each bridged port can belong to at most one ClusterBridge. Each BridgePort, including cluster bridge PPs, have a domain attribute which identifies the bridge domain that is used by bridging. The bridge domains must be unique per cluster bridge Port. The bridge domain is what determines which bridge ports are associated with specific instances of the ClusterBridge. For example, all bridged ports with domain 5 are associated with the single cluster bridge port with domain 5.

Figure 20:
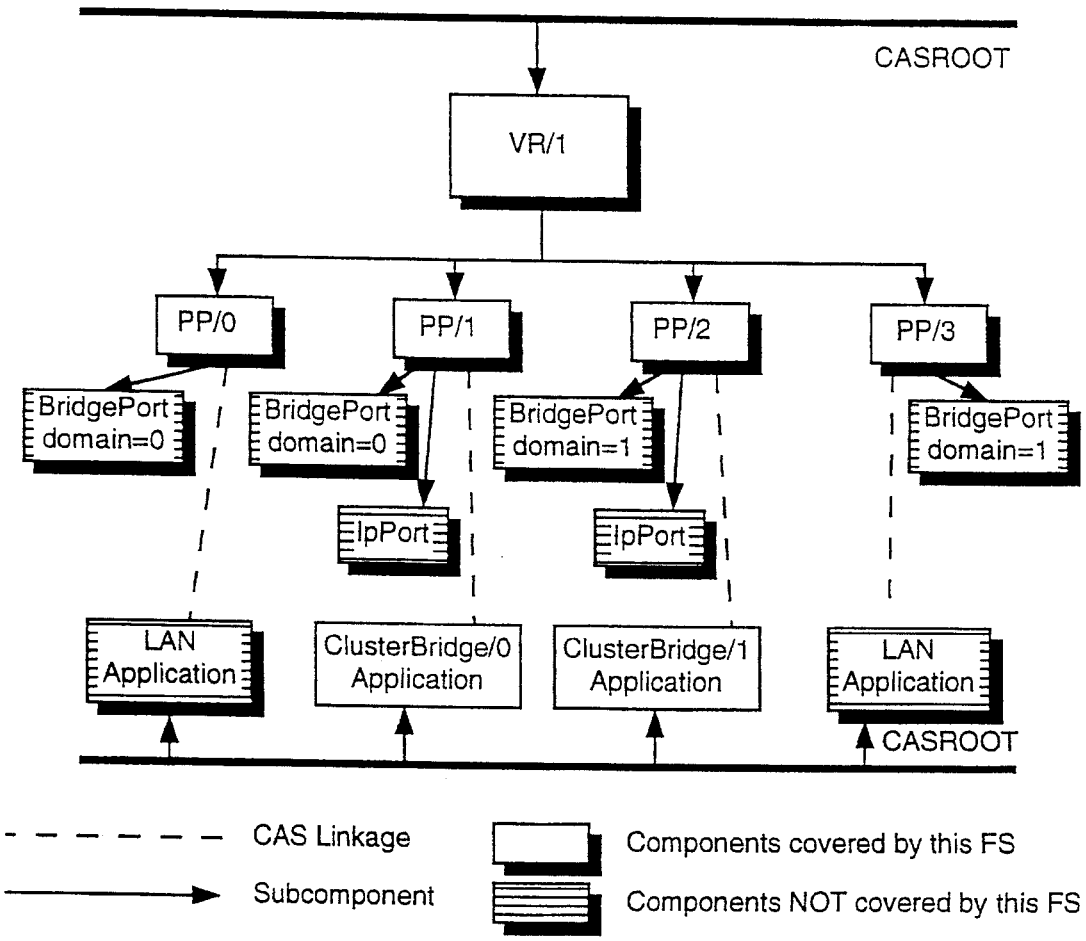
FIG. 20 is a block diagram which shows an example of multiple cluster bridges, each associated with one bridge protocol port in accordance with the present invention.

FIG. 20 is an example of multiple cluster bridges, each associated with one bridge PP. Notice the domain numbers for the bridged ports and the cluster bridge ports. Bridged PP/0 is associated with cluster bridge PP/1 and bridged PP/3 is associated with cluster bridge PP/2.

SNMP is one method which can be used to manage the physical and virtual router platform. This method requires VR support for the SNMP agent(s) which reside under Access Control. The VR provides mechanisms which allow each VR to be managed virtually independently of one another. The SNMP support is provided on a per VR basis with respect the VR components and software. If SNMP support is required, an SNMP component can be provisioned under the VR component. This component contains the ifTable and SnmpSystemGroup. The ifTable includes an ifTable entries for each interface in the VR The SnmpSystemGroup contains generic configuration information per VR for SNMP.

The SNMP administrative status and OSI state must both be supported since it is desired to support both SNMP and OSI. The OSI state is purely an operational attribute while the SNMP admin state is a provisionable attribute. This is the only difference between the SNMP admin state and OSI admin state. The issue here is how these states can affect each other and how they are to be dealt with. The particular state dependencies are well known in the art and for simplicity will not be repeated herein.

The Packet Control Facility (PCF) provides a mechanism to monitor and control the flow of packets through the router platform. This facility is provided on a per VR basis. A PCF component can be produced under the VR which provides the mechanisms and functionality to create, and apply PCF filters.

The following section will describe the memory management for the VR. The major concern for memory management (MM) is to prevent a VR or one of its Network Protocols from using so much memory that it begins to affect the other VRs or protocols adversely. A required Memory-Management component is created under the VR which allows for the configuration of Memory Management. The memory management component allows for the management of both the VR and its Network Protocols.

The memory management for the VR is primarily designed to prevent one VR from obtaining an amount of memory which adversely affects other VRs. MM attributes allow for a percentage of total heap space to be provisioned as the maximum amount of memory which the VR and its subcomponents can obtain. The total heap space for the system is calculated during initialization. It includes the amount of heap space remaining after the standard port of system initialization and prior to the initialization of the provision dependent processes. There are no restrictions on the percentage of heap space any VR can allocate. In fact the total heap space for the platform may be overallocated. For example, three VRs VR/0, VR/1 and VR/3 may each allocate 50% of the heap space on the platform. Allowing this has some apparent advantages and disadvantages. An apparent disadvantage is that a VR may be denied memory before it reaches its maximum memory amount. However, the maximum memory amount is just that, a maximum and it is not to be implied that it is also a guaranteed minimum. An advantage of over allocating memory is that it allows for VRs to share heap space. on a first come first serve basis.

When a VR attempts to allocate an amount of memory which would exceed the maximum allowed, it will be denied. In addition to the denial of memory, an alarm will be triggered. The alarms are filtered such that no more than one alarm per VR will exist per period of time. This period of time is a provisional attribute.

The MM for a VR can be a very powerful tool in controlling the affects of an errant VR on other VRs. In order to efficiently provision the memory maximums, the user must know how much memory a VR is using under normal situations. To provide access to this data, operational attributes are provided which lists the amount of heap space is currently in use per VR.

Because the maximum share of memory is a provisioned attribute, it can be adjusted to include more memory or less memory. If the provisioned amount is increased, MM automatically adjusts the amount allowed to the VR and Protocols. If the amount of memory is decreased, no action is taken by MM to automatically retrieve memory from VRs which now exceed that amount. If it is necessary to reduce the amount of memory used by a VR or protocol, the VR can be administratively disabled and enabled. This restarts the VR, thus requiring them to adhere to the new provisioned values for maximum heap space usage.

The memory management for Network Protocols work much like the MM for VRs. Separate attributes within the same MM allow for Network Protocol memory management. A provisioned attribute for each protocol determines the percentage of heap each protocol can use. However this share, unlike the VR share, is in terms of VR heap space versus total heap space. So if a VR has a provisioned fair share of 50%, and a protocol has a fair share of 50%, the protocol has at most, the capability of getting 25% of the total heap space of the system.

The Network Protocol memory management includes the same type of alarm reporting and current memory usage counts as described above for the VR. Similar to the VR situation, if the provisioned share of memory used by a protocol is decreased, a protocol could be in violation of it share of the memory. Although it has more memory than it should have, all subsequent requests for memory will be denied. If it determined that this is a problem, the situation can be corrected by disabling the protocol and re-enabling it. Otherwise the protocol may be in violation until either the protocol reduces it memory consumption for another reason, or the system reboots.

A MemoryManagement component exists under the VR to contain all the attributes associated with VR and Network Protocol memory management. The MemoryManagement component is a required subcomponent, which has default values for each of its attributes.

Figure 21:
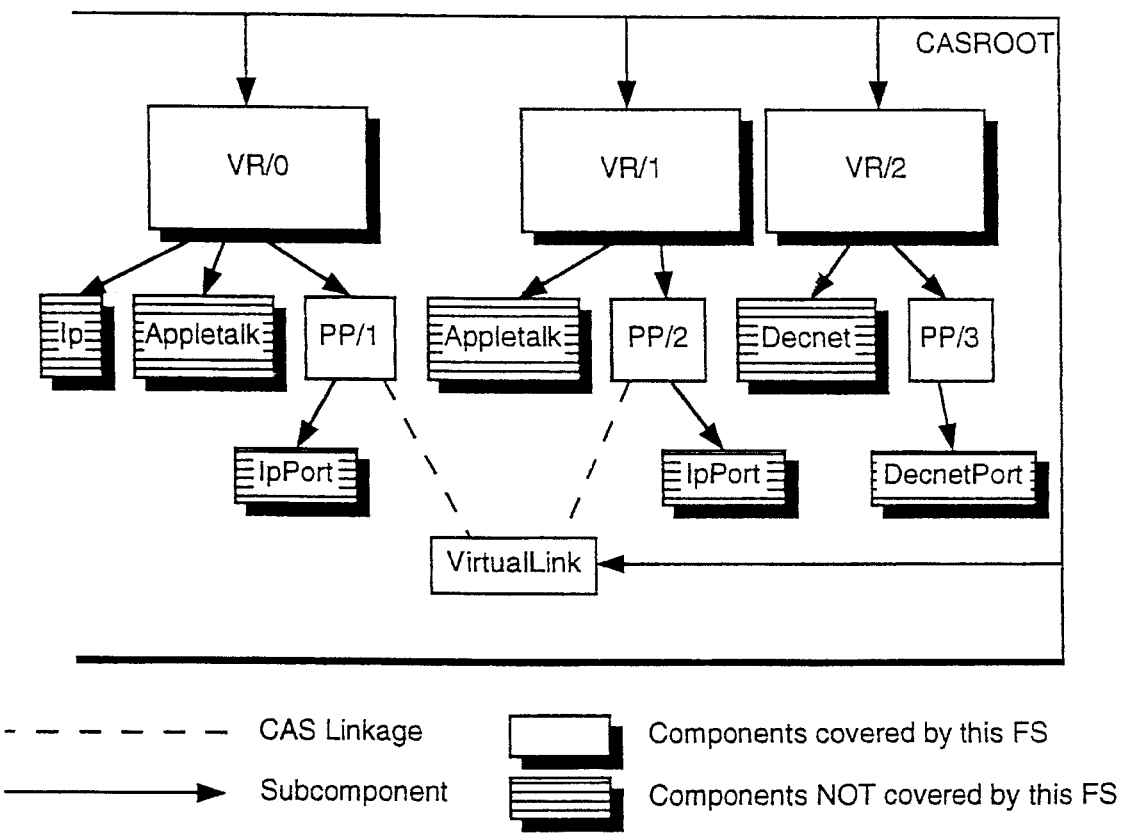
FIG. 21 is a block diagram which shows an example of inter-VR component hierarchy which supports virtual links in accordance with the present invention.

These sections detail the ability to support multiple VRs on one router platform. In addition, it also provides a means of internally connecting these VRs such that they can transmit packets between one another. This capability is be referred to as inter-VR support and is shown in FIG. 21.

In the standard intra-VR case, a VR protocol port is linked to a media application component. This linkage explicitly defines the physical port, and implicitly the FP, the logical port is associated with.

In the inter-VR case, the PP has no physical port or media which connects the two VRs. A mechanism must be devised to replace the functionality provided by the physical port and connection. The two most obvious alternatives were to either connect the VRs via a Virtual LAN media or a Virtual Point to Point Link media.

An inter-VR connection can be achieved by creating two protocol ports, one on each VR, and connecting them via a Virtual Link component. The two protocol ports connected to the Virtual Link component are considered inter-VR (IVR) PPs. Although the Virtual Link is a logical mediun versus a physical medium, it is what is used to interconnect the two VRs.

Provisioning a Virtual Router consists of provisioning multiple components, most notably the Virtual Router (VR) as well as its subcomponents (Upper level Protocols, SNMP, Bridges and Protocol Ports). The Virtual Router is used to logically separate sets of protocol ports and protocols into what appear to be and act like distinct routers/bridges. Most of the components required to operate the platform as a router or bridge either reside under the VR or are linked to the VR via a CAS linkage. This allows the creation of multiple instances of these components on a per Virtual Router basis.

The Virtual Router (VR) component resides directly under CAS Root. The base software set allows for the creation of only one VR. However since part of the optional software set, allows for multiple VRs, the VR must always have an instance identifier. Preferably the maximum number of VRs allowed is 16; however, this number is totally arbitrary and changing it to a larger or smaller number should be a trivial operation. The identifier for the VR is a string of up to 20 characters.

To allow for inter-VR packet processing, VirtualLinks are used. A VirtualLink allows for the connection of at most two VRs. The VirtualLink component resides directly under CAS Root and can be linked to two Protocol Ports through a provisioning procedure. CAS checks ensure that both linkages are established and that they are between two different VRs.

The following caveats are a result of the implementation of the VR on this preferred embodiment router platform:

The provisioning system is not VR centric—Because only one edit view exists for all CAS components, multiple VR provisioning sessions are not possible. Additionally, CAS command security between VRs is not supported.

Resource Contention—Hardware and Software resources are shared across VRs, thus certain conditions on one VR may affect the performance of another VR.

Each instance of a Virtual Router requires the creation of many components and processes. This obviously has a significant impact on memory usage. Depending on may variables, including the number of protocols supported per VR, the number of Protocol Ports created and the size of the dynamic routing tables created based on the network design, the memory usage may vary. Thus the number of VRs which can be successfully provisioned and made operational is nondeterministic. Several features which, if provisioned, may significantly affect the amount of memory used. The primary memory user is Multiple Virtual Routers. Each instance of a VR uses a significant amount of memory depending on the number of protocols, protocol ports and media types being used.

The use of the following features may have create some level of performance degradation compared to the optimal performance characteristics:

ClusterBridging—Because cluster bridging requires both a bridging and a routing step, the performance regarding forwarding a packet via a ClusterBridge port can be reduce to half the normal rate.

Inter-Virtual Router Packet Forwarding—The process of forwarding a packet from one VR to another includes forwarding a packet out a IVR PP for one VR, in the IVR PP for the destination PP and finally out a physical PP. This process includes at least two forwarding table lookups, and one mapping from the inbound VR to the outbound VR. This process in some cases can be split across FPs, thus incurring additional performance penalties.

The following sections are the System Description for the Virtual Routing System which provides for the creation and execution of multiple Virtual Routers on a physical router platform. It also includes what is called "Protocol Glue". This is the software which provides a common set of interfaces and support mechanisms for the Network Protocols to run within.

The Virtual Router (VR) feature has two major parts. The first part, is to provide the functionality required to support multiple Virtual Routers on a single physical router platform. The second part is to provide a common set of interfaces and support mechanisms for the network protocol processes.

The VR is primarily intended for customer premises applications where a single chassis may operate separate networks for multiple clients. This allows an internetworking service provider to support multiple clients, multiple networks while sharing hardware. Traffic can be cross-connected between VRs using Virtual Links. Virtual Links act like Point to Point media for InterVirtual Router connections.

In the following sections, Network Protocols, ULPs, and Protocols are used to refer to the same thing, (i.e., IP, IPX, Decnet, AppleTalk, etc.). The terms Media Applications and Applications are used to describe the Media component processes (i.e., Ethernet, FDDI, TokenRing, FrameRelay, etc.). The term "event" is used extensively throughout this section. An event identifies any external stimuli to a process or object. An event can be a Process Environment (PEV) message or a function call. The term Protocol Port (PP) is used extensively and it refers to PPs in general. There are many different types of PPs, used in different components and processes in addition to the PP component itself. If a specific PP type is being referred to, its specific type is used.

Figure 22:
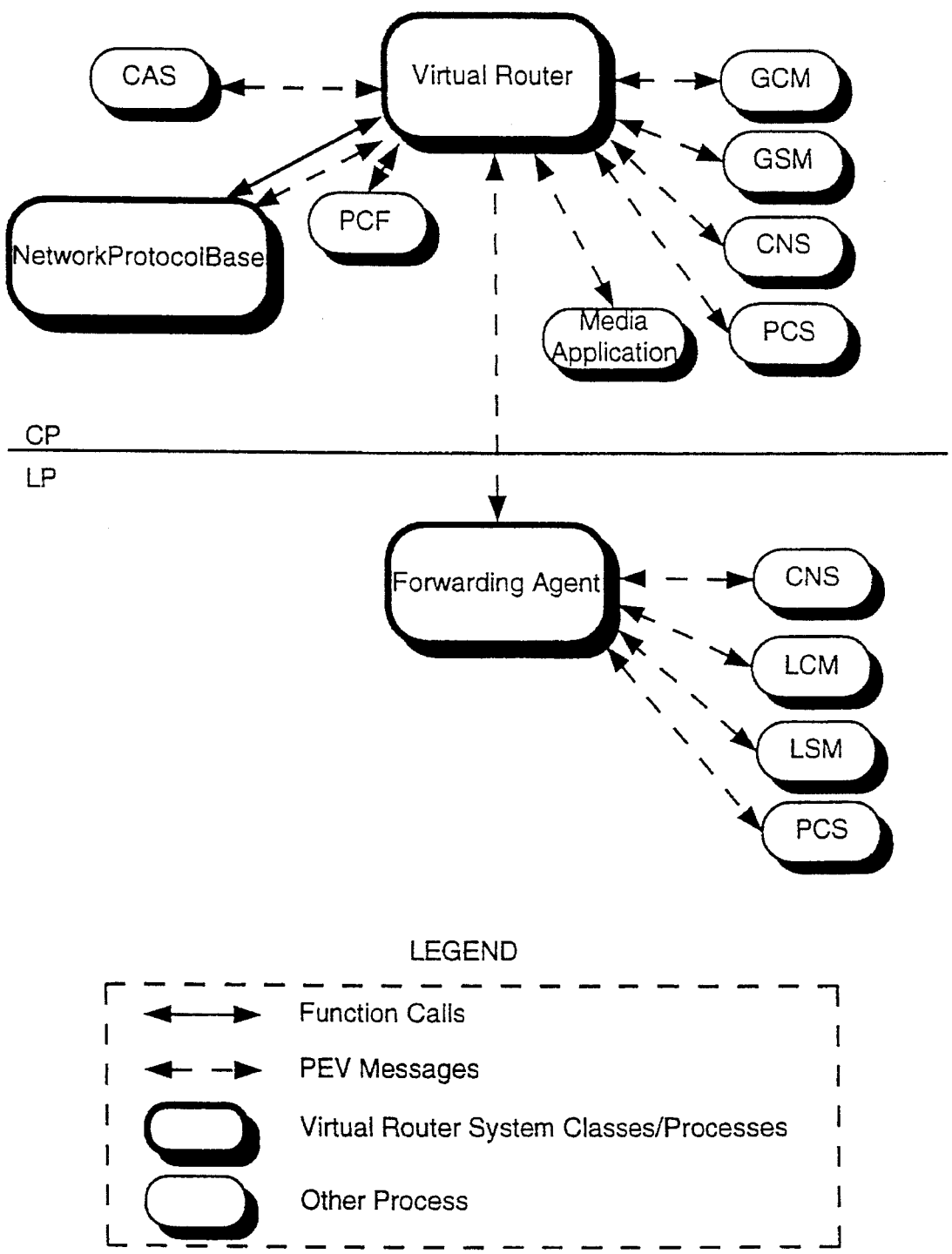
FIG. 22 is a block diagram which shows a system overview of the VirtualRouterProcess, ForwardingAgentProcess, and the NetworkProtocolBaseProcess in accordance with the present invention.

The Virtual Router system consists of several classes. The three major classes which represent PEV processes are the VirtualRouterProcess, ForwardingAgentProcess and the NetworkProtocolBaseProcess classes. These processes are shown in FIG. 22 along with the sub-processes which they interact with. In particular, the following sub-processes are shown:

Component Administration System (CAS);

Packet Control Facility (PCF);

Process Control System (PCS);

Component Name Server (CNS);

Global Stats Manager (GSM);

Global Cache Manager (GCM);

Local Cache Manager (LCM); and

Local Stats Manager (LSM).

The VirtualRouterProcess class encapsulates the control processor (CP) data and functionality associated with each instance of the VR. The VR processes reside on the CP. One VR process is created by CAS for each VR provisioned on the platform. The VR process creates network protocol processes for each provisioned Protocol under the VR.

This class provides the mechanisms required to handle all CP related activities as required by the protocol processes, the protocol ports and other objects which require VR support.

The ForwardingAgentProcess class provides the functionality required by the VR system on each active Logical Processor (LP) on the router platform, including the CP. This class provides the process which acts as the VRs agent on the Logical Processors (LPs). The VR uses these processes in order to provide each LP with forwarding data and other initialization required by the protocol.

The NetworkProtocolBaseProcess Class provides a common platform for which each network protocol process is built on. This platform provides a common set of interfaces to all processes interacting with the protocol processes. Having a common interface for all network protocols reduces the effort and complexity of system components which interface to all the protocol types.

Protocol registration is initiated by the Network Protocol processes. It is an indication to the VR that the Protocol is active and wishes to begin receiving locally addressed packets. In addition to this, it provides the VR with Protocol specific forwarding information (transparent to the VR), which is required on the LPs for packet forwarding. This data is made available to the protocol specific data path objects on each LP via the VR/Forwarding Agent (FA) processes. Included in this Protocol registration message is the forwarding information, the process ID of the process which is to receive local packets for the protocol, and an indication of the state of the protocol (active/inactive). The protocolState is required since this message is being used for registration and deregistration.

Protocol processes require notification that the media interface is available prior to initiating a bind request. This notification originates from the Media Application component once instantiated.

Media Application processes (e.g. ENET, FrameRelay, etc.) are created on LPs (in the general case) and on the CP (for the ClusterBridge and Inter-VR Link cases) during CAS provisioning. These applications have CAS linkage to a PP. When a Media Application process becomes active, it registers with the Virtual Router on the CP. Included in the registration message is the data required by the forwarding Data Manipulation Engine (DME) (i.e., frame handler) regarding the physical interface type, maximum packet size, etc.

Upon reception of the message, the VR saves the data regarding a PP in the VRs PP object. This data is sent down to the FA and made available to the forwarding software. In addition to this, the VR sends a mediaAvailability message to each protocol which is provisioned trader this PP. Once this message is received by the protocol processes, they can bind to the PP.

Protocol Port Binding is a procedure used by a network protocols to enable or start packet processing on a PP for a particular protocol type. For example, prior to IP binding to PP/5, all IP packets on PP/5 are either bridged (if bridging is active) or dropped. Once IP binds to PP/5, IP packets are processed by the IP forwarder.

Because the forwarding software is on the LP and the network protocol processes are on the CP, the VR provides a mechanism to support protocol binding. Binding is initiated by the network protocol process via a bind request delivered to the VR via a PEV message. The VR then determines which LP(s) the PP resides on, and forwards the Bind request to the appropriate FA(s). Bind data, passed by the network protocols, is used during the creation of the Bind Table Manage (BTM) on the LP. A BTM is required on each LP which can process inbound packets. For PP which have physical interfaces, the BTM is required on the LP where the physical interface resides. For PPs that have no physical interface (e.g. ClusterBridge) and PPs that have multiple physical interfaces more than one LP requires a BTM.

The FA, upon reception of the bind request, creates a BTM (if necessary) and delivers the bind request to it. In addition, a ProtocolPort object is created using the data included in the bind request by the protocol process. This ProtocolPort provides all the information required by the forwarding software to process packets on this interface.

Before network protocol DMEs can be used on the LP, they must be created. A DME must be created on each LP for each bound Protocol. The VR and FA assist in the creation of these DMEs.

Protocols have semi-global data which is required to forward packets. This is the data which is not PP specific, but protocol specific. This data is passed to the VR in the protocol registration message. This data is forwarded to the LPs and a pointer to this data is passed to the function which is called to do the protocol LP initialization.

Each protocol must provide a function (a forwardingEventHandler) which can handle forwarding events initiated by the protocol process. This function must be able to handle each of the protocolForwardingEvent types (ProtocolEnabled, ProtocolDisabled and Protocol Updated). The ProtocolEnabled event triggers the initialization of the protocols LP forwarding data (including the creation of the protocols DME). The function is called prior to creating the first PP for a particular protocol on each LP. This function, which is to be provided by the network protocol, must be made available on the LP. As the saying goes, "everything that goes up must come down". When a protocol deregisters, a function is called to disable the initialization done for the protocol and remove the DME for the protocol.

To enhance the performance of forwarding packets on the router platform, all packet processing required to forward a packet on some LAN media is done on the inbound board. Because of this, the forwarding software on an LP not only requires information about all the PPs on the LP, but also for all the PPs for which it can transmit out on other LPs. This PP information, distributed across multiple LPs for a port on one LP is called "Distributed Protocol Port Data". This data is required on each LP prior to forwarding the first packet. The data is forwarded to the LPs when the LP became active and the Media Application registers with the VR. The data is sent to the LP for each PP on the VR.

When the distributed PP data arrives on the LP, the FA creates a ProtocolPort object. This object contains all the data necessary for the forwarding software to forward a packet.

The Protocol Port (PP) is a very significant part of this system. It represents a logical interface to a network. The term PP has many different connotations. There is the PP component which resides under the VR. There is also a Network Protocol Port component which is specific to a particular network Protocol type. In addition to these PP components there are VR PP objects, Network Protocol Port objects and Forwarding Agent Protocol Port Objects. Each of the PP objects require a slightly different view of the PP. For example, the VR is interested in the protocol independent portion of the PP. The protocol processes are interested in the protocol dependent portion of the PP, and the forwarding DME software is interested in yet a different portion of the software (in fact, forwarding software on LPs that contain the physical interface associated with a PP require different information than those on the other LPs). In addition to all of this, the PP information is distributed across multiple processes, not to mention multiple processors.

The following protocol port object types exist, including: VrProtocolPort, NetworkProtocolPortBase (also one derived version for each Protocol type), FaInboundProtocolPort, and FaOutboundProtocolPort.

The VrProtocolPort provides the data and functionality required for the PP by the VR process. This includes all PP data which is common across all protocols. This data can be broken down into two categories, inbound and outbound. The inboundPpForwardingData is a structure of common data required by the inbound forwarding software. The outboundPpForwardingData structure contains data common to multiple protocols required by the outbound forwarding software. These two structures along with methods which are used to update the contents of them, make up the VrProtocolPort.

The NetworkProtocolPortBase class provides protocol processes with a base class which is be used to encapsulate protocol specific forwarding data. This forwarding data, in terms of protocol specified objects, is turned into contiguous bytes of data, transmitted to the LPs and reincarnated into their original form again. Once back into the object form, they can be used by the forwarding software to forward datagrams. This base class is meant to provide a common interface to the VR so that the data can be turned into contiguous bytes which are sent to the FAs, where they are reincarnated back into objects of their original form.

The FaOutboundProtocolPort class provides the data and functionality required on LPs which need outbound PP data in order to forward the packet. This class contains the protocol independent outboundPpForwardingData structure from the VR as well as the protocol specific outboundForwardingData provided by the protocol process.

The FaInboundProtocolPort class is inherited from the FaOutboundProtocolPort class. This class provides both the inbound and outbound data required forwarding software. This class is used on LPs where inbound packets can be processed, thus requiring inbound forwarding data in addition to the outbound forwarding data. In addition to the outbound data provided by the base class (FaOutboundProtocolPort), this class contains the protocol independent inboundPpForwardingData structure from the VR as well as the protocol specific inbound forwarding data provided by the protocol process.

The following section describes the initialization procedures provided by the VR system on both the CP and LP.

The Virtual Router requires no pre-provisioning CP initialization. All VR initialization is performed during or after VR provisioning. The Virtual Router system requires system initialization on the LP. The Virtual Router system requires a process on the LP which acts as an agent for the VR on the LP. This agent process, called the Forwarding Agent (FA), is created during LP initialization. This process immediately registers itself with the Component Name Server (CNS) so that other processes have access to its PID.

The following section describes high level details regarding the processing of messages from CAS. The VR process handles CAS messages for itself and all of its subcomponents. When a provisioning message is received by the VR for a subcomponent which requires a process, the VR creates the process, and forward the CAS provisioning message to that process. In this case, it is the responsibility of the subcomponent process to handle the provisioning message appropriately and provide the acknowledgment to CAS. CAS messages which are addressed to the VR or to components which do not have processes are processed by the VR.

A Virtual Router Process is created by CAS for each provisioned VR. Once the process is created, CAS sends all provisioned information for a VR to the VR process. The VR creates a process for each provisioned protocol. Once the process is created, the VR sends all the provisioning messages for the protocol to the protocol processes.

Figure 23:
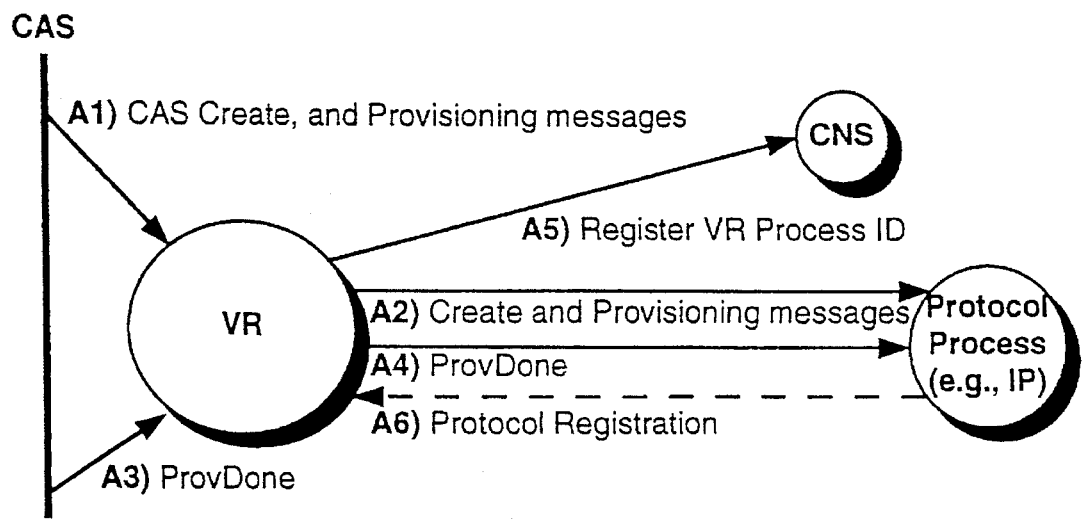
FIG. 23 is a block diagram which shows the per port initialization required prior to packet forwarding, including Virtual Router Creation and Provisioning, in accordance with the present invention.

The VR system primarily consists of two processes, the VR process and the FA process. The VR process is created by CAS as the appropriate CAS messages are delivered. The FA process is created by fixed process initialization on each LP. Forwarding packets for a particular protocol over any media requires a certain amount of initialization. The initialization procedure required can be different depending on the type of media a PP is connected to. This section discusses the initialization required by each of the various media types and the packet forwarding process associated with them. For the standard case (i.e., LAN media), the per port initialization required prior to packet forwarding includes Virtual Router Creation and Provisioning as shown in FIG. 23. The following steps must be accomplished.

A1. CAS Create and Provisioning messages—The VR process is created by CAS and all VR provisioning messages (including all of those for VR subcomponents) are sent to this process.

A2. Each CAS provisioning message received by the VR for protocol subcomponents (including PCF and SNMP) are forwarded to those subcomponents processes. (The standard CAS provisioning message is used and forwarded to the protocol processes)

A3. The ProvDone message from CAS indicates that CAS has finished sending CAS provisioning message to the VR for this CAS session.

A4. The VR sends a ProvDone message to each of its subcomponents processes indicating to them that CAS has finished send provisioning messages for this CAS session. (The standard CAS provisioning message is used and forwarded to the protocol processes)

A5. Prior to giving up control of the Execution Engine (EE), the VR sends a PEV message to the CNS registering its process ID. (The standard CNS registration message type is used)

A6. After the Protocol Processes receive the ProvDone message, it can register with the VR. This registration indicates the protocols acceptance of local packets and the process ID which is to receive them.

Figure 24:
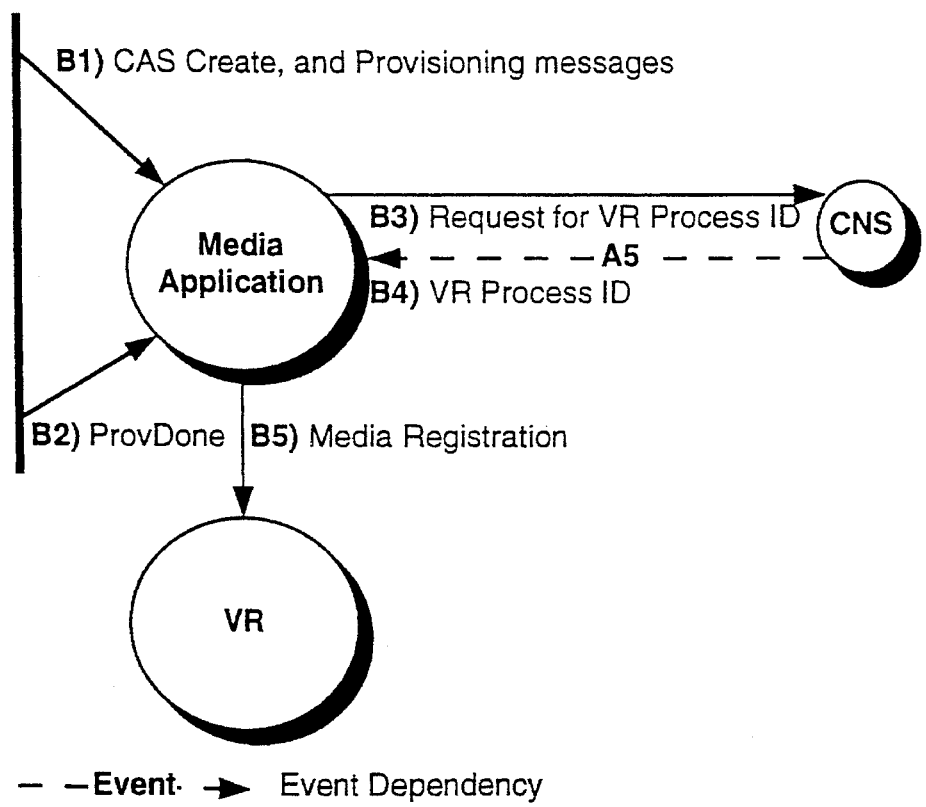
FIG. 24 is a block diagram which shows the per port initialization required prior to packet forwarding, including LAN Media Application Creation and Initialization, in accordance with the present invention.

In addition, LAN Media Application Creation and Initialization must be accomplished prior to packet forwarding as shown in FIG. 24. The following steps must be accomplished.

B1. CAS Create and Provisioning messages—The Media process is created by CAS and all provisioning messages are sent to this process.

B2. The ProvDone message from CAS indicates that CAS has finished sending CAS provisioning message to the Media for this CAS session.

B3. The Media application requests the process ID associated with the VR process. A linkage attribute in the Media Application defines the VR which is associated with this media. (The standard CNS registration message type is used)

B4. Some time later, the process ID associated with the request esVR is returned to the Media Application process. This event does not occur until event A5 has occurred. (The standard CNS registration message type is used)

B5. The Media Application registers with the VR. This notifies the VR of the Media's availability and process ID.

Figure 25:
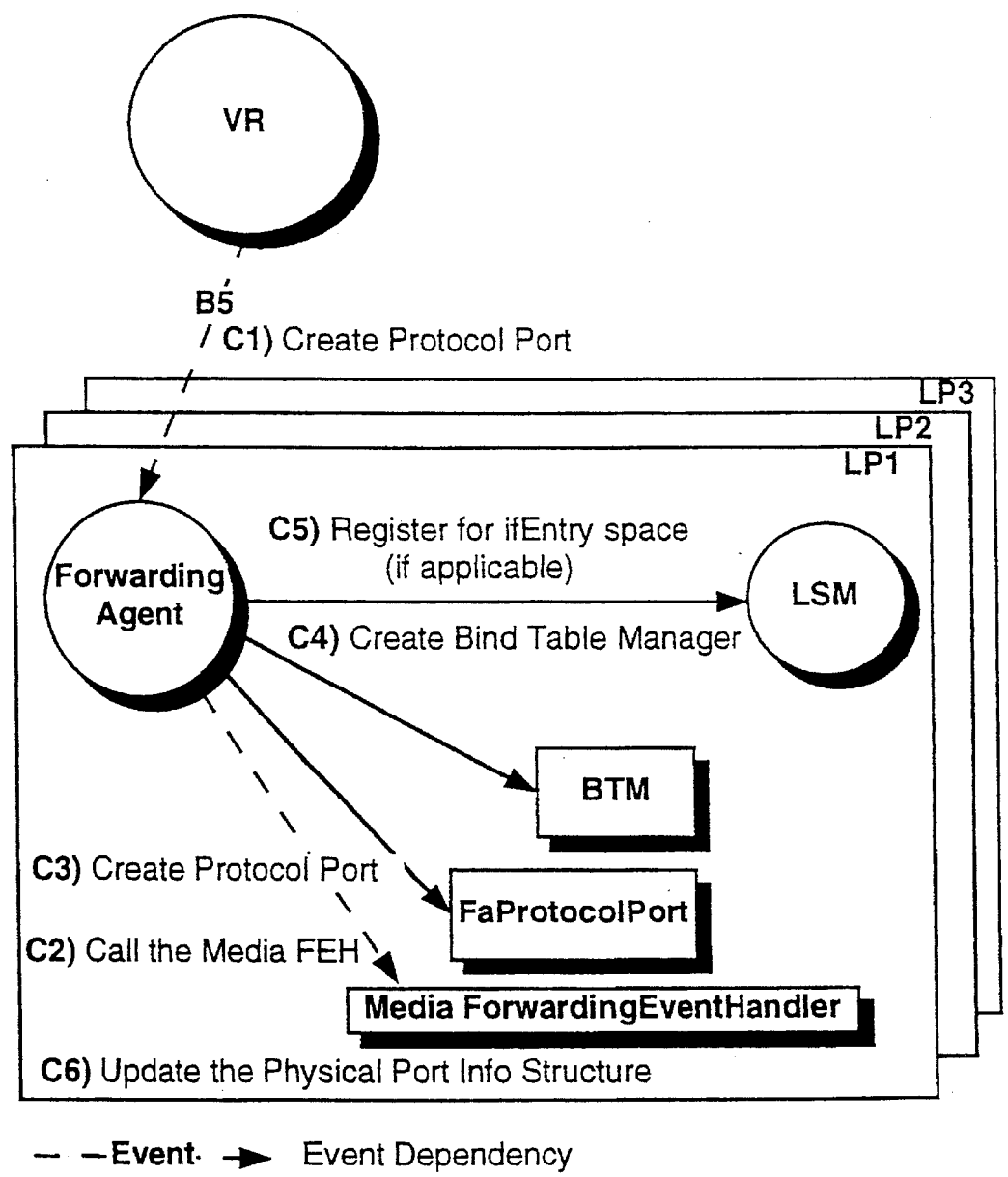
FIG. 25 is a block diagram which shows the Forwarding Data Distribution—LAN Media which occurs after the LAN Media Application Creation and Initialization steps shown in FIG. 24, in accordance with the present invention.

Also, Forwarding Data Distribution—LAN Media must be accomplished as shown in FIG. 25. The following steps must be accomplished.

C1. This event depends on event B5 having occurred. The Create Protocol Port event sends the generic protocol port information associated with one or more protocol ports to the relevant set of LPs. If this is the first PP which is created on this LP, PP information for all registered PPs are also sent to this LP. If this is not the first PP which is created on this LP, only the PP information for the registered PP is sent to this LP. The relevant set of LPs is all LPs which have a physical interface in the VR.

C2. Call the Media ForwardingEventHandler—Pass the Media Forwarding Data. The Media FEH creates the Media DME and any other Media required entities.

C3. If the LP which receives the create PP message is in the inboundLpSet, a FaInboundProtocolPort object is created, otherwise a FaOutboundProtocolPort object created.

C4. If the LP which receives the create PP message is in the inboundLpSet, create a BindTableManager and a fast BindTableManager and store pointers to then in the FaInboundProtocolPort object.

C5. If the ifEntryRegistration field is set in the faCreateProtocolPort message, space is allocated in Local Stats Manager (LSM) for the ifEntry. (LSM provides the message for this event.)

C6. Update the physicalPortInfo Structure—Set the pointer to the FaPP which is associated with the physical channel.

Figure 26:
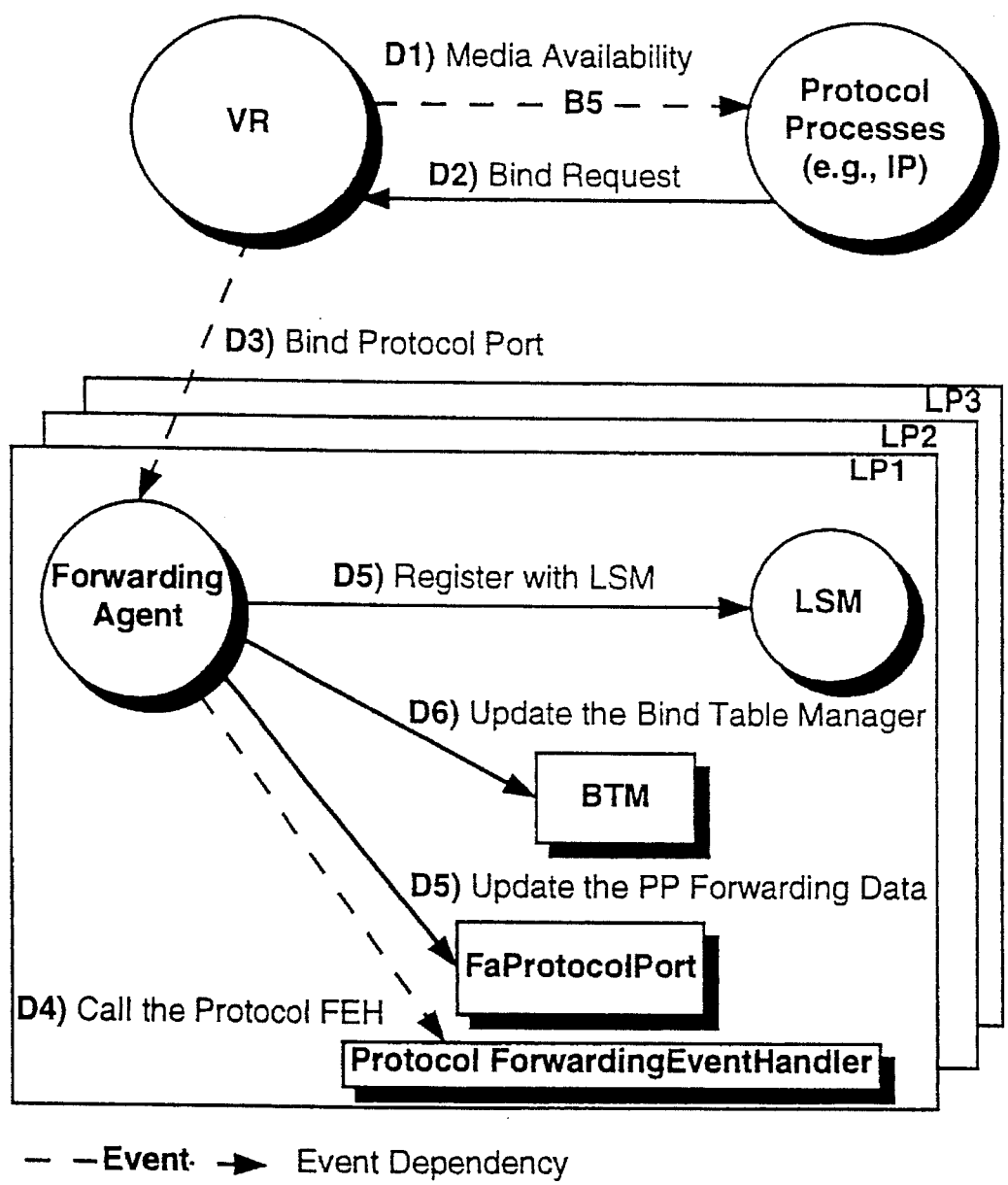
FIG. 26 is a block diagram which shows the Protocol Binding—LAN Media which occurs after the LAN Media Application Creation and Initialization steps shown in FIG. 24, in accordance with the present invention.

Also, Protocol Binding—LAN Media must be accomplished as shown in FIG. 26. The following steps must be accomplished.

D1. This event can only occur after event B5 occurs. B5 is the MediaRegistration event which indicates the media for the specified PP is available. This event notifies each protocol which is provisioned under the specified protocol port of the media's availability.

D2. The protocol, upon receipt of this mediaAvailability message can bind to a PP. This binding determines the actions which should occur for packets received for the specified protocol type.

D3. The BindProtocolPort event is used to send the bind information associated with the individual protocols to the appropriate LPs. Included in this bind information is Protocol Forwarding Data and Protocol Specific PP Forwarding Data. Protocol Forwarding Data includes the data specific to each protocol which is required by the forwarding software to forward packets. this information was included in the Protocol Registration (event A6). The Protocol Specific PP Forwarding Data includes forwarding data required by each protocols forwarding software which is associated with an individual PP.

D4. If the Protocol has not yet been enabled on this LP, the appropriate Protocol ForwardingEventHandler is called.

D5. The following events can occur in any order. Update the PP forwarding data in the FaPP. Also, Register with the Local Cache Manager (LCM) (Message is to be provided by the LCM).

D6. Update the state of the BTM—Update the forwarding state for the BTM.

Figure 27:
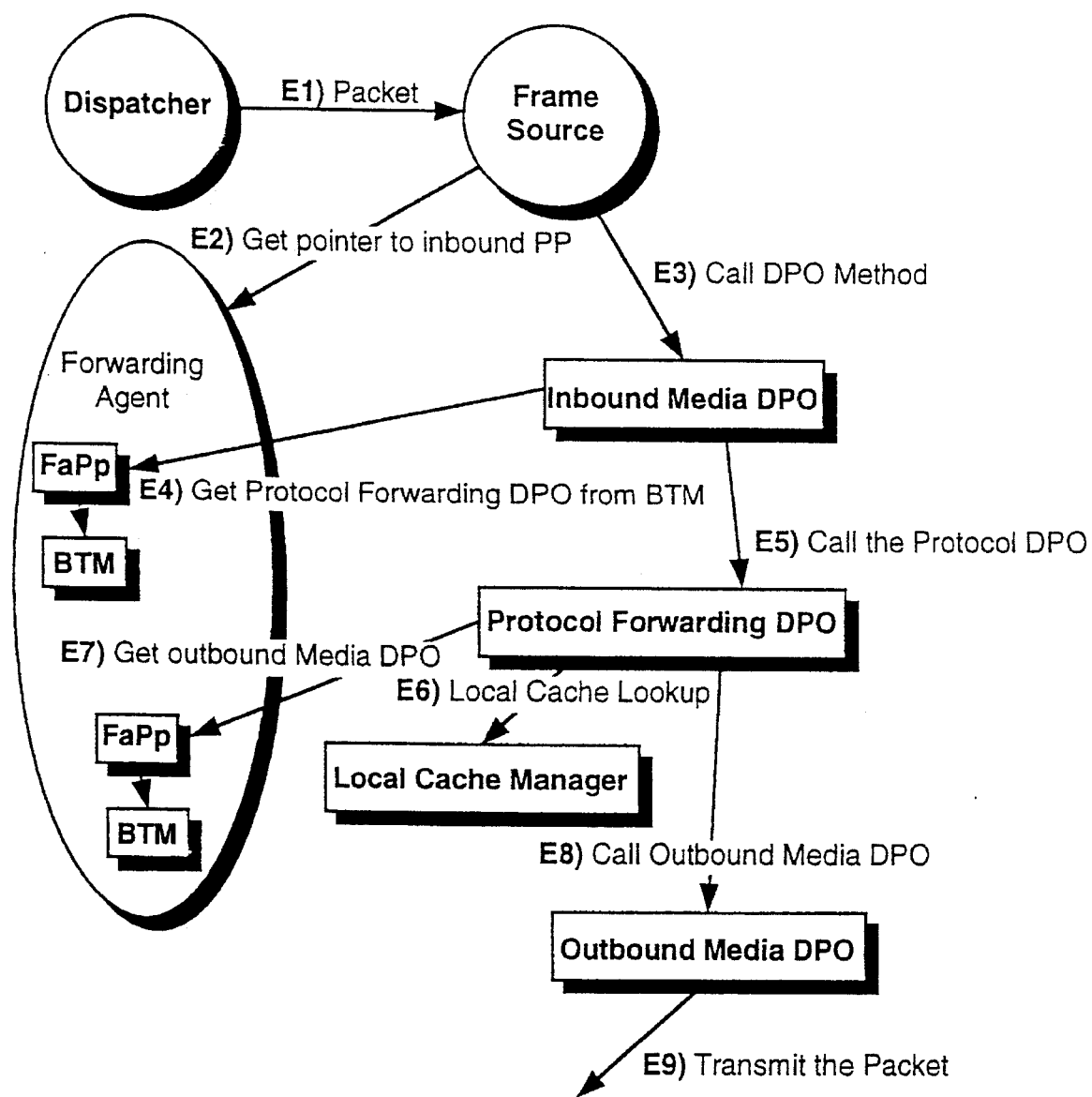
FIG. 27 is a block diagram which shows the Packet Forwarding—LAN Media in accordance with the present invention.

At this point, packets received by the Frame Source can be forwarded. The forwarding process works as shown in FIG. 27 (i.e., Packet Forwarding—LAN Media).

E1. The dispatcher pulls a packet off the inbound packet queue and calls the appropriate Media frame source with the physical channel number which the packet came from.

E2. The Frame Source gets a pointer to the Inbound PP object via the physicalPortInfo structure maintained by the FA.

E3. The inbound Media DME is called to process the packet.

E4. The protocol Forwarding DME is determined via the BTM. The inbound PP object has a pointer to the BTM.

E5. The protocol forwarding DME is called. The appropriate protocol processing is done.

E6. The protocol forwarding DME does a cache lookup to determine the outbound PP for which the packet is to be transmitted out. (Part of the cache entry is a pointer to the FaProtocolPort object)

E7. The outbound Media DME is retrieved from the FaProtocolPort object.

E8. The outbound Media DME is called to process the packet.

E9. The appropriate media processing is done and the packet is transmitted out the interface.

The major difference between the standard LAN case and the standard WAN case (not including PPP/VCP in the standard WAN case) is that the WAN case has its own mapping table from inbound packet to inbound PP. In the LAN case, the mapping to a PP is based on the inbound physical channel. For the RemoteGroup WAN case, the mapping to the PP object is based on data inside the packet (e.g. Frame Relay DLCI or Data Link Connection Indicator). The WAN component must initialize a table based on the mapping data to a ppId. The WAN media has a mapping from DLCI to PP instance ID, but they do not know what the PPID is associated with the PP instance. This is required to get a pointer to the PP object via the logicalPortInfo table supported by the FA. The WAN media gets the PP instance ID to PPID mapping from the VR during the createProtocolPort event. If the createProtocolNotification flag is set, the FA sends a notification to the WAN which includes the PP instance ID and the PPID.

Figure 28:
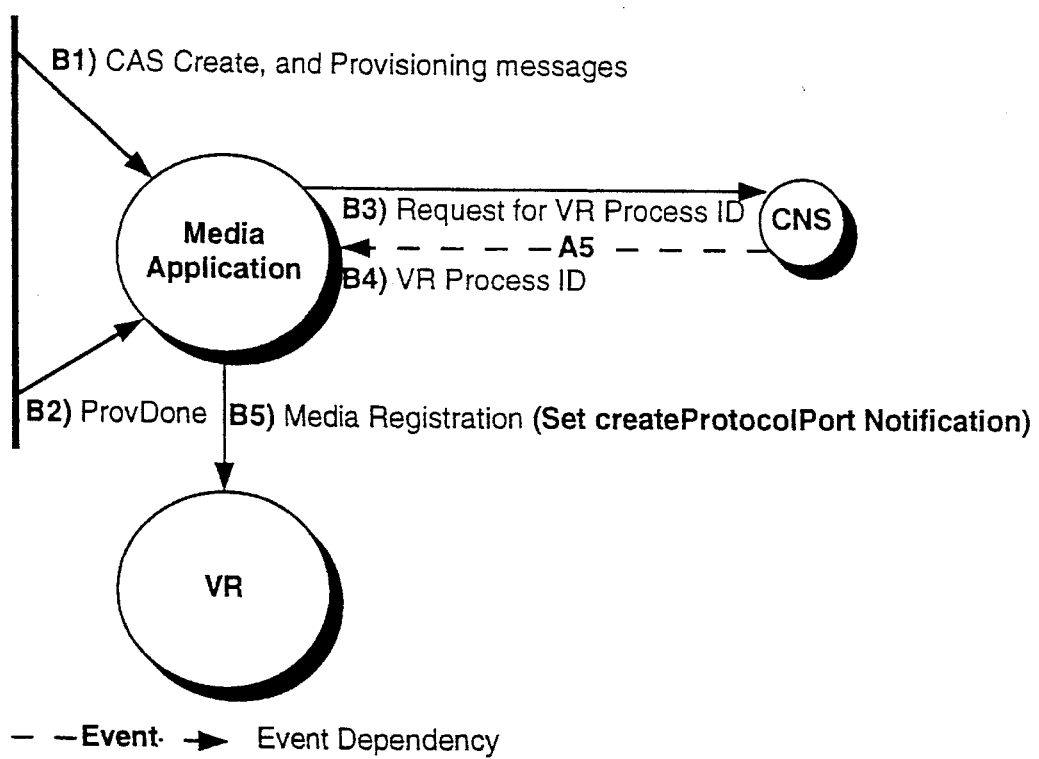
FIG. 28 is a block diagram which shows the per port initialization required prior to packet forwarding, including Media Application Creation and Initialization—Multi-point WAN, in accordance with the present invention.

Shown in FIG. 28 is the PP initialization for the multipoint WAN media (i.e., Media Application Creation and Initialization—Multi-point WAN). The following steps must be accomplished.

B1. CAS Create and Provisioning messages—The Media process is created by CAS and all provisioning messages are sent to this process.

B2. The ProvDone message from CAS indicates that CAS has finished sending CAS provisioning message to the Media for this CAS session.

B3. The Media application requests the process ID associated with the VR process. A linkage attribute in the Media Application defines the VR which is associated with this media. (The standard CNS registration message type is used)

B4. Some time later, the process ID associated with the request esVR is returned to the Media Application process. This event does not occur until event A5 has occurred. (The standard CNS registration message type is used)

B5. The Media Application registers with the VR. This notifies the VR of the Media's availability and process ID. The createProtocolPortNotification field is set to ensure the Media Application is notified of the PPID when it is created on the LP.

Figure 29:
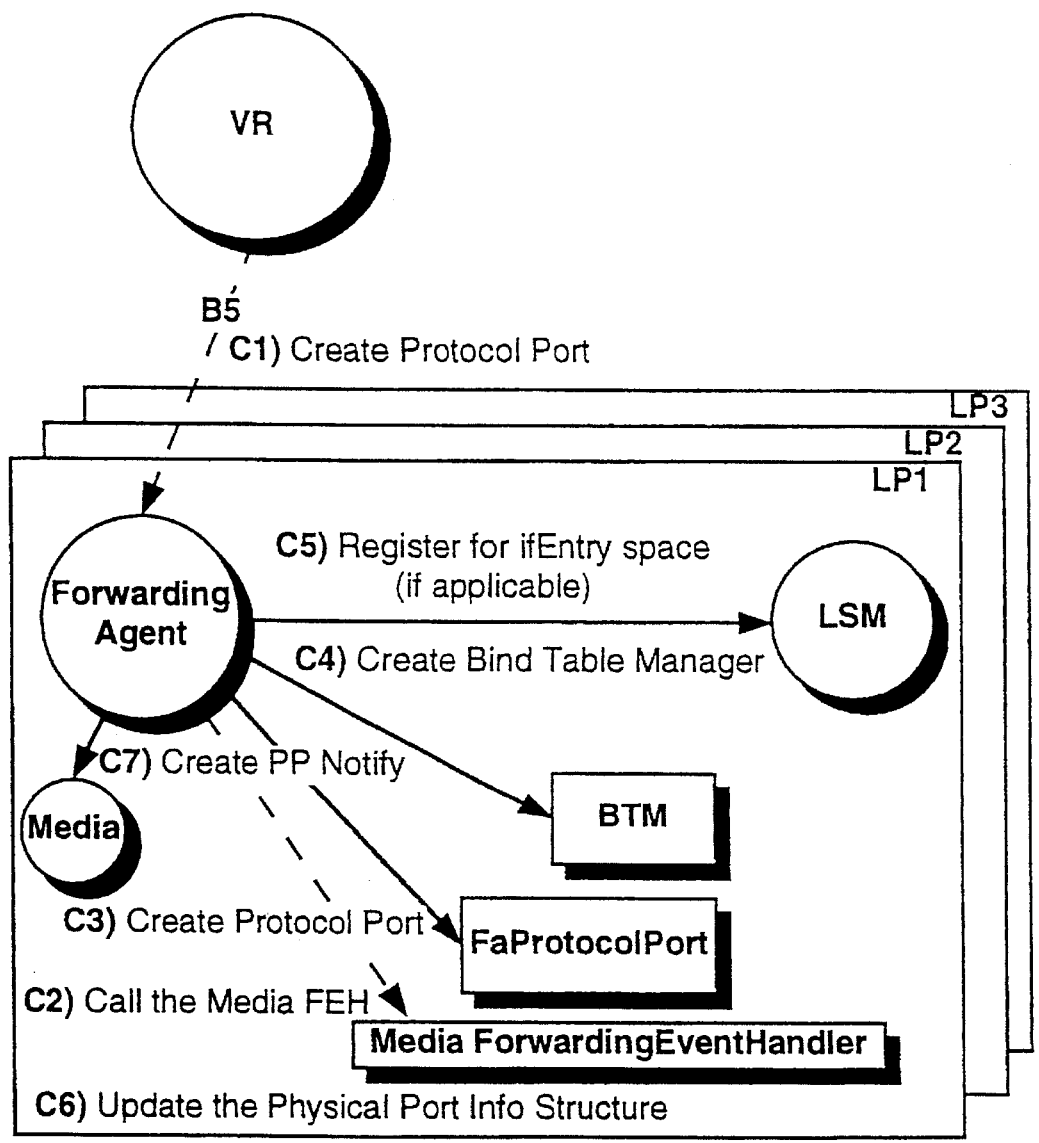
FIG. 29 is a block diagram which shows the Forwarding Data Distribution—Multi-point WAN which occurs after the Media Application Creation and Initialization steps shown in FIG. 28, in accordance with the present invention.

Also, Forwarding Data Distribution—Multi-point WAN must be accomplished as shown in FIG. 29. The following steps must be accomplished.

C1. This event depends on event B5 having occured. The Create Protocol Port event sends the generic protocol port information associated with one or more protocol ports to the relevant set of LPs. If this is the first PP which is created on this LP, PP information for all registered PPs are also sent to this LP. If this is not the first PP which is created on this LP, only the PP information for the registered PP is sent to this LP. The relevant set of LPs is all LPs which have a physical interface in the VR.

C2. Call the Media ForwardingEventHandler—Pass the Media Forwarding Data. The Media FEH creates the Media DME and any other Media required entities.

C3. If the LP which receives the create PP message is in the inboundLpSet, a FaInboundProtocolPort object is created, otherwise a FaOutboundProtocolPort object created.

C4. If the LP which receives the create PP message is in the inboundLpSet, create a BindTableManager and a fast BindTableManager and store pointers to then in the FaInboundProtocolPort object.

C5. If the ifEntryRegistration field is set in the faCreateProtocolPort message, space is allocated in LSM for the ifEntry. (LSM provides the message for this event.)

C6. Update the logicalPortInfo Structure—Set the pointer to the FaPP which is associated with the PP identifier (PPID).

C7. Send a CreateProtocolPort notification to the Media Application. This notifies the Media of the PPs creation and the PPID associated with it.

Figure 30:
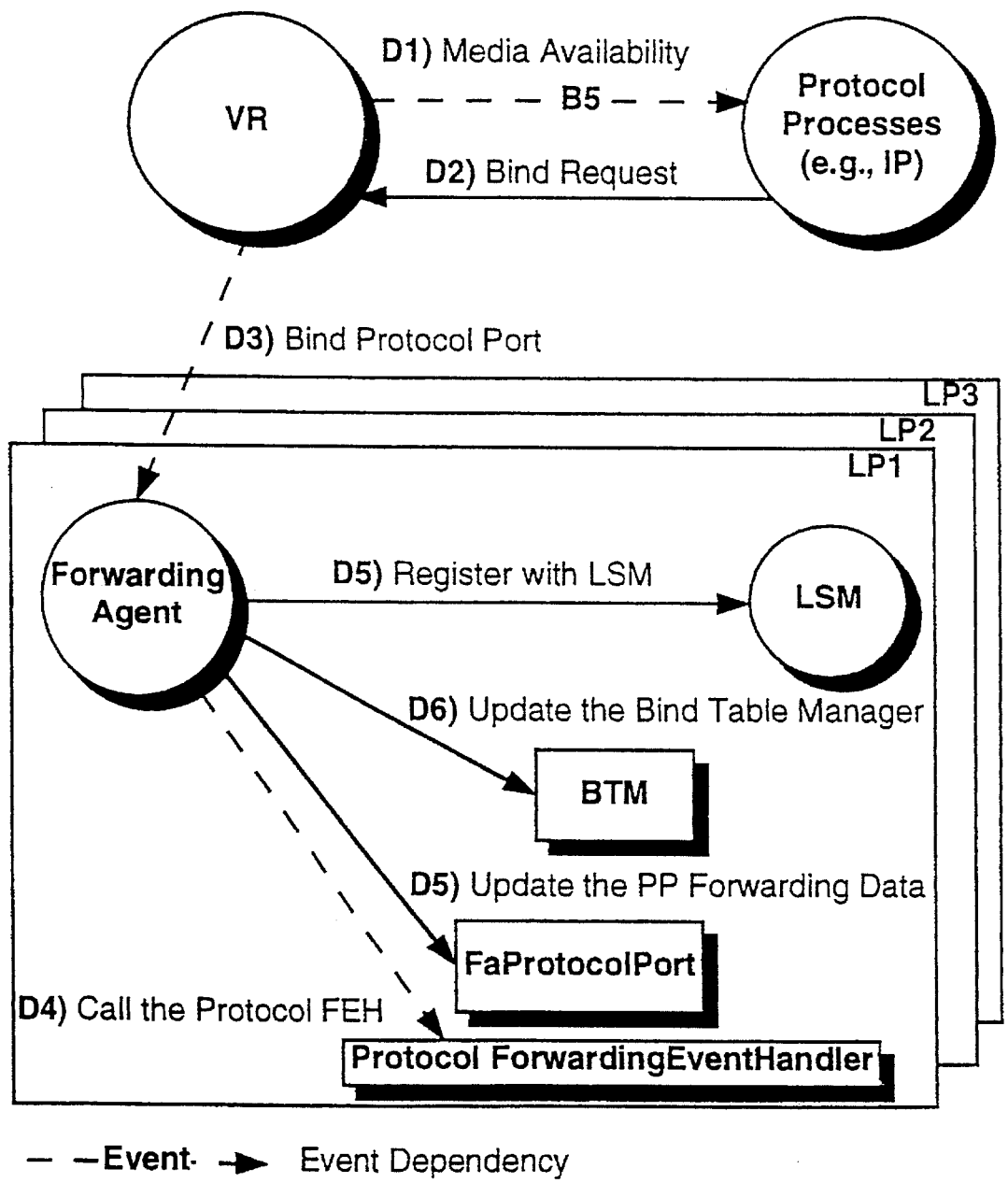
FIG. 30 is a block diagram which shows the Protocol Binding—Multi-point WAN which occurs after the Media Application Creation and Initialization steps shown in FIG. 28, in accordance with the present invention.

Also, Protocol Binding—Multi-point WAN must be accomplished as shown in FIG. 30. The following steps must be accomplished.

D1. This event can only occur after event B5 occurs. B5 is the MediaRegistration event which indicates the media for the specified PP is available. This event notifies each protocol which is provisioned under the specified protocol port of the media's availability.

D2. The protocol, upon receipt of this mediaAvailability message can bind to a PP. This binding determines the actions which should occur for packets received for the specified protocol type.

D3. The BindProtocolPort event is used to send the bind information associated with the individual protocols to the appropriate LPs. Included in this bind information is Protocol Forwarding Data and Protocol Specific PP Forwarding Data. Protocol Forwarding Data includes the data specific to each protocol which is required by the forwarding software to forward packets. this information was included in the Protocol Registration (event A6). Also, the Protocol Specific PP Forwarding Data includes forwarding data required by each protocols forwarding software which is associated with an individual PP.

D4. If the Protocol has not yet been enabled on this LP, the appropriate Protocol ForwardingEventHandler is called.

D5. The following events can occur in any order. Update the PP forwarding data in the FaPP. Also, Register with the LCM (Message is to be provided by the LCM).

D6. Update the state of the BTM—Update the forwarding state for the BTM.

Figure 31:
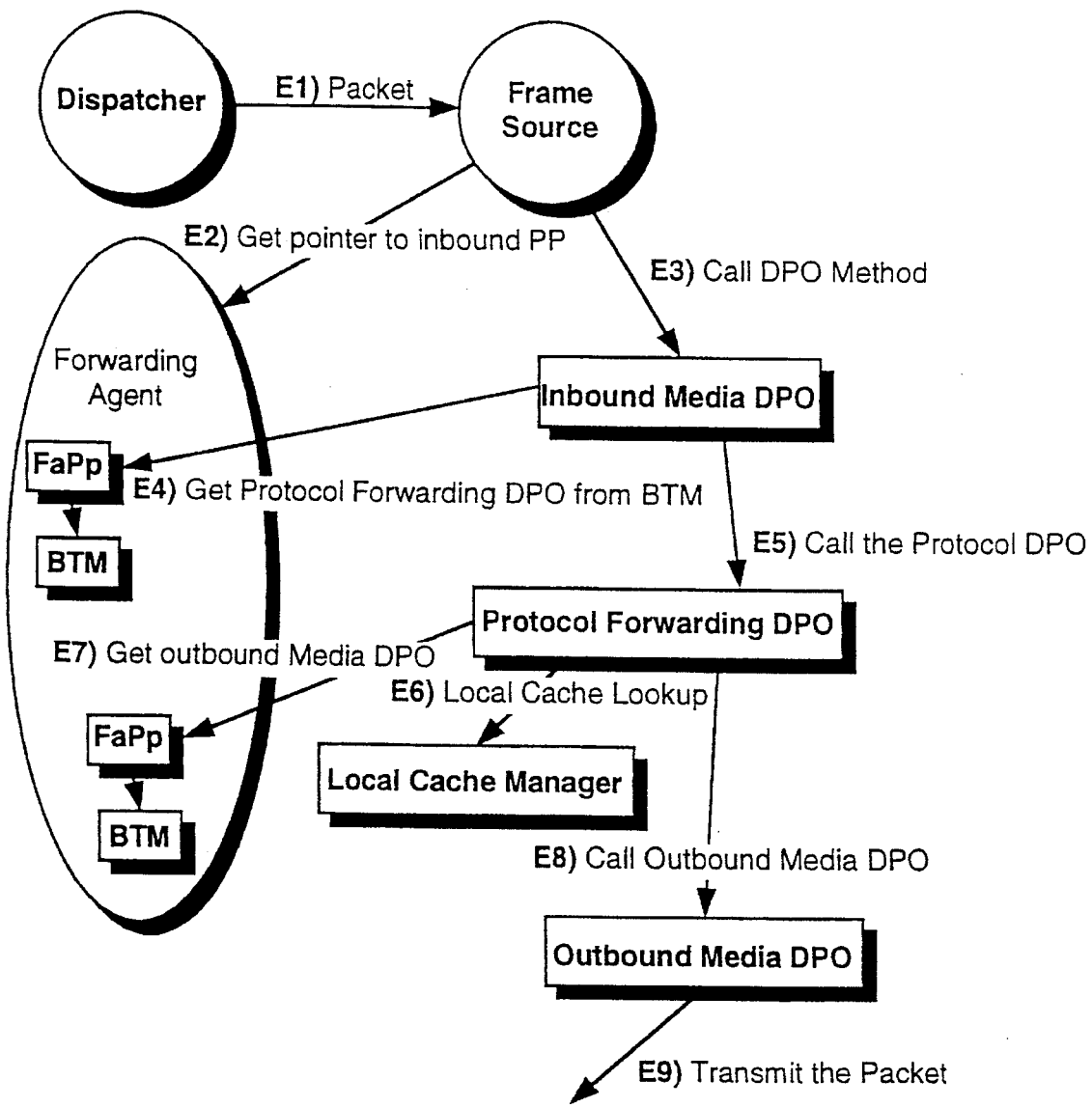
FIG. 31 is a block diagram which shows the Packet Forwarding—Multi-point WAN in accordance with the present invention.

At this point, packets received by the Frame Source can be forwarded. The forwarding process works as shown in FIG. 31 (i.e., Packet Forwarding—Multi-point WAN).

E1. The dispatcher pulls a packet off the inbound packet queue and calls the appropriate Media frame source with the physical channel number which the packet came from.

E2. The Frame Source gets a pointer to the Inbound PP object via its own mapping from DLCI to PPID and then from PPID to PP object pointer via the logicalPortInfo structure maintained by the FA.

E3. The inbound Media DME is called to process the packet.

E4. The protocol Forwarding DME is determined via the BTM. The inbound PP object has a pointer to the BTM.

E5. The protocol forwarding DME is called. The appropriate protocol processing is done.

E6. The protocol forwarding DME does a cache lookup to determine the outbound PP for which the packet is to be transmitted out. (Part of the cache entry is a pointer to the FaProtocolPort object)

E7. The outbound Media DME is retrieved from the FaProtocolPort object.

E8. The outbound Media DME is called to process the packet.

E9. The appropriate media processing is done and the packet is transmitted out the interface.

Figure 32:
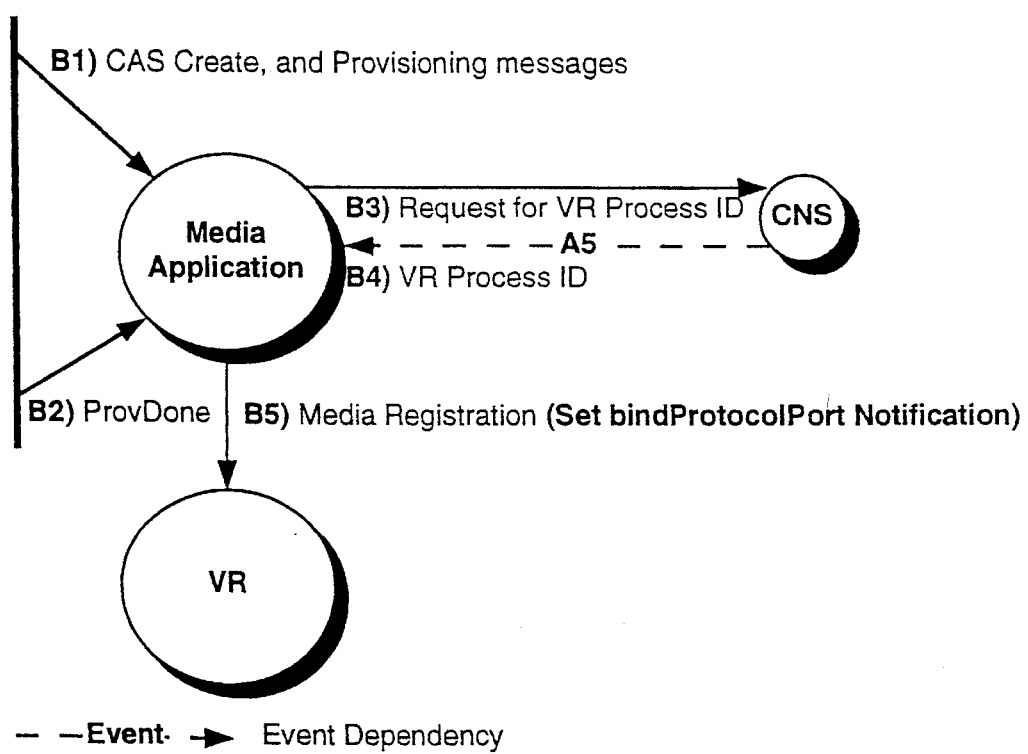
FIG. 32 is a block diagram which shows the per port initialization required prior to packet forwarding, including Media Application Creation and Initialization—Point to Point Protocol (PPP) WAN, in accordance with the present invention.

Shown in FIG. 32 is the PP initialization for the Point to Point Protocol (PPP) WAN Media (i.e., Media Application Creation and Initialization—PPP WAN). The following steps must be accomplished.

B1. CAS Create and Provisioning messages—The Media process is created by CAS and all provisioning messages are sent to this process.

B2. The ProvDone message from CAS indicates that CAS has finished sending CAS provisioning message to the Media for this CAS session.

B3. The Media application requests the process ID associated with the VR process. A linkage attribute in the Media Application defines the VR which is associated with this media. (The standard CNS registration message type is used)

B4. Some time later, the process ID associated with the request esVR is returned to the Media Application process. This event does not occur until event A5 has occurred. (The standard CNS registration message type is used)

B5. The Media Application registers with the VR. This notifies the VR of the Media's availability and process ID. The bindProtocolPortNotification field is set to ensure the Media Application is notified when the PP is bound to. This value is stored in the VR PP.

Figure 33:
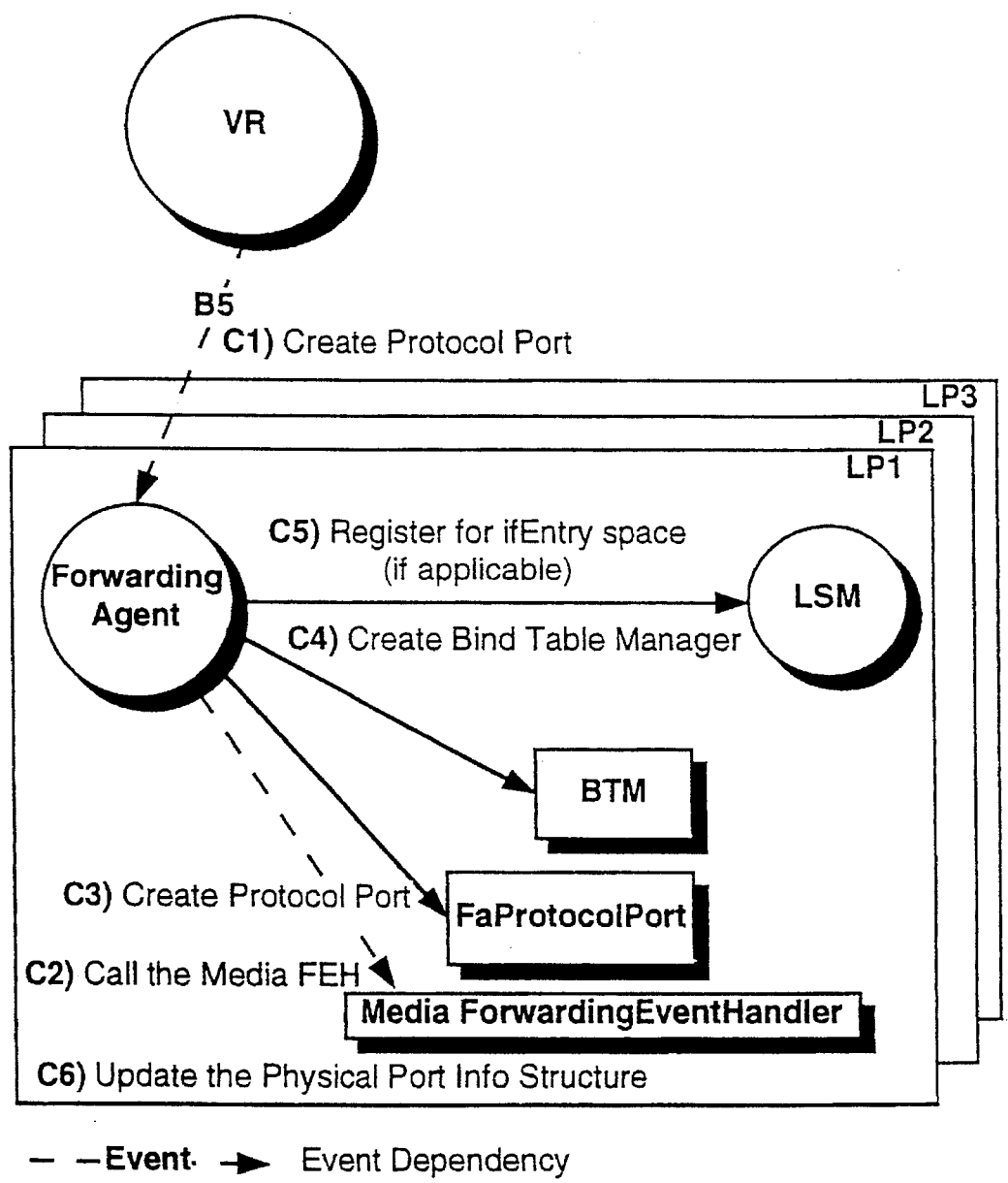
FIG. 33 is a block diagram which shows the Forwarding Data Distribution—PPP WAN which occurs after the Media Application Creation and Initialization steps shown in FIG. 32, in accordance with the present invention.

Also, Forwarding Data Distribution—PPP WAN must be accomplished as shown in FIG. 33. The following steps must be accomplished.

C1. This event depends on event B5 having occured. The Create Protocol Port event sends the generic protocol port information associated with one or more protocol ports to the relevant set of LPs. If this is the first PP which is created on this LP, PP information for all registered PPs are also sent to this LP. If this is not the first PP which is created on this LP, only the PP information for the registered PP is sent to this LP. The relevant set of LPs is all LPs which have a physical interface in the VR.

C2. Call the Media ForwardingEventHandler—Pass the Media Forwarding Data. The Media FEH creates the Media DME and any other Media required entities.

C3. If the LP which receives the create PP message is in the inboundLpSet, a FainboundProtocolPort object is created, otherwise a FaOutboundProtocolPort object created.

C4. If the LP which receives the create PP message is in the inboundLpSet, create a BindTableManager and a fast BindTableManager and store pointers to then in the FaInboundProtocolPort object.

C5. If the ifEntryRegistration field is set in the faCreateProtocolPort message, space is allocated in LSM for the ifEntry. (LSM provides the message for this event.)

Figure 34:
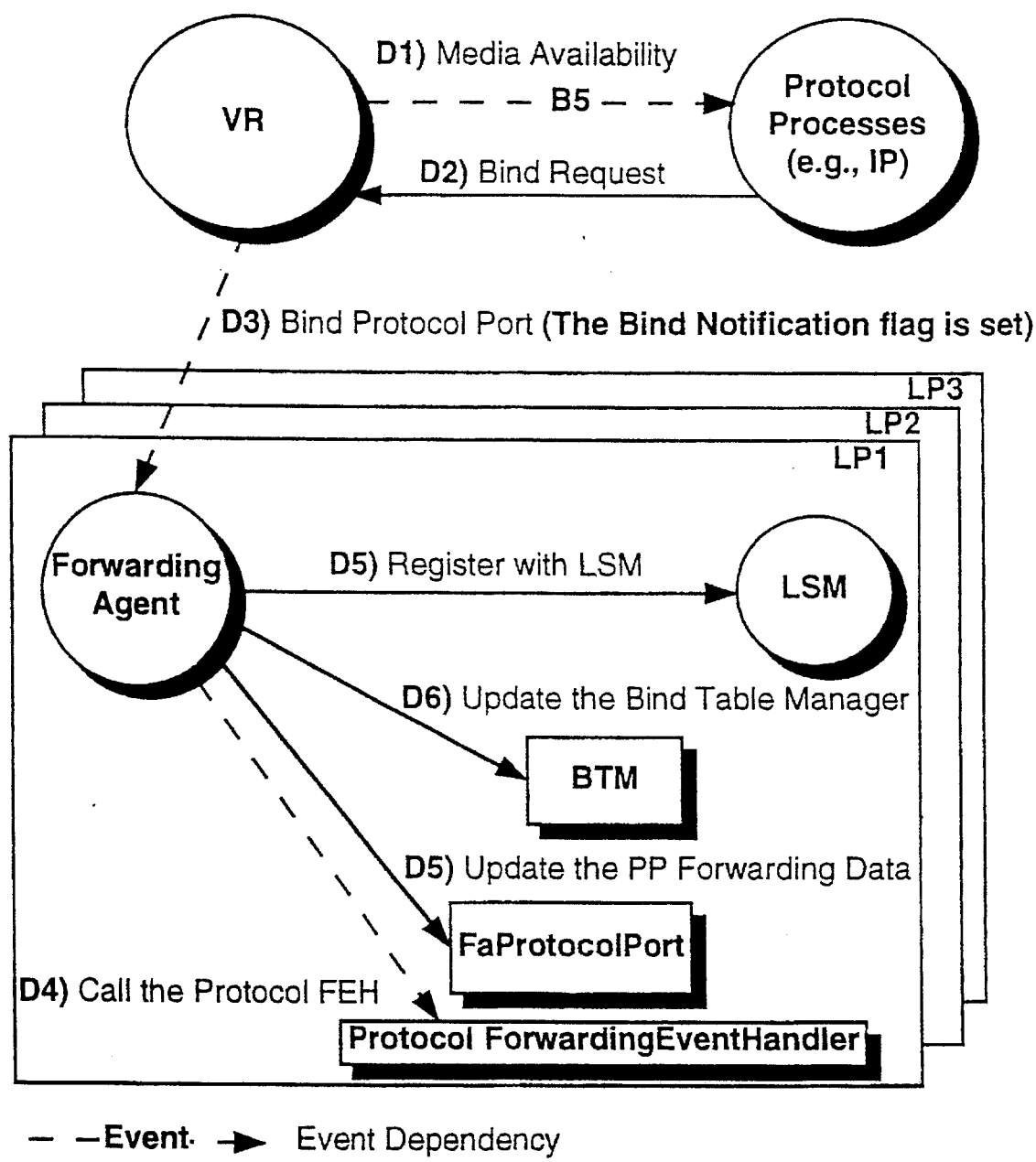
FIG. 34 is a block diagram which shows the Protocol Binding—PPP WAN which occurs after the Media Application Creation and Initialization steps shown in FIG. 28, in accordance with the present invention.

C6. Update the physicalPortInfo Structure—Set the pointer to the FaPP which is associated with the physical channel. Also, Protocol Binding—PPP WAN must be accomplished as shown in FIG. 34. The following steps must be accomplished.

D1. This event can only occur after event B5 occurs. B5 is the MediaRegistration event which indicates the media for the specified PP is available. This event notifies each protocol which is provisioned under the specified protocol port of the media's availability.

D2. The protocol, upon receipt of this mediaAvailability message can bind to a PP. This binding determines the actions which should occur for packets received for the specified protocol type.

D3. The BindProtocolPort event is used to send the bind information associated with the individual protocols to the appropriate LPs. Included in this bind information is Protocol Forwarding Data and Protocol Specific PP Forwarding Data. The mediaApplicationBindNotification field is set in this message. The Protocol Forwarding Data includes the data specific to each protocol which is required by the forwarding software to forward packets. this information was included in the Protocol Registration (event A6). The Protocol Specific PP Forwarding Data includes forwarding data required by each protocol's forwarding software which is associated with an individual PP.

D4. If the Protocol has not yet been enabled on this LP, the appropriate Protocol ForwardingEventHandler is called.

D5. The following events can occur in any order. Update the PP forwarding data in the FaPP. Also, register with the LCM (Message is to be provided by the LCM).

D6. Update the state of the BTM—Update the forwarding state for the BTM.

D7. A bind notification is sent to the media Application.

Figure 35:
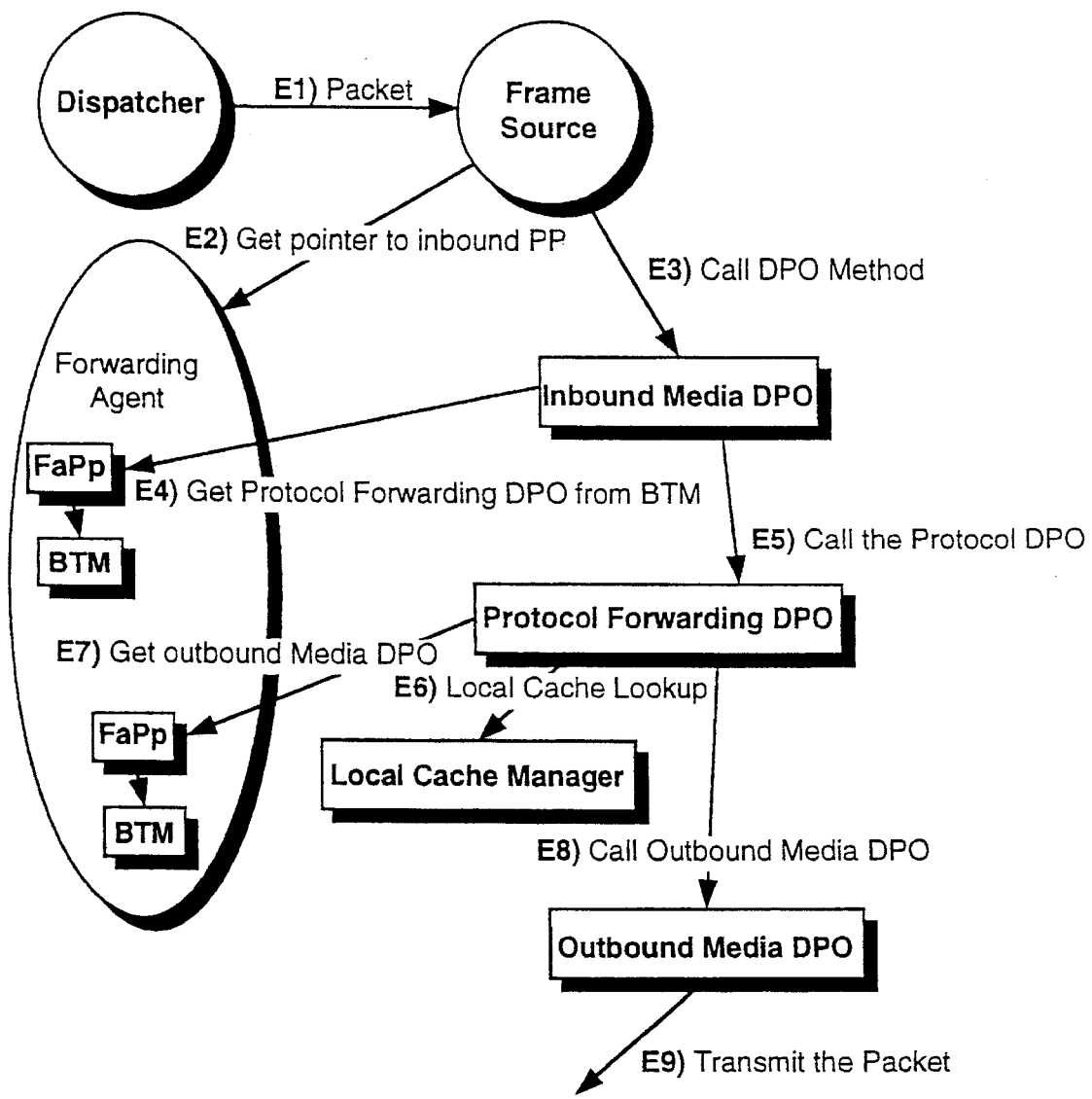
FIG. 35 is a block diagram which shows the Packet Forwarding—PPP WAN in accordance with the present invention.

At this point, packets received by the Frame Source can be forwarded. The forwarding process works as shown in FIG. 35 (i.e., Packet Forwarding—PPP WAN).

E1. The dispatcher pulls a packet off the inbound packet queue and calls the appropriate Media frame source with the physical channel number which the packet came from.

E2. The Frame Source gets a pointer to the Inbound PP object via its own mapping from DLCI to PPID and then from PPID to PP object pointer via the logicalPortInfo structure maintained by the FA.

E3. The inbound Media DME is called to process the packet.

E4. The protocol Forwarding DME is determined via the BTM. The inbound PP object has a pointer to the BTM.

E5. The protocol forwarding DME is called. The appropriate protocol processing is done.

E6. The protocol forwarding DME does a cache lookup to determine the outbound PP for which the packet is to be transmitted out. (Part of the cache entry is a pointer to the FaProtocolPort object)

E7. The outbound Media DME is retrieved from the FaProtocolPort object.

E8. The outbound Media DME is called to process the packet.

E9. The appropriate media processing is done and the packet is transmitted out the interface.

The Virtual Link is a medium which supports Inter-Virtual Router connectivity. That is the ability to interconnect two Virtual Routers. Although it is possible to do this using a real LAN connection and two physical ports, this mechanism provides the same functionality without the involvement and expense of hardware.

This section describes the VR requirements to support Inter-Virtual Router (IVR) links. Multiple solutions were conceived regarding methods of logically connecting VRs. The solution chosen was to use a point to point model called a "VirtualLink".

Forwarding a packet from one VR through another VR and out a physical interface requires forwarding data (local cache and protocol port information) for both VRs, the inbound VR and the outbound VR. Two alternatives were discussed regarding the location of forwarding data on the VRs. One solution was to put forwarding data on all LPs which could potentially send a packet out a VR. Given this alternative, each LP had to have routing data for VRs which had physical interfaces on its LP as well as VRs which it was connected to via IVR links. This solution was not deemed usable because of the amount of memory it required.

The second solution was to provide only the routing data for VRs supported by this LPs physical interfaces. This would eliminate the need to have routing data for all VRs which could be reached via IVR links. The major disadvantage with this solution is that total packet processing could not be achieved on one LP for IVR packets. If the inbound LP did not have physical interfaces for the outbound VR, it would not have routing data for the outbound VR, thus the packet would have to be sent to an LP which had the data. This requires an additional amount of effort to forward a packet, however the impact of performance for IVR packets doesn't seem to be a major concern.

Virtual Link Data identifies the remote PP and VR associated with a IVR PP. This data exists in the Virtual Link component. Because the Virtual Link component is under casRoot (thus the VR does not get the data for it), it must send this data to both VRs involved and is stored in the appropriate PP objects. This requires a VirtualLinkMedia process to accept the CAS provisioned data and forward it to the VRs.

The second part of the Virtual Link data is data which identifies which LPs have forwarding data for each VR/protocol pair. This data is stored in on each VR in an object called VirtualLinkData. The Virtual Link Data consists of a two dimensional array indexed by LP number and VR number. The data is learned by the VR, and forwarded to all LPs. When this data is received on the LPs, the FA determines the LP to be used for packet processing for each IVR PP on the LP. To determine the LP to be used, a forward search of the array starting with the current LP is done until an LP is found that supports the destination VR. Using this method, the current LP always is used if possible. (The virtualLink data is forwarded to LPs if one or more PPs are registered with Virtual Link Media)

Figure 36:
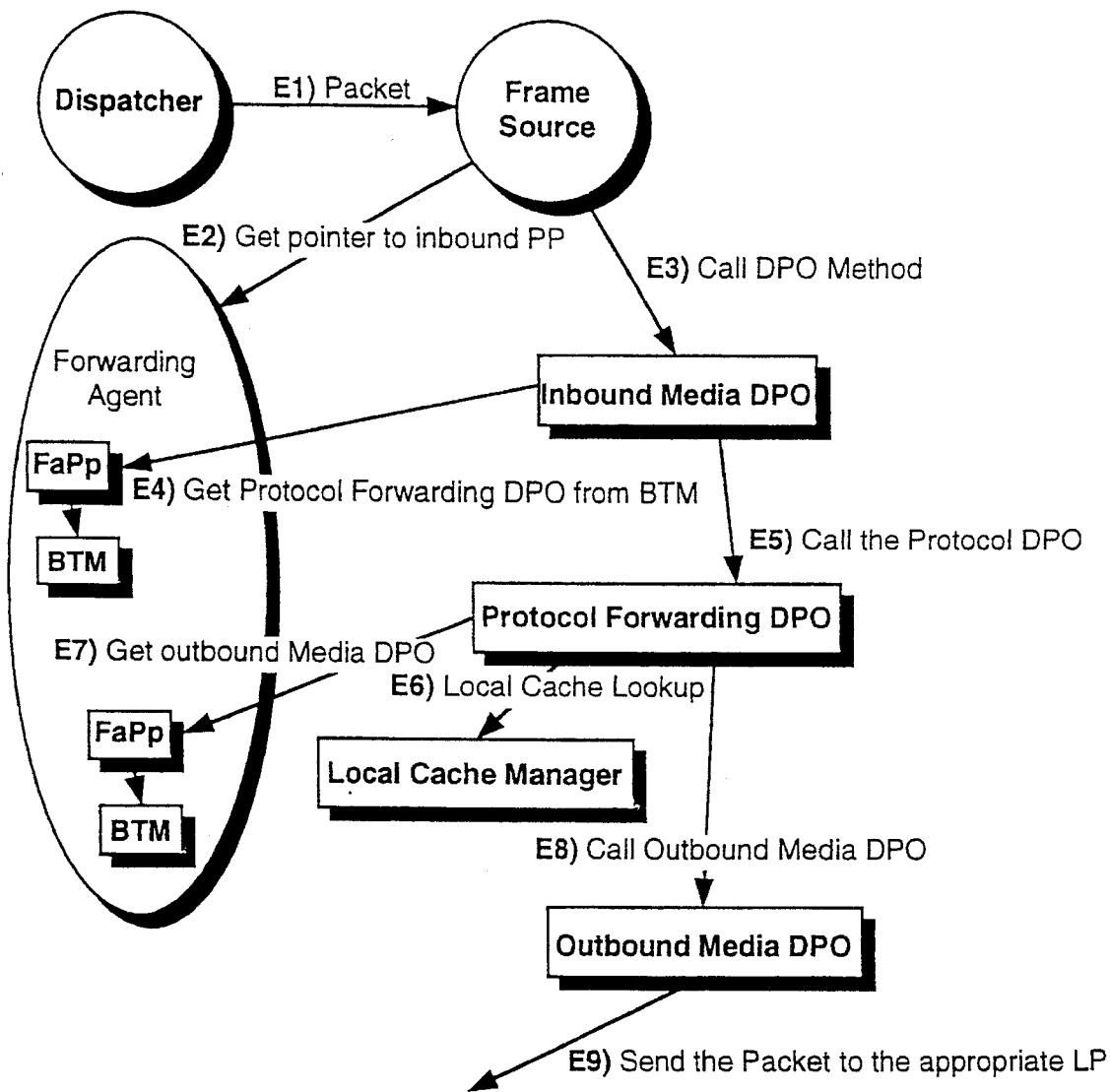
FIGS. 36 and 37 are block diagrams which show the Packet Forwarding for Virtual Link Media in accordance with the present invention.
Figure 37:
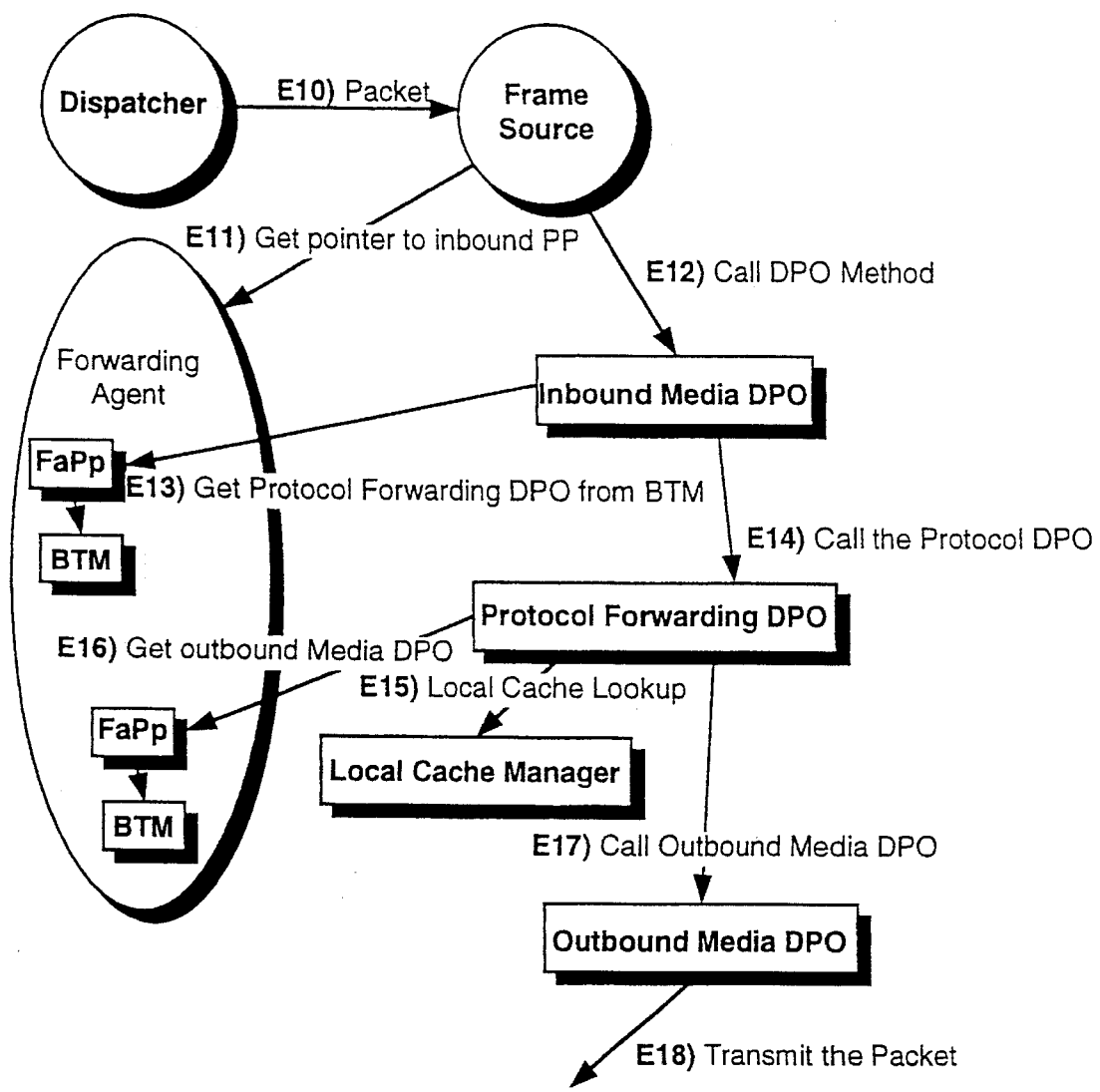

The Virtual Link Media Application is used to support inter-VR links. The Virtual Link Media initialization process is identical to the process used by the LAN media. However there are some difference in the packet forwarding process. The packet forwarding process for Virtual Link (VL) media is shown in FIGS. 36 and 37. The following steps must be accomplished.

E1. The dispatcher pulls a packet off the inbound packet queue and calls the appropriate Media frame source with the physical channel number which the packet came from (This is the standard physical PP, not the IVR PP).

E2. The Frame Source gets a pointer to the Inbound PP object via the physicalPortInfo structure maintained by the FA.

E3. The inbound Media DME is called to process the packet.

E4. The protocol Forwarding DME is determined via the BTM. The inbound PP object has a pointer to the BTM.

E5. The protocol forwarding DME is called. The appropriate protocol processing is done.

E6. The protocol forwarding DME does a cache lookup to determine the outbound PP for which the packet is to be transmitted out. (Part of the cache entry is a pointer to the FaProtocolPort object)

E7. The outbound Media DME is retrieved from the FaProtocolPort object.

E8. The outbound Media DME is called to process the packet. This is the outbound media application DME for the IVR PP.

The IVR media outbound DME determines the far end VR. This information is part of the PP forwarding data.

The packet context is changed, specifically the VR number is changed to the destination VR and the inbound PP number is changed to the IVR PP number.

The IVR media outbound DME determines which LP has routing information for this protocol and this VR. (This information is provided by the VR in the VirtualLinkData table. A forward search is done of the table by VR and LP number. The first LP found which supports this VR and protocol is used.)

E9. The packet is sent to the LP identified in the previous step (if the current LP supports the destination VR, then this step is skipped)

E10. If the packet was forwarded to another LP, the packet is received by the dispatcher, and the Frame Source is called.

E11. The Frame source determines that this is an IVR packet and gets a pointer to the inbound PP associated with the inbound PPID.

E12. The inbound Media Application DME is called (this is the IVR media inbound DME).

E13. The protocol type is determined, and the protocol DME is retrieved from the BTM.

E14. The protocol DME is called to forward the packet.

E15. The protocol DME does the appropriate packet processing including a cache lookup on the destination address in the packet. A successful cache lookup provides a pointer to the outbound PP for which the packet is to be transmitted.

E16. The outbound Media DME is retrieved from the PP object.

E17. The protocol DME fragments the packet if necessary and transmits it out the outbound PP by calling the outbound media DME as identified in the PP structure.

E18. The Media Application outbound DME adds the appropriate media header and sends the packet out the interface.

Figure 38:
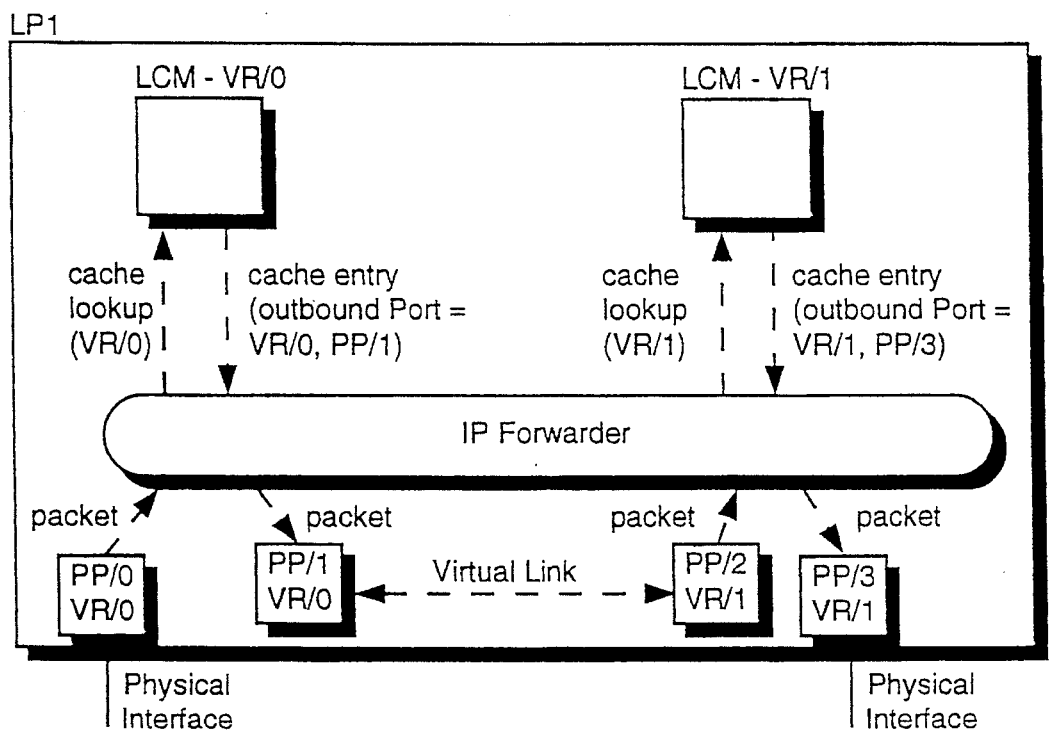
FIG. 38 is a block diagram which shows an example where the outbound physical port is on the same logical port (LP) as the inbound physical port in accordance with the present invention.

The Virtual Link simulates the transmission of a packet out an interface of one VR and the reception of the packet on an interface on the destination VR. A packet which is received on an interface is sent to the appropriate forwarder based on the packet type and the bind information associated with the inbound PP. The forwarder, based on routing information, determines the outbound PP is a IVR PP. The packet is transmitted out the PP (via the outbound media DME). It is the responsibility of the IVR PP Media DME to get the packet to a LP which has routing data for the destination VR. This information if provided by the FA in the VirtualLinkData object. If the current LP has the appropriate routing data, the packet is given back to the forwarding software with an updated frame descriptor which includes a new VR ID and new inbound PPID. The forwarding software can then restart the packet forwarding process using the routing data of the outbound VR. Shown in FIG. 38 is an example where the outbound physical port is on the same LP as the inbound physical port.

Figure 39:
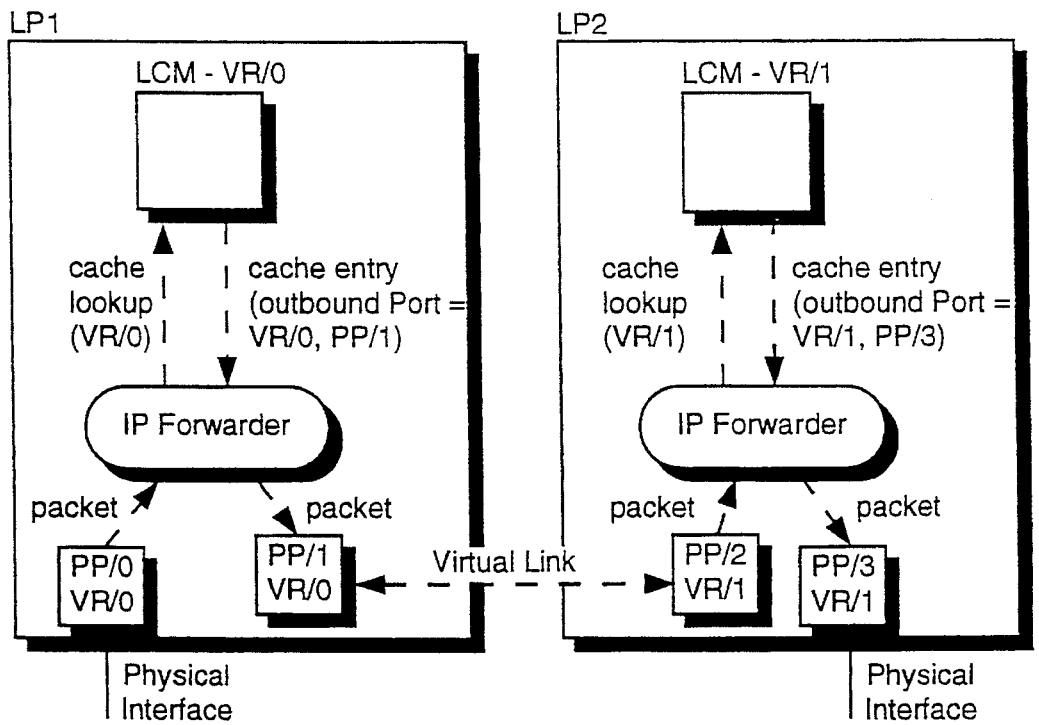
FIGS. 39 and 40 are block diagrams which show other examples of outbound and inbound physical port assignments in accordance with the present invention.
Figure 40:
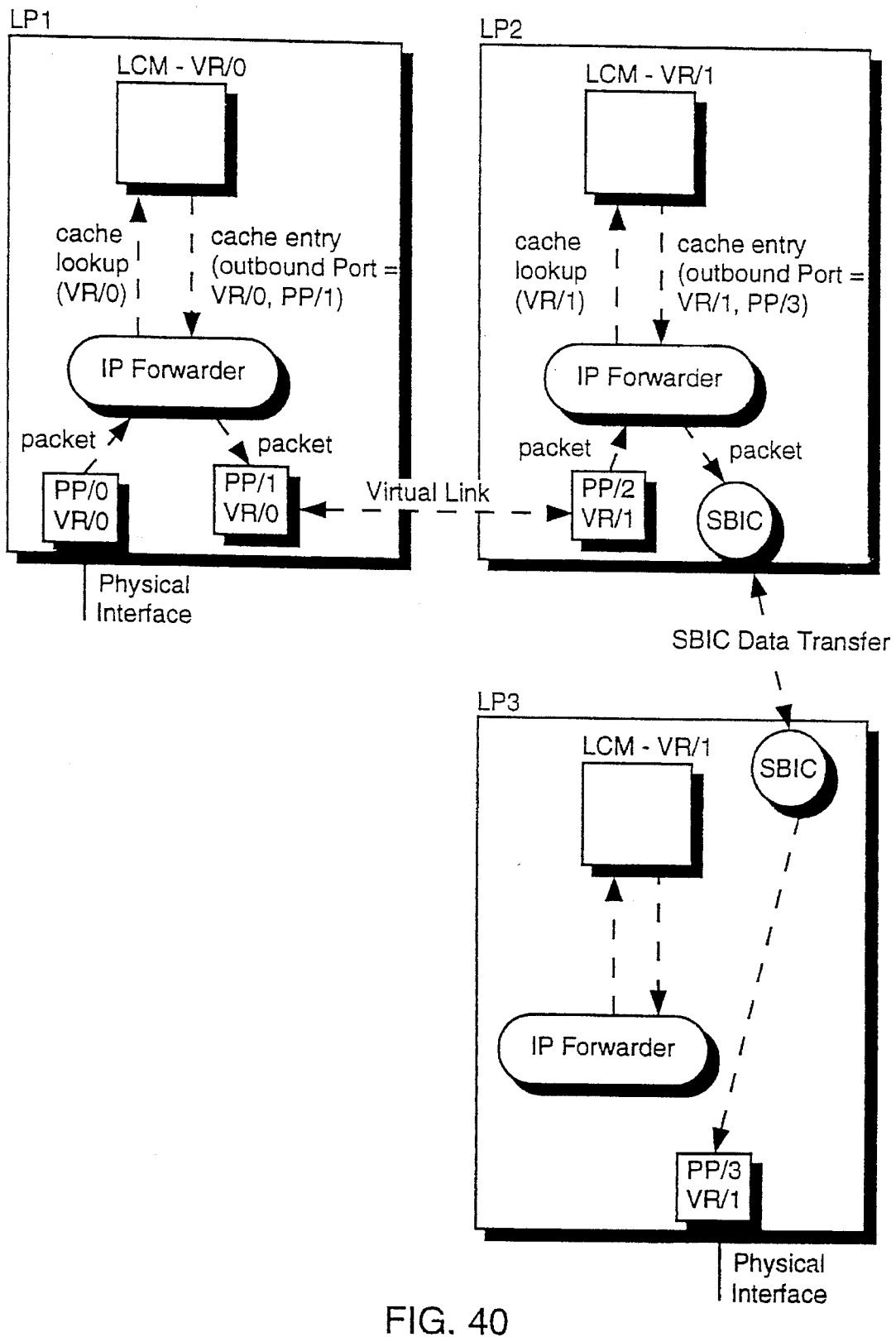

If the LP which to packet was received on does not have the routing data for the outbound VR, the packet must be transmitted to an LP which does. Again the outbound IVR PP is responsible for getting the packet to an LP which supports the outbound VR. If the current LP does not support the outbound VR, the PP sends the packet to a LP which does. Once the packet is received on the LP which has appropriate routing data, the packet forwarding process is restarted using the new VR ID and incoming PP ID. See an example in FIG. 39. In this example, the outbound PP is an IVR PP which is connected to VR/1. LP1 does not have routing data for VR/1, so the packet must be sent to a LP which does have the routing data, in this case LP2. If the destination LP is not the same as the current LP, the packet could possible traverse three LPs before exiting the platform. This happens if the inbound LP does not support the outbound VR and the packet is sent to another LP for forwarding. On the second LP, the forwarding is done using the destination VR LCM. The outbound PP may be on another LP, which would be the third LP. See this example involving three LPs in FIG. 40.

A ClusterBridge (CB) port can act as a gateway for all bridged ports in the VR to routing and visa versa. The objective is to allow protocol packets to be freely bridged between LAN interfaces, with the freedom of packets destined for the Media Access Control (MAC) Address of the Cluster bridge to be routed outside of the bridge set. The ClusterBridge port is similar to the IVR PP in-that it is a distributed PP. The inbound PP data for CB PP must exist on all LPs supporting the VR. This is required on all LPs with bridging so that packets can be bridged to it and routed out of it. It is required on all LPs with routing so that packets can be routed to it and bridge out of it.

The VR process provides a mechanism which sends inbound and outbound data (FaInboundProtocolPort) to all LPs for distributed PPs. The FA provides this data to the forwarding software upon request.

In order for this to operate successfully with bridge ports, the Cluster Bridge port Bind, Incoming and Outgoing port information is required on every LP which has a bridged port on it per VR.

Cluster Bridge Media is used to support Cluster Bridging. The initialization required prior to packet forwarding is identical to that of the LAN case. (The only special case involved here is that the CB PP is a distributed PP. That is it must exist on all the LPs which contain bridged ports of the same domain. To simplify the PP forwarding data distribution software, this data is placed on all LPs in the VR.)

Figure 41:
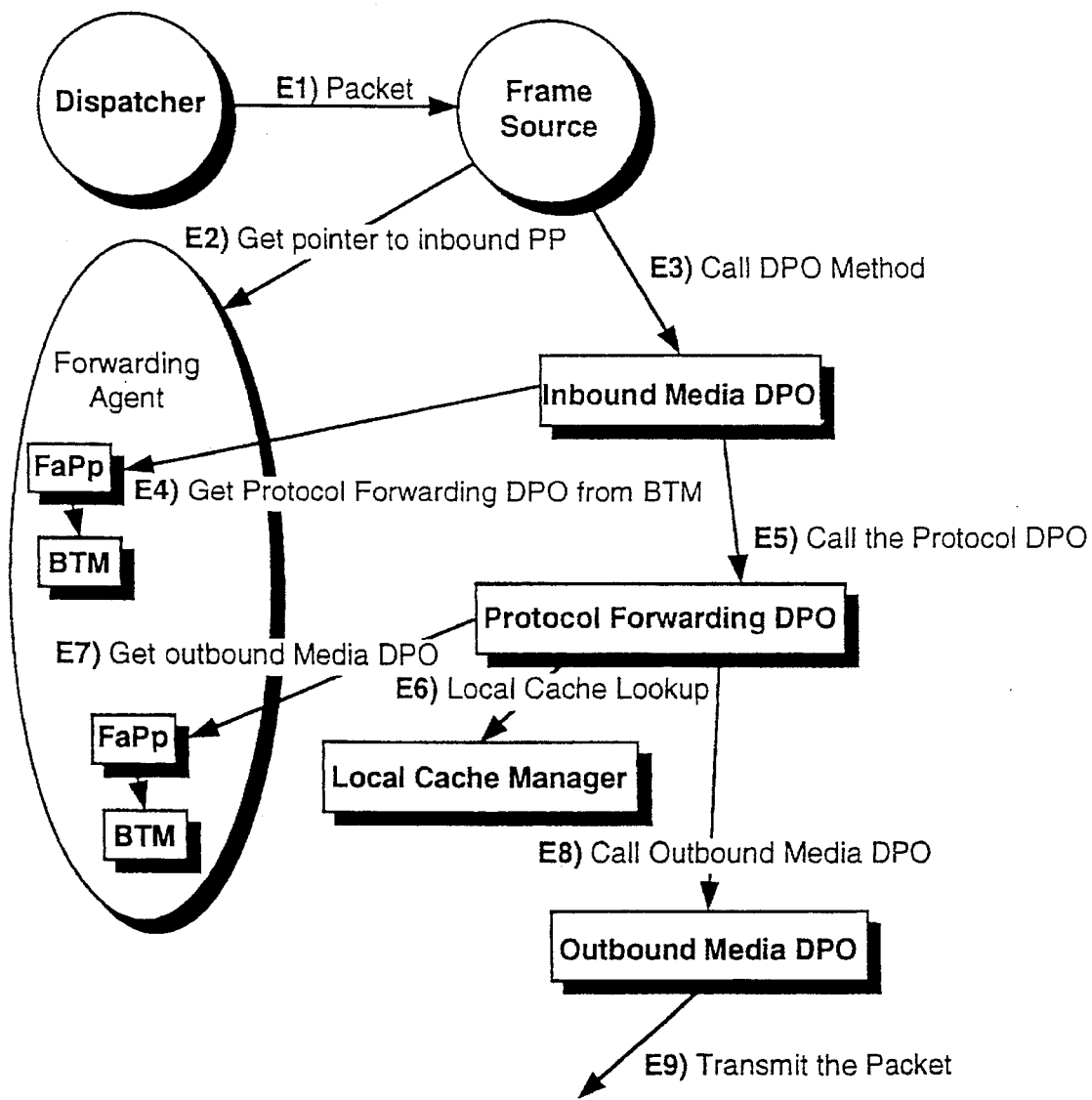
FIG. 41 is a block diagram which shows the Packet Forwarding—Cluster Bridge Media in accordance with the present invention.

However, the process used to forward packet is changed somewhat. This process is identified in FIG. 41 as Packet Forwarding—Cluster Bridge Media. In this example, a packet which is received on a routed port is to be transmitted out a bridged port. The following steps must be accomplished.

E1. The dispatcher pulls a packet off the inbound packet queue and calls the appropriate Media frame source with the physical channel number which the packet came from.

E2. The Frame Source gets a pointer to the Inbound PP object via the physicalPortInfo structure maintained by the FA.

E3. The inbound Media DME is called to process the packet.

E4. The protocol Forwarding DME is determined via the BTM. The inbound PP object has a pointer to the BTM.

E5. The protocol forwarding DME is called. The appropriate protocol processing is done. (This is the standard bridging DME) The protocol forwarding DME does a cache lookup to determine the outbound PP for which the packet is to be transmitted out. (There is a static entry in the bridging cache which points to the CB protocol port. At this point, a flag is set in the frameDescriptor which identifies this packet as being originated from bridging)

E6. (Part of the cache entry is a pointer to the FaProtocolPort object)

E7. The outbound Media DME is retrieved from the FaProtocolPort object.

E8. The outbound Media DME is called to process the packet.(This is the ClusterBridge outbound DME).

E9. The CB outbound DME determines if the packet originated from bridging or routing. If it originated from bridging, the protocol type is decoded and the protocol DME is determined via the Bind Table.

E10. The protocol DME is called.

E11. The protocol DME does the appropriate packet processing including a cache lookup on the destination address in the packet. A successful cache lookup provides a pointer to the outbound PP for which the packet is to be transmitted.

E12. The protocol DME fragments the packet if necessary and transmits it out the PP by calling the outbound DME as identified in the PP structure.

E13. The Media Application outbound DME adds the appropriate media header and sends the packet out the interface.

E14. The appropriate media processing is done and the packet is transmitted out the interface.

Beyond initialization and provisioning as described above, it is also desirable to have interface statistics easily retrievable. This can be accomplished in one of several manners known to those of ordinary skill in the art. For example, SNMP may be used as the framework to set up and retrieve this information in a timely fashion.

It will be appreciated by those skilled in the art that the VR system processes including the Virtual Router Process, the Forwarding Agent Process, and the Network Protocol Base Process may each have several components which have specific events that must be acted upon. However in view of the preceding discussion concerning the packet processing and forwarding process which includes virtual routers and virtual links, the software code necessary to accommodate these events in accordance with the present invention should be well within the understanding of a person of ordinary skill in the art. As such no further discussion needs to be provided concerning these events.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:

1. A physical switching device for use in a communication network to switch Open Systems Interconnection (OSI) network layer protocol data units within the communication network, the physical switching device comprising:

(a) at least a first and a second virtual switch, each virtual switch comprising decision means for determining an associated directive based on a destination identifier within a particular protocol data unit received at a data port, each virtual switch further comprising processing means for inserting the particular protocol data unit into an outgoing data stream on another data port according to the associated directive to enable delivery of the protocol data unit to the destination identifier, both data ports being associated with a set of data interfaces selected from a plurality of data interfaces in a physical communication network switch, the set of data interfaces being assigned exclusively to a unique virtual switch;

(b) management means, operatively coupled to each virtual switch, for maintaining information on an association between the plurality of data interfaces and each virtual switch, the management means comprising control means dependent on the association information for limiting the processing means of each virtual switch to only inserting the particular protocol data unit into an outgoing data stream on another data port associated with the same virtual switch which received the particular protocol data unit.

2. The physical switching device of claim 1 wherein each data port is selected from the group consisting of protocol data units arriving on a data interface having unique attributes, a data interface on the physical switch, a time slot out of several time slots in a time-divided frame received at a data interface on the physical switch, and a code divided cell out of several code divided cells received at at least one data interface on the physical switch.

3. The physical switching device of claim 1 wherein the set of data interfaces associated with a virtual switch includes a first data interface including means for manipulating a protocol data unit having a different protocol type from a second data interface such that protocol data units of different protocol types can be switched within a single virtual switch, the different protocol data unit protocol types being selected from the group consisting of different Open Systems Interconnection (OSI) physical layer media types, different OSI link layer signaling protocols, and different OSI network layer protocols.

4. The physical switching device of claim 1 wherein the management means further comprises means for maintaining a database of known destination identifiers and means for requiring verification that the destination identifier in the particular protocol data unit is in the database prior to inserting the particular protocol data unit into an outgoing data stream on another data port such that delivery of the protocol data unit to an unknown destination identifier is prevented.

5. The physical switching device of claim 1 wherein each virtual switch processing means comprises means for restructuring the particular protocol data unit by deleting, inserting, and replacing bits in the particular protocol data unit in accordance with the associated directive prior to inserting the particular protocol data unit into the outgoing data stream.

6. The physical switching device of claim 1 wherein each virtual switch processing means comprises means for monitoring the particular protocol data unit by dropping, sending, sending a copy of, and auditing the contents of the particular protocol data unit in accordance with the associated directive prior to inserting the particular protocol data unit into the outgoing data stream.

7. The physical switching device of claim 1 wherein:

(a) the physical switching device further comprises means for performing operations selected from the group consisting of bridge, route, switch, in-line filter, protocol conversion, and a security function;

(b) the protocol data unit is selected from the group consisting of a frame, a cell, and a packet;

(c) the communication network is selected from the group consisting of local area network, wide area network, metropolitan area network, and wireless network; and (d) the communication network switches protocol data units having a content selected from the group consisting of voice, video, and data.

8. A physical switching device for use in a communication network to switch Open Systems Interconnection (OSI) network layer protocol data units within the communication network on a shared communication medium, the physical switching device comprising:

(a) at least a first and a second virtual switch, each virtual switch comprising decision means for determining an associated directive based on a destination identifier within a particular protocol data unit received at a data port, each virtual switch further comprising processing means for inserting the particular protocol data unit into an outgoing data stream on another data port according to the associated directive to enable delivery of the protocol data unit to the destination identifier, both data ports being associated with a set of data interfaces selected from a plurality of data interfaces in a physical communication network switch, the set of data interfaces being assigned exclusively to a unique virtual switch;

(b) virtual link management means, operatively coupled to at least the first and the second virtual switches, for maintaining information on at least one virtual link between at least the first and the second virtual switch, each virtual link comprising a first end and a second end of a data path on the shared communication medium, each virtual link end comprising a data port from the plurality of data interfaces in the physical communication network switch.

9. The physical switching device of claim 8 wherein the first and the second virtual link end of the at least one virtual link are in a different set of data ports assigned exclusively to the first and the second virtual switch, respectively, such that the virtual link provides a data path between the first and the second virtual switch on the shared communication medium.

10. The physical switching device of claim 9 wherein the first and the second virtual switches are located in a single geographic location and the shared communication medium comprises a memory shared between the first and the second virtual switches.

11. The physical switching device of claim 8 wherein the first and the second virtual switches are geographically remote from one another and wherein the first and the second virtual link ends are in a single set of data ports assigned exclusively to the first and the second virtual switch such that the virtual link provides a data path between the first and the second virtual switches on the shared communication medium across a geographic distance.

12. The physical switching device of claim 11 wherein the shared communication medium comprises a high data transfer rate link between the first and the second virtual switches which spans the geographic distance.

13. The physical switching device of claim 8 further comprising at least one filter operatively coupled to the data path which filters protocol data units communicated in the virtual link data path according to one access policy out of a plurality of access policies that are separately specified for each virtual switch.

14. The physical switching device of claim 13 wherein the at least one filter comprises a first and a second filter operatively coupled to the first and the second virtual switch, respectively, which filters protocol data units communicated in the virtual link data path according to an access policy specified for the first and the second virtual switch, respectively.

15. The physical switching device of claim 8 wherein each data port is selected from the group consisting of protocol data units arriving on a data interface having unique attributes, a data interface on the physical switch, a time slot out of several time slots in a time-divided frame received at a data interface on the physical switch, and a code divided cell out of several code divided cells received on at least one data interface on the physical switch.

16. The physical switching device of claim 8 wherein the set of data interfaces associated with a virtual switch includes a first data interface including means for manipulating a protocol data unit having a different protocol type from a second data interface such that protocol data units of different protocol types can be switched within a single virtual switch, the different protocol data unit protocol types being selected from the group consisting of different Open Systems Interconnection (OSI) physical layer media types, different OSI link layer signaling protocols, and different OSI network layer protocols.

17. The physical switching device of claim 8 wherein each virtual switch processing means comprises means for restructuring the particular protocol data unit by deleting, inserting, and replacing bits in the particular protocol data unit in accordance with the associated directive prior to inserting the particular protocol data unit into the outgoing data stream.

18. The physical switching device of claim 8 wherein each virtual switch processing means comprises means for monitoring the particular protocol data unit by dropping, sending, sending a copy of, and auditing the contents of the particular protocol data unit in accordance with the associated directive prior to inserting the particular protocol data unit into the outgoing data stream.

19. The physical switching device of claim 8 wherein:

(a) the physical switching device further comprises means for performing operations selected from the group consisting of bridge, route, switch, in-line filter, protocol conversion, and a security function;

(b) the protocol data unit is selected from the group consisting of a frame, a cell, and a packet;

(c) the communication network is selected from the group consisting of local area network, wide area network, metropolitan area network, and wireless network; and (d) the communication network switches protocol data units having a content selected from the group consisting of voice, video, and data.

20. A communication system which delivers Open Systems Interconnection (OSI) network layer protocol data units within a first and a second virtual closed user group on a shared communication medium, the communication system comprising:

(a) first virtual closed user group processing means for examining and modifying data bits within a protocol data unit received from a member of the first virtual closed user group on the shared communication medium, each member of the first virtual closed user group having a unique destination identifier, the first virtual closed user group processing means comprising delivery means for delivering the modified protocol data unit to another member of the first virtual closed user group;

(b) second virtual closed user group processing means for examining and modifying data bits within a protocol data unit received from a member of the second virtual closed user group on the shared communication medium, each member of the second virtual closed user group having a unique destination identifier, the second virtual closed user group processing means comprising delivery means for delivering the modified protocol data unit to another member of the second virtual closed user group; and (c) a framer means, operatively coupled to the first and the second virtual closed user group processing means, for maintaining a database of all destination identifiers representing users in that user group currently reachable for delivery of protocol data units within the communication system, the framer means comprising means for requiring verification that each destination identifier in a protocol data unit indicates a user in that user group can be currently reached for delivery through a lookup in the database prior to completing delivery of the protocol data unit to the user indicated by the associated destination identifier, the framer means further comprising means for limiting access to the database such that each virtual closed user group only has access to specific destination identifiers owned by that particular virtual closed user group so that a protocol data unit having a destination identifier which is not owned by the particular virtual closed user group will not be delivered.

21. The communication system of claim 20 wherein each virtual closed user group processing means comprises means for modifying data bits within a received protocol data unit by deleting, inserting, and replacing bits in the received protocol data unit prior to delivering the modified protocol data unit to another member of the same virtual closed user group.

22. The communication system of claim 20 wherein each virtual closed user group processing means further comprises means for monitoring the received protocol data unit by dropping, sending, sending a copy of, and auditing the contents of the received protocol data unit prior to delivering the modified protocol data unit to another member of the same virtual dosed user group.

23. The communication system of claim 20 wherein each virtual closed user group processing means delivers the modified protocol data unit to another member of the same virtual closed user group without modifying predetermined Open Systems Interconnection (OSI) physical layer, link layer, and network layer access protocols used to communicate protocol data units over the shared communication medium.

24. The communication system of claim 23 wherein each virtual closed user group processing means delivers the modified protocol data unit to another member of the same virtual closed user group without modifying the predetermined access protocols such that any particular device capable of communicating on the shared communication medium can be a member of either virtual closed user group by having the framer means limit database access to destination identifiers associated with the particular device to a particular desired virtual closed user group.

25. The communication system of claim 20 wherein the framer means further comprises means for assigning incoming protocol data unit traffic to each virtual closed user group based on an access policy that is separately specified in each virtual closed user group.

26. The communication system of claim 20 wherein the first and the second virtual closed user group processing means include a first and a second virtual switch, respectively, each virtual switch comprising decision means for determining an associated directive based on a destination identifier within a particular protocol data unit received at a data port, each virtual switch further comprising a processor, which performs the functions of the virtual closed user group delivery means by inserting the particular protocol data unit into an outgoing data stream on another data port according to the associated directive to enable delivery of the protocol data unit to the destination identifier within the protocol data unit.

27. The communication system of claim 26 wherein the first and the second virtual switch are located within a single physical switching device, both data ports for each virtual switch being associated with a set of data interfaces in the physical switching device assigned exclusively to the same virtual switch.

28. The communication system of claim 26 wherein the first and the second virtual switch are located within different physical switching devices, both data ports for each virtual switch being associated with a set of data interfaces in the respective physical switching devices which are assigned exclusively to the same virtual switch.

29. The communication system of claim 28 wherein the different physical switching devices are geographically remote from one another.

30. The communication system of claim 26 wherein each data port is selected from the group consisting of protocol data units arriving on a data interface having unique attributes, a data interface on a physical switching device, a time slot out of several time slots in a time-divided frame received at a data interface on a physical switching device, and a code divided cell out of several code divided cells received on at least one data interface on a physical switching device.

31. The communication system of claim 26 wherein the set of data interfaces associated with a virtual switch from a physical switching device includes a first data interface including means for manipulating a protocol data unit having a different protocol type from a second data interface such that protocol data units of different protocol types can be switched within a single virtual switch, the different protocol data unit protocol types being selected from the group consisting of different Open Systems Interconnection (OSI) physical layer media types, different OSI link layer signaling protocols, and different OSI network layer protocols.

32. The communication system of claim 26 wherein each virtual switch processor comprises means for restructuring the particular protocol data unit by deleting, inserting, and replacing bits in the particular protocol data unit in accordance with the associated directive prior to inserting the particular protocol data unit into the outgoing data stream.

33. The communication system of claim 26 wherein each virtual switch processor comprises means for monitoring the particular protocol data unit by dropping, sending, sending a copy of, and auditing the contents of the particular protocol data unit in accordance with the associated directive prior to inserting the particular protocol data unit into the outgoing data stream.

34. The communication system of claim 26 wherein:
   (a) the protocol data unit is selected from the group consisting of a frame, a cell, and a packet;
   (b) the communication network is selected from the group consisting of local area network, wide area network, metropolitan area network, and wireless network; and
   (c) the communication network switches protocol data units having a content selected from the group consisting of voice, video, and data.

35. The communication system of claim 26 further comprising a virtual link between the first and the second virtual switch, the virtual link comprising a first end and a second end of a data path on the shared communication medium, each end comprising a data port in a different virtual closed user group.

36. The communication system of claim 35 further comprising a filter operatively coupled to the data path which filters protocol data units communicated in the data path.

37. The communication system of claim 20 wherein the first virtual closed user group processing means include a first and a second virtual switch, respectively, each virtual switch comprising decision means for determining an associated directive based on a destination identifier within a particular protocol data unit received at a data port, each virtual switch further comprising a processor, which performs the functions of the virtual closed user group delivery means by inserting the particular protocol data unit into an outgoing data stream on another data port according to the associated directive to enable delivery of the protocol data unit to the destination identifier within the protocol data unit.

38. The communication system of claim 37 wherein the first and the second virtual switch are located within a single physical switching device, both data ports for each virtual switch being associated with a set of data interfaces in the physical switching device assigned exclusively to the same virtual switch.

39. The communication system of claim 37 wherein the first and the second virtual switch are located within different physical switching devices, both data ports for each virtual switch being associated with a set of data interfaces in the respective physical switching devices which are assigned exclusively to the same virtual switch.

40. The communication system of claim 37 wherein the different physical switching devices are geographically remote from one another.

41. The communication system of claim 37 wherein each data port is selected from the group consisting of protocol data units arriving on a data interface having unique attributes, a data interface on a physical switching device, a time slot out of several time slots in a time-divided frame received at a data interface on a physical switching device, and a code divided cell out of several code divided cells received on at least one data interface on a physical switching device.

42. The communication system of claim 37 wherein the set of data interfaces associated with a virtual switch from a physical switching device includes a first data interface including means for manipulating a protocol data unit having a different protocol type from a second data interface such that protocol data units of different protocol types can be switched within a single virtual switch, the different protocol data unit protocol types being selected from the group consisting of different Open Systems Interconnection (OSI) physical layer media types, different OSI link layer signaling protocols, and different OSI network layer protocols.

43. The communication system of claim 37 wherein each virtual switch processor comprises means for restructuring the particular protocol data unit by deleting, inserting, and replacing bits in the particular protocol data unit in accordance with the associated directive prior to inserting the particular protocol data unit into the outgoing data stream.

44. The communication system of claim 37 wherein each virtual switch processor comprises means for monitoring the particular protocol data unit by dropping, sending, sending a copy of, and auditing the contents of the particular protocol data unit in accordance with the associated directive prior to inserting the particular protocol data unit into the outgoing data stream.

45. The communication system of claim 37 wherein:
   (a) the protocol data unit is selected from the group consisting of a frame, a cell, and a packet;
   (b) the communication network is selected from the group consisting of local area network, wide area network, metropolitan area network, and wireless network; and
   (c) the communication network switches protocol data units having a content selected from the group consisting of voice, video, and data.

46. The communication system of claim 37 further comprising a virtual link between the first and the second virtual switch, the virtual link comprising a first end and a second end of a data path on the shared communication medium, each end comprising a data port in the same virtual closed user group.

47. The communication system of claim 46 further comprising a filter operatively coupled to the data path which filters protocol data units communicated in the data path.

48. A method for delivering Open Systems Interconnection (OSI) network layer protocol data units within a first and a second virtual closed user group on a shared communication medium in a communication system, the method comprising the device-implemented steps of:
   (a) examining and modifying data bits within a protocol data unit received from a member of the first virtual closed user group on the shared communication medium, each member of the first virtual closed user group having a unique destination identifier;
   (b) examining and modifying data bits within a protocol data unit received from a member of the second virtual closed user group on the shared communication medium, each member of the second virtual closed user group having a unique destination identifier;
   (c) maintaining a database of all destination identifiers representing members which are currently reachable for delivery of protocol data units within the communication system;
   (d) limiting access to the database such that each virtual closed user group only has access to specific destination identifiers owned by that particular virtual closed user group;
   (e) requiring verification that each destination identifier in a protocol data unit indicates a member which is currently reachable for delivery through a lookup in the database prior to completing delivery of the protocol data unit to the member represented by the associated destination identifier;

(f) delivering the first virtual closed user group modified protocol data unit to another member of the first virtual closed user group after verifying that the first virtual closed user group member destination identifier is currently reachable; and (g) delivering the second virtual closed user group modified protocol data unit to another member of the second virtual closed user group after verifying that the second virtual closed user group member destination identifier is currently reachable, step (f) and (g) being device-implemented such that a protocol data unit having a destination identifier which is not owned by the particular virtual closed user group will not be delivered.

49. The method of claim 48 wherein each examining and modifying step comprises modifying data bits within a received protocol data unit by deleting, inserting, and replacing bits in the received protocol data unit prior to delivering the modified protocol data unit to another member of the same virtual closed user group.

50. The method of claim 48 wherein each examining and modifying step comprises monitoring the received protocol data unit by dropping, sending, sending a copy of, and auditing the contents of the received protocol data unit prior to delivering the modified protocol data unit to another member of the same virtual closed user group.

51. The method of claim 48 wherein steps (a) through (g) are performed such that all predetermined physical layer, link layer, and network layer access protocols used to communicate protocol data units over the shared communication medium are preserved.

52. The method of claim 51 wherein steps (a) through (g) are performed such that all of the predetermined access protocols are preserved so that any particular device capable of communicating on the shared communication medium can be a member of either virtual closed user group by performing an additional step of adding a destination identifier associated with the particular device to the database.

53. The method of claim 48 further comprising a step of assigning incoming protocol data unit to each virtual closed user group based on an access policy that is separately specified in each virtual closed user group.

54. The method of claim 48 further comprising a step of providing a virtual link between the first and the second virtual closed user group, the virtual link comprising a first end and a second end of a data path on the shared communication medium, each end comprising a data port in a different virtual closed user group.

55. The method of claim 54 wherein the providing step comprises utilizing a shared memory as the shared communication medium to provide the virtual link.

56. The method of claim 54 wherein the providing step comprises utilizing a high data transfer rate link which spans a geographic distance between the first and the second virtual closed user group to provide the virtual link.

57. The method of claim 55 further comprising a step of filtering protocol data units communicated in the virtual link data path according to an access policy.

\* \* \* \* \*